(12) United States Patent
Sieracki

(10) Patent No.: US 10,360,900 B1
(45) Date of Patent: *Jul. 23, 2019

(54) SYSTEM AND METHOD FOR TAXONOMICALLY DISTINGUISHING SAMPLE DATA CAPTURED FROM SOURCES

(71) Applicant: REALITY ANALYTICS, INC., Columbia, MD (US)

(72) Inventor: Jeffrey M. Sieracki, Clarksville, MD (US)

(73) Assignee: Reality Analytics, Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/890,049

(22) Filed: Feb. 6, 2018

Related U.S. Application Data

(63) Continuation of application No. 14/218,650, filed on Mar. 18, 2014, now Pat. No. 9,886,945, which is a continuation-in-part of application No. 13/729,828, filed on Dec. 28, 2012, now Pat. No. 9,691,395, which is a continuation-in-part of application No. 13/541,592, filed on Jul. 3, 2012, now Pat. No. 9,558,762.

(60) Provisional application No. 61/801,010, filed on Mar. 15, 2013, provisional application No. 61/582,288, filed on Dec. 31, 2011, provisional application No. 61/504,221, filed on Jul. 3, 2011.

(51) Int. Cl.
*G10L 15/06* (2013.01)
*G10L 15/08* (2006.01)
*G06K 9/62* (2006.01)

(52) U.S. Cl.
CPC .............. *G10L 15/063* (2013.01); *G06K 9/62* (2013.01); *G10L 15/08* (2013.01)

(58) Field of Classification Search
CPC .......... G10L 15/063; G10L 15/08; G06K 9/62
USPC ........................................ 704/237
See application file for complete search history.

(56) References Cited

U.S. PATENT DOCUMENTS

| | | | | |
|---|---|---|---|---|
| 4,969,204 A | * | 11/1990 | Jones ................... | G06T 3/4007 382/240 |
| 6,014,451 A | * | 1/2000 | Berry .................. | G06F 19/3418 382/110 |
| 6,418,235 B1 | * | 7/2002 | Morimoto ............... | G06K 9/00 340/5.83 |
| 7,020,335 B1 | * | 3/2006 | Abousleman ........ | G06K 9/3241 375/240.11 |
| 7,079,984 B2 | * | 7/2006 | Eryurek ............. | G05B 23/0289 702/185 |
| 7,091,409 B2 | * | 8/2006 | Li ....................... | G06K 9/00523 84/634 |
| 7,386,527 B2 | * | 6/2008 | Harris .................. | G06K 9/6269 706/12 |
| 7,983,446 B2 | * | 7/2011 | Wiedemann ......... | G06K 9/6857 382/103 |

(Continued)

*Primary Examiner* — Edwin S Leland, III
(74) *Attorney, Agent, or Firm* — Rosenberg, Klein & Lee

(57) ABSTRACT

A system and method are provided for distinguishing biota, such as insect types, from overall images, images of their wings or of other body parts. The system and method exploit various techniques described herein, in combination with large scale capture of sample imagery to achieve a flexible mechanism for automated classification on biota of any type.

20 Claims, 48 Drawing Sheets
(29 of 48 Drawing Sheet(s) Filed in Color)

(56) References Cited

U.S. PATENT DOCUMENTS

| | | | | |
|---|---|---|---|---|
| 8,400,348 B1* | 3/2013 | Guice | | A01M 1/026 |
| | | | | 235/400 |
| 9,070,012 B1* | 6/2015 | Sieracki | | G06K 9/4633 |
| 9,224,068 B1* | 12/2015 | Ranzato | | G06K 9/6227 |
| 9,613,297 B1* | 4/2017 | Ranzato | | G06K 9/6227 |
| 9,691,395 B1* | 6/2017 | Sieracki | | G10L 17/26 |
| 2003/0026484 A1* | 2/2003 | O'Neill | | G06K 9/6204 |
| | | | | 382/224 |
| 2003/0167283 A1* | 9/2003 | Remsen | | G06F 16/9558 |
| 2004/0072143 A1* | 4/2004 | Timmis | | A01C 1/00 |
| | | | | 435/4 |
| 2006/0150470 A1* | 7/2006 | Ronnau | | A01M 1/026 |
| | | | | 43/58 |
| 2006/0241916 A1* | 10/2006 | Sieracki | | G10L 15/02 |
| | | | | 702/19 |
| 2007/0223887 A1* | 9/2007 | Kanamori | | G06T 3/4053 |
| | | | | 386/232 |
| 2008/0052056 A1* | 2/2008 | Timmis | | G06K 9/00147 |
| | | | | 703/11 |
| 2008/0170623 A1* | 7/2008 | Aharon | | H04N 19/97 |
| | | | | 375/240.22 |
| 2008/0247639 A1* | 10/2008 | Marugame | | G06K 9/00275 |
| | | | | 382/159 |
| 2011/0159960 A1* | 6/2011 | Ueshima | | A63F 13/92 |
| | | | | 463/37 |
| 2011/0182501 A1* | 7/2011 | Mercier | | G06K 9/527 |
| | | | | 382/159 |
| 2011/0235902 A1* | 9/2011 | Chittar | | G06K 9/3208 |
| | | | | 382/162 |
| 2011/0255855 A1* | 10/2011 | Lee | | F16M 11/046 |
| | | | | 396/428 |
| 2012/0057799 A1* | 3/2012 | Nguyen | | H03M 7/3082 |
| | | | | 382/232 |
| 2013/0083974 A1* | 4/2013 | Tsai | | G06K 9/00 |
| | | | | 382/110 |
| 2013/0094717 A1* | 4/2013 | Janni | | G06K 9/2018 |
| | | | | 382/110 |
| 2013/0108107 A1* | 5/2013 | Kang | | G06K 9/209 |
| | | | | 382/103 |
| 2017/0031021 A1* | 2/2017 | Cheatham, III | | G01S 15/62 |

* cited by examiner

|  | Actual | | | | | | | | |  | Actual | | | | | | | |
|---|---|---|---|---|---|---|---|---|---|---|---|---|---|---|---|---|---|---|
| classified | KC | PJ | AR | CO | BC | ED | MO | WG |  | KC | PJ | AR | CO | BC | ED | MO | WG |
| KC | 5 | 0 | 0 | 0 | 0 | 0 | 0 | 0 |  | 10 | 0 | 0 | 0 | 0 | 0 | 0 | 0 |
| PJ | 0 | 5 | 0 | 0 | 0 | 0 | 0 | 0 |  | 0 | 10 | 0 | 0 | 0 | 0 | 0 | 0 |
| AR | 0 | 0 | 5 | 0 | 0 | 0 | 0 | 0 |  | 0 | 0 | 9 | 0 | 0 | 0 | 0 | 0 |
| CO | 0 | 0 | 0 | 5 | 0 | 0 | 0 | 0 |  | 0 | 0 | 0 | 10 | 0 | 0 | 0 | 0 |
| BC | 0 | 0 | 0 | 0 | 5 | 0 | 0 | 0 |  | 0 | 0 | 0 | 0 | 10 | 0 | 0 | 1 |
| ED | 0 | 0 | 0 | 0 | 0 | 5 | 0 | 0 |  | 0 | 0 | 0 | 0 | 0 | 10 | 0 | 0 |
| MO | 0 | 0 | 0 | 0 | 0 | 0 | 5 | 0 |  | 0 | 0 | 1 | 0 | 0 | 0 | 10 | 0 |
| WG | 0 | 0 | 0 | 0 | 0 | 0 | 0 | 5 |  | 0 | 0 | 0 | 0 | 0 | 0 | 0 | 9 |
| Null | 0 | 0 | 0 | 0 | 0 | 0 | 0 | 0 |  | 0 | 0 | 0 | 0 | 0 | 0 | 0 | 0 |
| | *5 files per speaker, 100% accuracy* | | | | | | | | | *10 files per speaker, 97.5% accuracy* | | | | | | | |

Figure 3a

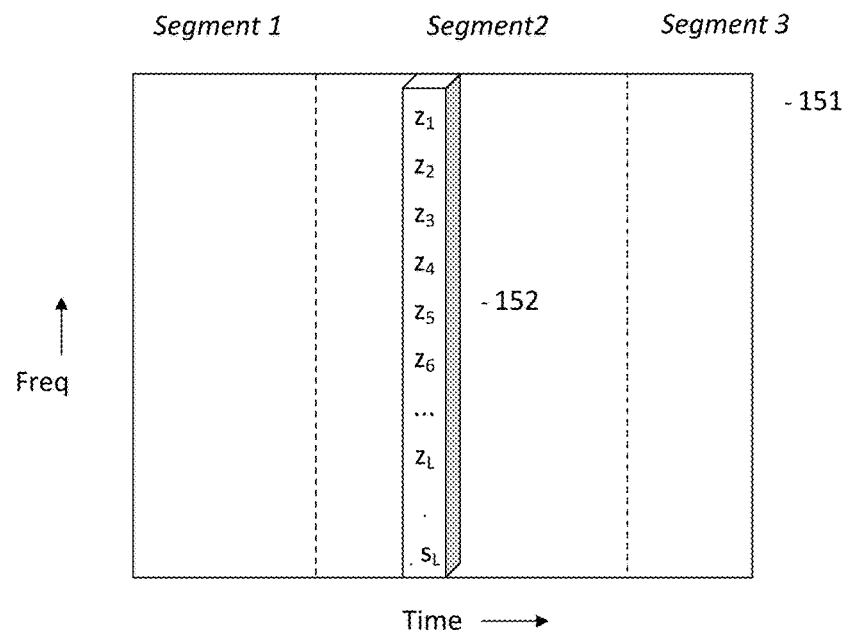
Segment 2, $i^{th}$ Sub-Segment Spectrum : $(z_1 z_2 z_3 z_4 z_5 z_6 \ldots z_L)$  - 153
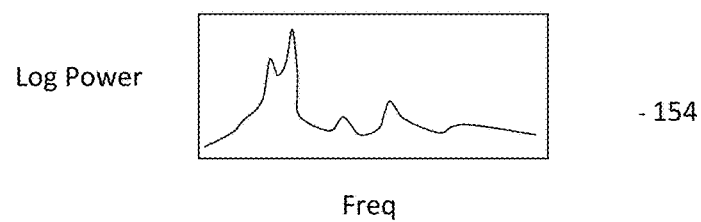
Figure 6

| 0 | 1\|\|2 | 1\|\|3 | 1\|\|4 | 1\|\|5 | 1\|\|6 | 1\|\|7 | 1\|\|8 |
|---|---|---|---|---|---|---|---|
| 0 | 0 | 2\|\|3 | 2\|\|4 | 2\|\|5 | 2\|\|6 | 2\|\|7 | 2\|\|8 |
| 0 | 0 | 0 | 3\|\|4 | 3\|\|5 | 3\|\|6 | 3\|\|7 | 3\|\|8 |
| 0 | 0 | 0 | 0 | 4\|\|5 | 4\|\|6 | 4\|\|7 | 4\|\|8 |
| 0 | 0 | 0 | 0 | 0 | 5\|\|6 | 5\|\|7 | 5\|\|8 |
| 0 | 0 | 0 | 0 | 0 | 0 | 6\|\|7 | 6\|\|8 |
| 0 | 0 | 0 | 0 | 0 | 0 | 0 | 7\|\|8 |
| 0 | 0 | 0 | 0 | 0 | 0 | 0 | 0 |

Table 1: Comparison Matrix Structure (8 groups). Each zero represents an actual zero in the comparison matrix. Each binary comparison is actually a 1 or a 2 depending on whether it is in the group to the left of the || (1) or if it is in the group to the right of the || (2). Each row corresponds to the groups on the left of the ||, and each column corresponds to the groups on the right.

| 0 | 1 | 1 | 2 | 1 | 1 | 1 | 1 |
|---|---|---|---|---|---|---|---|
| 0 | 0 | 2 | 1 | 2 | 2 | 1 | 2 |
| 0 | 0 | 0 | 1 | 2 | 1 | 2 | 2 |
| 0 | 0 | 0 | 0 | 2 | 1 | 1 | 2 |
| 0 | 0 | 0 | 0 | 0 | 1 | 1 | 2 |
| 0 | 0 | 0 | 0 | 0 | 0 | 2 | 1 |
| 0 | 0 | 0 | 0 | 0 | 0 | 0 | 2 |
| 0 | 0 | 0 | 0 | 0 | 0 | 0 | 0 |

Table 2: Sample Comparison Matrix (8 groups). This Comparison matrix would result in the following votes:
Group 1: 6 votes     Group 2: 2 votes
Group 3: 3 votes     Group 4: 3 votes
Group 5: 5 votes     Group 6: 2 votes
Group 7: 2 votes     Group 8: 5 votes

Figure 11

| Confusion Matrix | Actual Group 1 | Actual Group 2 | Actual Group 3 | Actual Group 4 |
|---|---|---|---|---|
| Estimated Group 1 | 11 | 0 | 0 | 0 |
| Estimated Group 2 | 0 | 2 | 0 | 0 |
| Estimated Group 3 | 1 | 1 | 10 | 0 |
| Estimated Group 4 | 0 | 0 | 2 | 8 |

Figure 17b

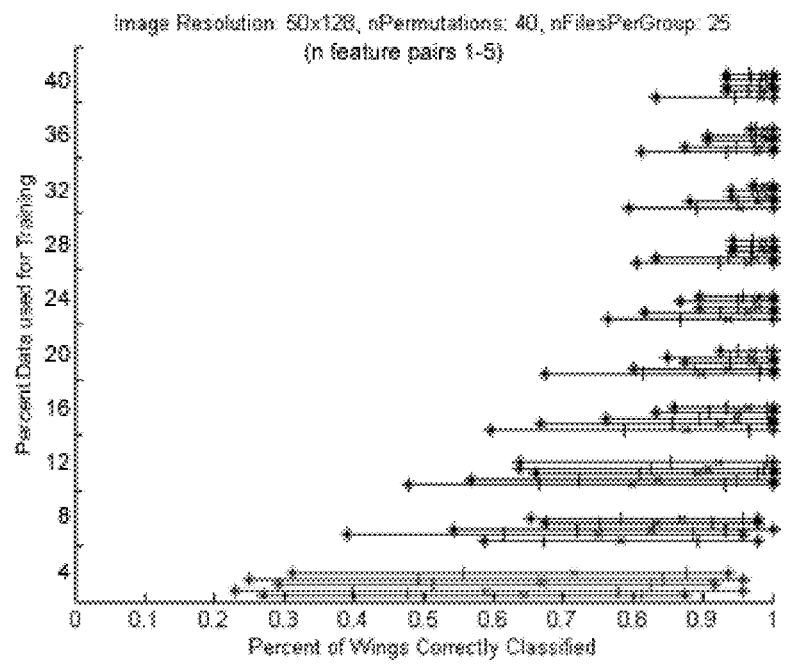
Figure 20a
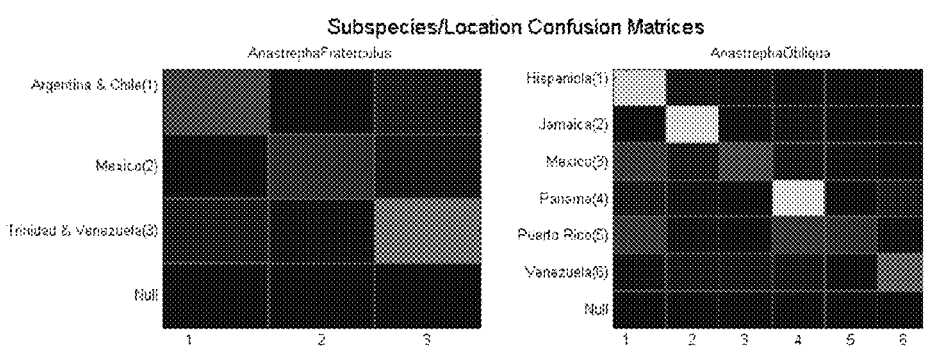
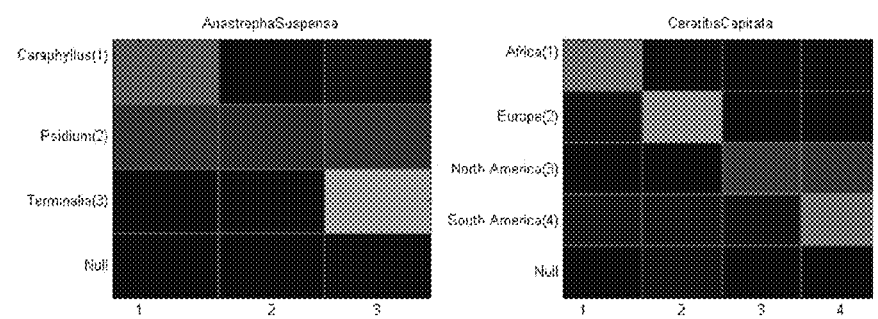
Figure 20b

| EACG Gender Confusion Matrix | | |
|---|---|---|
| | Female | Male |
| Female | 55 | 1 |
| Male | 5 | 59 |
| Null | 0 | 0 |

| EAF Language Confusion Matrix | | | |
|---|---|---|---|
| | Arabic | English | Farsi |
| Arabic | 15 | 1 | 0 |
| English | 0 | 14 | 0 |
| Farsi | 0 | 0 | 15 |
| Null | 0 | 0 | 0 |

SYSTEM AND METHOD FOR TAXONOMICALLY DISTINGUISHING SAMPLE DATA CAPTURED FROM SOURCES

RELATED APPLICATION DATA

This Application is a Continuation of co-pending patent application Ser. No. 14/218,650, filed 18 Mar. 2014. Application Ser. No. 14/218,650 is a Continuation-In-Part of patent application Ser. No. 13/729,828, filed 28 Dec. 2012, and also based on Provisional Patent Application No. 61/801,010, filed 15 Mar. 2013. Application Ser. No. 13/729,828 is a Continuation-In-Part of patent application Ser. No. 13/541,592, filed 3 Jul. 2012, and also based on Provisional Patent Application No. 61/582,288, filed 31 Dec. 2011. Application Ser. No. 13/541,592 is based on Provisional Patent Application No. 61/504,221, filed 3 Jul. 2011.

BACKGROUND OF THE INVENTION

The present invention is directed to a system and method for processing signal data for signature detection. More specifically, the system and method are directed to the taxonomic processing of unconstrained signal data captured for/from various sources in numerous applications, such as audible speech and other sounds signals emitted by certain beings, relief data from certain textured surfaces, and image data of certain subjects, among others. In various embodiments and applications, the system and method provide for such processing in context-agnostic manner to distinguish the sources for identification and classification purposes. In various speech applications, for instance, the subject system and method provide for the identification and classification of speech segments and/or speakers in context-agnostic manner. In various image processing applications, for instance, the subject system and method provide for the identification and classification of insects into biological groups from images of their overall appearance, their wings or other body parts.

Exemplary embodiments of the present invention utilize certain aspects of methods and systems previously disclosed in U.S. patent application Ser. No. 10/748,182, (now U.S. Pat. No. 7,079,986) entitled "Greedy Adaptive Signature Discrimination System and Method" referred to herein as reference [1], as well as certain aspects of methods and systems previously disclosed in U.S. patent application Ser. No. 11/387,034, entitled "System and Method For Acoustic Signature Extraction, Detection, Discrimination, and Localization" referred to herein as reference [2]. This techniques and measures disclosed by these references are collectively and generally referred to herein as [GAD].

Autonomous machine organization of captured signals having unknown source has proven to be a difficult problem to address. One notable example is in the context of natural speech, where the challenge of selecting a robust feature space for collections of speech is complicated by variations in the words spoken, recording conditions, background noise, etc. Yet the human ear is remarkably adept at recognizing and clustering speakers. Human listeners effortlessly distinguish unknown voices in a recorded conversation and can generally decide if two speech segments come from the same speaker with only a few seconds of exposure. Human listeners can often make this distinction even in cases where they are not natively familiar with the speaker's language or accent.

Both voice recognition and voice-print biometric technologies are comparatively well developed. Hence, many researchers have addressed the problem of sorting natural speech by applying voice recognition to capture key phonemes or words, then attempting to establish a signature for each speaker's pronunciation of these key words. This is a natural approach to engineering a system from component parts; however, it is limited by language, accents, speaking conditions, and probability of hitting key signature words.

Attempts at using these and other technologies to even approach, much less exceed, the human ear's capability to distinguish different speakers from their speech samples alone have proven to be woefully lacking. This is especially so, where the speech samples are unconstrained by any cooperative restrictions, and the speaker is to be distinguished without regard to the language or other substantive content of the speech. Similar deficiencies are encountered in other contexts, such as in the identification and classification of geography type from captured terrain mapping data, and in the identification and classification of species from a collection of anatomic image data. There is therefore a need to provide a system and method for use in various applications, whereby the source of certain unconstrained captured signals may be reliably distinguished by taxonomic evaluation of the captured signals in context-agnostic manner.

SUMMARY OF THE INVENTION

It is an object of the present invention to provide a system and method for taxonomically distinguishing signal data attributable to different sources.

It is another object of the present invention to provide a system and method for automatically and accurately distinguishing sources of signal data one from the other.

It is another object of the present invention to provide a system and method for automatically and accurately discriminating sources of signal data in context-agnostic manner.

It is yet another object of the present invention to provide a system and method for automatically and accurately identifying and classifying sources of unconstrained signal data in context-agnostic manner.

These and other objects are attained by a system formed in accordance with certain embodiments of the present invention system for taxonomically distinguishing grouped segments of signal data captured in unconstrained manner for a plurality of sources. The system comprises a vector unit constructing for each of the grouped signal data segments at least one vector of predetermined form. A sparse decomposition unit is coupled to the vector unit, which selectively executes in at least a training system mode a simultaneous sparse approximation upon a joint corpus of vectors for a plurality of signal segments of distinct sources. The sparse decomposition unit adaptively generates at least one sparse decomposition for each vector with respect to a representative set of decomposition atoms. A discriminant reduction unit is coupled to the sparse decomposition unit, which is executable during the training system mode to derive an optimal combination of atoms from the representative set for cooperatively distinguishing signals attributable to different ones of the distinct sources. A classification unit is coupled to the sparse decomposition unit, which is executable in a classification system mode to discover for the sparse decomposition of an input signal segment a degree of correlation relative to each of the distinct sources.

A method formed in accordance with certain embodiments of the present invention provides for taxonomically distinguishing grouped segments of signal data captured in unconstrained manner for a plurality of sources. The method comprises constructing for each of the grouped signal segments at least one vector of predetermined form, and selectively executing in a processor simultaneous sparse approximation to generate a sparse decomposition of each said vector. The simultaneous sparse approximation in a training system mode executing upon a joint corpus of vectors for a plurality of signal segments of distinct sources. At least one sparse decomposition is generated for each vector with respect to a representative set of decomposition atoms. The method also comprises executing discriminant reduction in a processor during the training system mode to derive from the representative set an optimal combination of atoms for cooperatively distinguishing signals attributable to different ones of the distinct sources. Classification is executed upon the sparse decomposition of an input signal segment during a classification system mode. The classification includes executing a processor to discover a degree of correlation for the input signal segment relative to each of the distinct sources.

A system formed in accordance with certain other embodiments of the present invention provides for taxonomically distinguishing grouped segments of signals captured in unconstrained manner for a plurality of sources comprises a vector unit constructing for each of the grouped signal segments at least one vector of predetermined form. A training unit is coupled to the vector unit, which training unit includes a decomposition portion executing an adaptive sparse transformation upon a joint corpus of vectors for a plurality of signal segments of distinct sources. The decomposition portion generates for each vector in the joint corpus at least one adaptive decomposition defined on a sparse transformation plane as a coefficient weighted sum of a representative set of decomposition atoms. A discriminant reduction portion coupled to the decomposition portion is executable to derive from the representative set an optimal combination of atoms for cooperatively distinguishing signals attributable to different ones of the distinct sources. A classification unit coupled to the vector unit includes a projection portion projecting a spectral vector of an input signal segment onto the sparse transformation plane to generate an adaptive decomposition therefor as a coefficient weighted sum of the representative set of decomposition atoms. A classification decision portion is coupled to the projection portion, which is executable to discover for the adaptive decomposition of the input signal segment a degree of correlation relative to each of the distinct sources.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1-1(B) is a flow diagram illustrating a progression of general processing stages in a classification process executed according to an exemplary embodiment of the present invention;

FIG. 1-2(A) is a flow diagram illustrating a progression of general processing stages in a training process as in FIG. 1-1(A), shown with certain optional stages incorporated according to an exemplary embodiment of the present invention;

FIG. 1-2(B) is a flow diagram illustrating a progression of general processing stages in a classification process as in FIG. 1-1(B), shown with certain optional stages incorporated according to an exemplary embodiment of the present invention;

FIG. 1-3(A) is a flow diagram illustrating a progression of processing stages in the training process of FIG. 1-2(A), shown configured for an exemplary application according to an exemplary embodiment of the present invention;

FIG. 1-3(B) is a flow diagram illustrating a progression of processing stages in the classification process of FIG. 1-2(B), shown configured for an exemplary application according to an exemplary embodiment of the present invention;

FIG. 1-4(A) is a flow diagram illustrating a partial multi-stream progression of processing stages in a training process configured for an exemplary application according to an alternate embodiment of the present invention;

FIG. 1-4(B) is a flow diagram illustrating the partial multi-stream progression of processing stages in the training process of FIG. 1-4(A) with the multi-stream progression extended to additional processing stages according to another alternate embodiment of the present invention;

FIG. 1-5(A) is a flow diagram illustrating a partial multi-stream progression of processing stages in a classification process configured for an exemplary application according to an alternate embodiment of the present invention;

FIG. 1-5(B) is a flow diagram illustrating the partial multi-stream progression of processing stages in the classification process of FIG. 1-4(A) with the multi-stream progression extended to additional processing stages according to another alternate embodiment of the present invention;

FIG. 1 is a flow diagram schematically illustrating the flow of processes for training a system to distinguish sources of acoustic signals in accordance with an exemplary embodiment of the present invention;

FIG. 2 is a flow diagram schematically illustrating the flow of processes for classifying an acoustic signal received by a system trained such as illustrated in FIG. 1, in accordance with an exemplary embodiment of the present invention;

FIG. 3a is a set of comparative confusion matrices of certain test results obtained for illustrative purposes utilizing a system formed in accordance with the exemplary embodiment illustrated in FIGS. 1 and 2;

FIG. 3b is a set of comparative graphic plots of certain test results illustratively demonstrating an optimal sub-segment length parameter employed in a system formed in accordance with the exemplary embodiment illustrated in FIGS. 1 and 2;

FIG. 4a is a set of illustrative graphic SVM plots of certain test results obtained for distinguishing between sources of speech segments utilizing a system formed in accordance with the exemplary embodiment illustrated in FIGS. 1 and 2;

FIG. 4b is a set of illustrative ROC curves derived from certain test results obtained for illustrative purposes utilizing a system formed in accordance with the exemplary embodiment illustrated in FIGS. 1 and 2;

FIG. 5a is a set of illustrative graphic plots comparing certain test results obtained for distinguishing between sources of speech segments utilizing a system formed in accordance with the exemplary embodiment illustrated in FIGS. 1 and 2;

FIG. 5b is an illustrative graphic SVM plot of certain test results obtained visually indicating acoustic anomalies in speech segments received by a system formed in accordance with the exemplary embodiment illustrated in FIGS. 1 and 2;

FIG. 6 is a set of schematic diagrams illustratively representing a segment of acoustic data and an example of a log power spectrum corresponding to a segment of acoustic data;

FIG. 11 is a set of comparison matrices of certain test results obtained utilizing a system formed in accordance with the exemplary embodiment illustrated in FIGS. 1 and 2, showing the distribution of classification votes relative to known sources;

FIG. 17b is a comparative confusion matrix corresponding to the sample test results of FIG. 17a obtained for illustrative purposes utilizing a system formed in accordance with an alternate embodiment of the present invention;

FIG. 20a is a graphic plot of illustrating the preservation of accuracy with a training process based on certain portions of wing image data segments for the taxonomic distinction thereof utilizing a system formed in accordance with an alternate embodiment of the present invention;

FIG. 20b is a set of comparative confusion matrices corresponding to sample test results illustratively obtained for taxonomically distinguishing wing images of different subgroups within common insect species, utilizing a system formed in accordance with an alternate embodiment of the present invention;

DETAILED DESCRIPTION OF THE PREFERRED EMBODIMENTS

Briefly, the subject system and method serve to taxonomically distinguish the source of certain unconstrained signal data segments, and do so in context-agnostic manner. That is, the system and method serve to adaptively discover the discriminating attributes common to signal data segments originated by or through the same source, such that they may be used to identify and classify the source. A source as used herein may include: the actual generator/emitter of the signals in question, the subject defined by the signals in question, the target or other distinct cause of modulation on the signals in question, and the like. Examples of such sources include among various others: individual speakers emitting acoustic signals as audible speech or various other sounds; differing types of terrain or other textured surface for which relief data is captured; organisms for which image data is captured.

In certain embodiments and applications, the system and method provide for taxonomic distinction of sources without regard for the actual payload, or data content, of the signal data segments captured for those sources. The taxonomic distinction is reliably carried out even if the captured signal data segments are unconstrained in the sense, for instance, that the information carried thereby is not subject to any requisite form, pattern, or other constraint. Consequently, identification and classification of the signals/sources may be reliably made without regard to any context-specific information delivered by or through the captured signal data segments, such as quantitative values, semantic content, image content, digital encoding, or the like.

The general processing architecture preferably implemented by the subject system and method is demonstrated to be effective in taxonomically analyzing a wide variety of datasets. Different data types encountered in different applications may be accommodated by employing appropriate pre-processing in order to render the mode of data collected into organized data vectors that may then be subjected to the general processing architecture.

Figure 16:
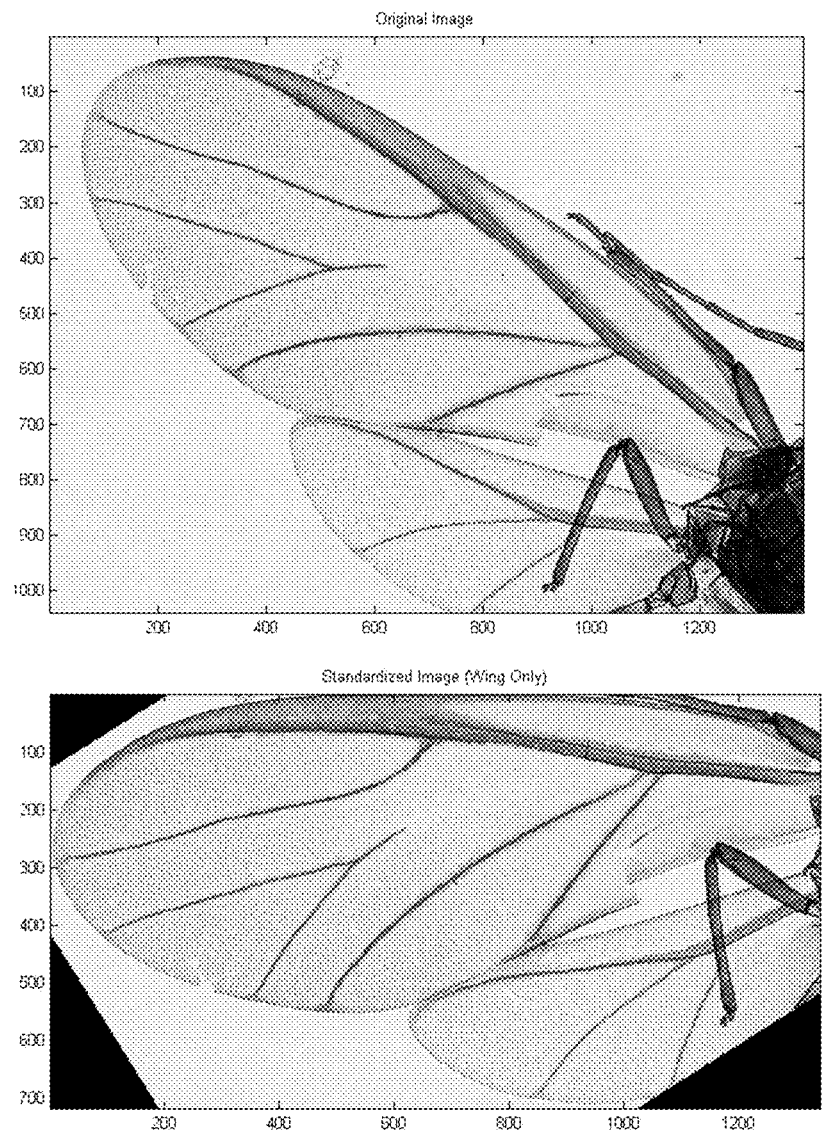
FIG. 16 is a pair of photographic images of an insect wing before and after certain pre-processing of image data in a biologic application example for taxonomic distinction of the image data utilizing a system formed in accordance with another alternate embodiment of the present invention.

The taxonomic processing scheme carried out by the subject system and method preferably includes in certain particular embodiments:

1. Pre-processing captured data segments as necessary to achieve quasi-uniform data vectors (1D, 2D, or otherwise).
2. Applying a spectrogram over the range of data vectors to produce either Fourier or Power Spectral Density (PSD) information. Preferably, log power data with the spectrogram parameters optimized to yield a predetermined number of feature vectors (manageable in view of the processing, storage, and other resources available for the particular application intended) for the given dataset.
3. Applying GAD or other simultaneous sparse approximation (SSA) to the raw data vectors and/or the FFT/PSD transformed data vectors in order to reduce each of set of data vectors to a relatively constrained number of atomic features and parameters.
4. From the available set of SSA reduced data, forming a set of feature vectors over which to optimize mutual discrimination (separation) between distinct sources (classes) of the captured data segments. Such feature vectors may include vectors of amplitude parameters for each atom, or vectors of other parameters that describe the atom (such as phase, position, scale, modulation, etc.)
5. Performing pair-wise optimization of separation spaces by selecting two of the available feature values for each pair-wise combination of classes. Preferably, this is accomplished by selecting the best linear (or other) separation of respective values plotted in the plane for each pair-wise feature choice and choosing the separator and pair of features most accurately separating the greatest number of points (or percentage of points or other suitable weighted decision comparison metric), one class from the other (such as illustrated in FIG. 16).
6. Forming a voting matrix as described in following paragraphs, and illustrated for example in FIG. 11. The voting matrix may comprise a single feature pair for each class separation, or a sum of multiple feature pair votes.
7. Classifying each novel data segment according to the combined votes of each feature pair and each representative sub vector associated with the novel data segment into one of the available classes or into a null space.

Additionally, other pairs of features by which to separate pair-wise combinations of classes may be found. A voting matrix for multiple feature or data sub-types may be formed. For example, phase and amplitude, amplitude of the raw GAD atom, or amplitude of the log PSD GAD atom, etc. may be found. Combinations are easily realized under this scheme by summing across voting matrices. It will be obvious to those skilled in the art that employing multiple independent data measures may often improve detection, classification, and auto-separation accuracies.

As used herein, "training data" typically comprises several subgroups with known "ground truth" values. That is, it is known for each training dataset which class the dataset truly belongs to. This is broadly termed a "supervised" learning scenario, since a priori knowledge is used to train the given system. However, it should be noted that such "ground truth" values may be produced using "unsupervised" learning scenarios. For example, one may perform operations such as Cluster Analysis or Principal Component Analysis (PCA), or may employ non-linear dimensionality reduction (DR) methods including Kernal PCA, Laplacian Eigenmaps, Local Linear Embedding, and others known in the art to discover emergent clusters within the training data. Thus truth values may be suitably assigned to each data point automatically. Note that combinations of these methods may also be used independently and without conflict in certain embodiments of the subject system and method.

In the various exemplary embodiments and applications disclosed herein, a signal may be measured and characterized for purposes of processing to generate a representative vector of predetermined form. Such a vector as used herein may comprise any suitably ordered set of information, in any suitable number of dimensions. Various examples include a time series, a list of Fourier coefficients, a set of estimated parameters, a matrix of values, an image segment, a video sequence, volumetric data, data sampled along a defined n-dimensional surface, and so forth, or any data structure including combinations thereof.

Figure 1:
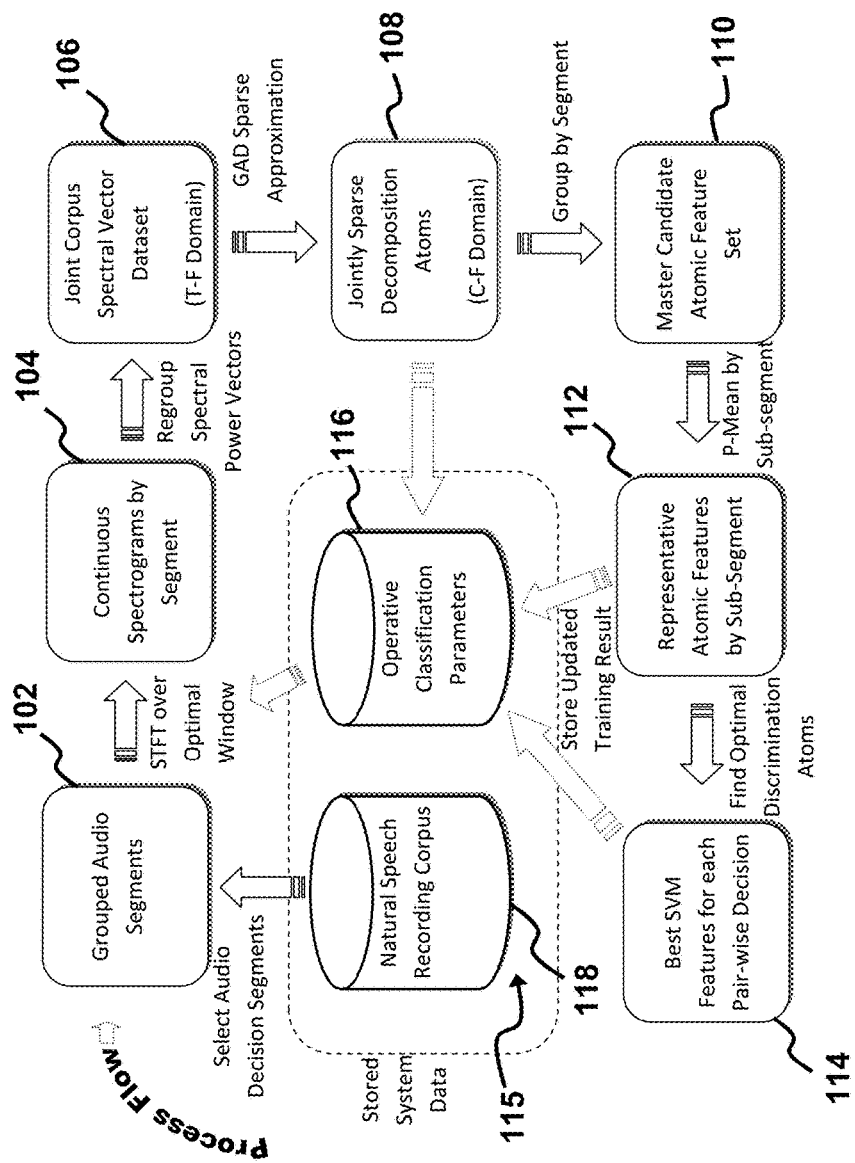
FIG. 1-1(A) is a flow diagram illustrating a progression of general processing stages in a training process executed according to an exemplary embodiment of the present invention.
Figures 1, 1A:
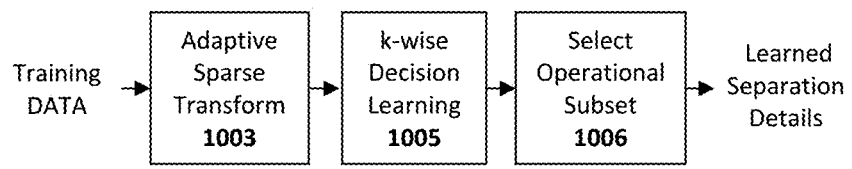

FIG. 1-1(A) more generally illustrates the progression of certain general steps in the training processes further described herein for exemplary embodiments in various application examples. A set of training data is transformed at block 1003 using an adaptive sparse transformation to produce representative information that collapses key distinguishing aspects of the training data that may be used to group or separate sets of datum into a relatively small set of descriptive measurement coefficients. These coefficients are used in combinations to produce a decision system optimized for each permutation of sets of m such coefficients for each set of k classes of distinction.

In the exemplary embodiments described in following paragraphs, m is set to two, thus considering the combined effect of coefficients in pairs; and, k is set to two, thus producing "pair-wise" decisions among each possible pair of classes within a larger decision space. Such setting of m and k to pair-wise values tends to maximize computational speed, and is made possible by the effectiveness of the specific adaptive sparse transform in collapsing discriminating information in to only a few dimensions of numeric values. However, any value of k and m may be used, either singly or in combination with other values of k and m (for different iterations, different datasets, or the like), to produce k-wise decision systems. The tradeoff bearing on the value selected for m is typically between computational speed vs. increased flexibility in creating a decision surface introduced by higher degrees of freedom. The tradeoff bearing on the value selected for k is typically between the number of classifiers produced and the computational complexity of creating multi-way decisions.

Each such k-wise decision system in block 1005 comprises a set of decision criteria based upon one subset of m sparse coefficients generated at block 1003 for one subset of k class choices. For purposes of illustration, the exemplary embodiments disclosed herein employ a support vector machine (SVM) type classifier, wherein training points are scattered in an m-dimensional space, and a hyper surface of m-1 dimension is estimated for separating the most points of one class from another. With k=2, pair-wise separation results, and the preferred surface is a hyper plane. With m=2, the SVM space is 2-dimensional, such that the separation surface is a line between groups of points scattered in the plane (as further addressed in following paragraphs). Numerous other learning mechanisms known in the art may be employed in place of the SVM classifier, with each decision system trained at block 1005 producing a decision between two or more possible classes on the basis of one or more possible sparse transform coefficient.

The term support vector machine, or "SVM," as used herein refers to a class of methods known in the art by which data points are embedded in a feature space of m dimensions, and a hyper surface is constructed to optimally divide the data classes of interest. A "support vector" generally refers in this context to the set of data points of each class that tends to best define the boundary between two or more classes. Features of an SVM include a significant reliance on these border points in finding decision boundaries between classes. This is in contrast to other machine learning methods, which may be utilized in alternate embodiments within the classification block 1005, that give preference to the structure and distribution of data points within the interior of class clusters. A decision boundary hyper surface obtained via an SVM may be of any shape, though it is generally understood that a smoother shape will tend to regularize the classifier and better abstract general results at the cost of some outlier points (obtained from training data) in each class being allowed to fall on the wrong side of the classification surface. A "flat" hyper-plane is used in certain exemplary embodiments. Such surface may be substituted with any other suitable reference surface (such as curved complex or multi-part surfaces). It is also understood in the art that transforms acting on feature vectors may act to re-project the feature vectors so in a fashion that renders one classification surface (e.g. a hyper plane) on the new vectors substantially equivalent to another more complicated surface with the original feature vectors.

Various measures for selecting a decision surface in view of a given set of training points are known in the art. Such measures range, for example, from determining an optimal surface based upon the support vector in a $L^2$ (least-squares) sense or an $L^1$ sense, to determining a surface based on the convex-hull of hyper-spheres placed around each data point. In certain low dimensional cases, the various exemplary embodiments and applications disclosed herein may employ sub-optimal yet computationally-fast exhaustive testing of candidate linear separations in a support vector region. The present invention is not limited to any particular measure employed for determining the decision surface.

A typical decision surface partition effectively separates the given data-space into two 'half' spaces, corresponding to two categories of interest. It is feasible to segment the space into more than two regions where necessary in alternate embodiments and applications. For example, if three classes (A, B, and C) are considered, they may all be projected into the same feature space, and a complex boundary surface may be derived which segments the data-space into three pieces rather than two. This division concept may be visualized as lines dividing a plane, but the shape of the decision surface may be otherwise, for example, in the form of one or more closed ovals around local clusters of data points. Linear decision surfaces and bi-section of spaces are preferably used in the exemplary embodiments disclosed primarily to obtain computational speed. A described herein, a voting system may be constructed that enables reduction of any number k of classes to a collection of pair-wise classifiers for operational purposes.

Once this set of k-wise decision systems has been trained at block 1005, an operational subset of the systems is selected at block 1006 to be used subsequently for classification purposes. This is done by ranking the k-wise decision systems according to which yields the strongest discrimination between classes, and combining those of high rank using a joint decision mechanism such as the voting system described in following paragraphs for different exemplary embodiments in different application examples. The combination of high-performing k-wise decision systems giving optimal overall performance is thereby determined. In practice, a tradeoff between accuracy of performance and the number of such k-wise decision systems employed must be made to keep the processing load within manageable limits in the final system. Each classification requires a certain computational load when applied, so the fewer the required decision operations, the more computationally efficient the processing will be.

In accordance with certain aspects of the present invention, a relatively small subset of k-wise decision systems may be used which, when combined, produce very high accuracy. In the exemplary embodiments described herein, this is enhanced by the application of a specific adaptive sparse transform which serves to concentrate the available information. Thus, each pair-wise classification by sparse coefficients, for example, may provide sufficient accuracy in itself, that only a few such pair-wise classifications in combination may provide extremely high accuracy.

The results of the learning steps are stored as learned separation details. This typically includes information relative to each step of the method. Such information as which adaptive sparse projection coefficients were employed, and which k-wise sets of these coefficients are effective for which classes of training data separation, are preferably stored.

Figures 1, 1B:
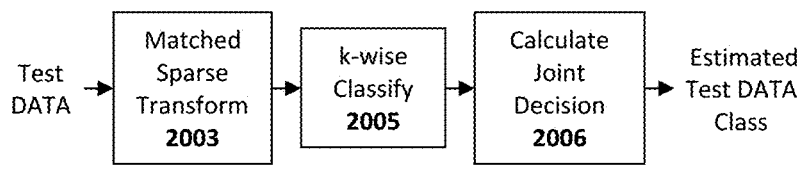

FIG. 1-1(B) illustrates the progression of certain general steps in applying the learned decision criteria in the classification processes further described herein for exemplary embodiments in various application examples. Test data, comprising one or more vectors sampled in a manner structurally consistent with the training data, enters consideration at block 2003. Test data may comprise any single data sample or a set of data samples to be classified. Typically, this is 'new' data not used explicitly for training the system; however, sets of previously used training data may also be input for classification as a means of validating the performance of the system as discussed below.

At block 2003, a matched sparse transform is performed, by which each raw data sample is projected onto the sparse sub-space found to be of significance for decision making during the training stage illustrated in FIG. 1-1(A). The information needed to make such projection is typically loaded from the stored information from the training phase. The particular nature of the recorded information will vary according to the adaptive sparse separation method employed. For example, in certain embodiments this may include a specific set of vectors against which an inner product is taken with the test data. In certain other embodiments the test data may be projected onto a collection or range of vectors considered to form an equivalence class by the initial adaptive sparse transform of block 1003. Yet in other embodiments a more abstract comparison measure may be extracted, such as for example the phase of a complex projection rather than its amplitude coefficient. In still other embodiments a function of such sparse adaptive transform may be used.

The matched sparse transformation carried out at block 2003 in certain exemplary embodiments includes much the same steps as those of the adaptive sparse transformation carried out at block 1003, except that the test data is added into the training data set. The adaptive selection is thereby re-biased accordingly.

Upon projection of the test data by a matched sparse transform at block 2003, each test data sample is represented by a collection of abstract descriptive measurement coefficients. These measurement coefficients are preferably rendered in a space of parameters matched to that generated in block 1003 and therefore amenable to the classification tests learned in block 1005. The coefficients are applied at block 2005 as inputs to the set of k-wise classifier systems constructed during training process at block 1005 and down selected at block 1006. Each set of descriptive measurement coefficients matching the coefficients selected during training is used to form a set of k-wise class decisions on each test data sample. The k-wise class distinctions are then combined, and the joint information is used to make a final class determination at block 2006 for each test data sample point. The results are included in an "Estimated" class of the test data.

Figures 1, 2, 2A:
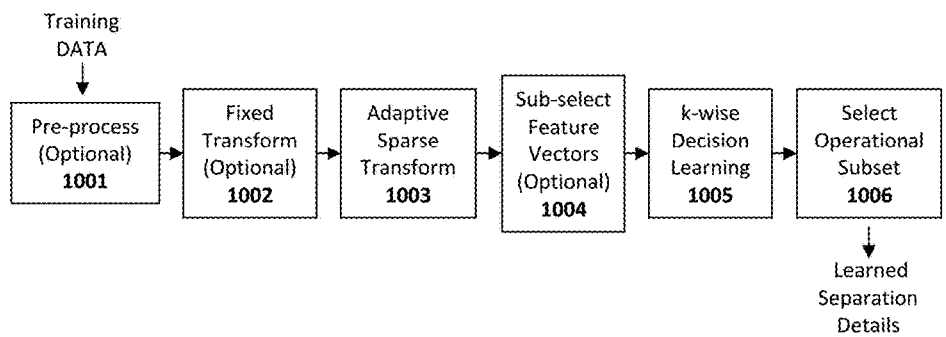

FIG. 1-2(A) illustrates the progression of steps shown in FIG. 1-1(A), with certain optional steps which may be inserted to configure the training processes in alternate embodiments, depending on the particular requirements of the intended application. A set of training data may be pre-processed at block 1001 to place the raw training data into a format that better enables its comparison with other such data in a quasi-consistent fashion. This step is optional, as the training data may already be inherently consistent or may already be pre-conditioned or pre-processed before it is received at block 1001. Examples of the pre-processing which may be employed include following. In audio applications where the training data includes radio frequency (RF) or other one dimensional sensor waveform data, the system may normalize amplitude, apply dynamic range compression, or take other such measures to standardize the amplitude range. In various embodiments, the training data may also be pre-filtered to remove known noise sources. If the data is continuously recorded, sub-sections of interest may be variously parsed from the data in finite sections of similar length, or may otherwise be extracted by using a moving window, by energy trigger gating, or other such measures known in the art.

In imagery applications, terrain or other two dimensional training data, as well as higher dimensionally indexed data streams, may be similarly pre-processed as with the one dimensional training data. In addition, the data may be segmented by its canonical dimensions, for example by selecting only rows, or only columns of its components (such as pixel values in an image frame). The data may also be segmented along various other principal directions, regions, or the like derived either algorithmically or by a priori decision. The data may be masked to preclude extraneous sub-regions known to have no bearing to the class decision.

In applications where the training data is normally vector valued, pre-processing steps may be taken to normalize dynamic range across different dimensions of measurement. Other pre-processing steps may be taken (such as dimensionality reduction (DR)) to discover emergent combinations of the dimensions. As illustrated in FIG. 1-3(A), the net result of such pre-processing steps 1001 in an exemplary embodiment is a set of Quasi Uniform data that may be more readily processed by the remainder of the system.

At block 1002, the quasi-uniform data is optionally subjected to a fixed transform. This may comprise any suitable method known in the art sufficient to re-distribute information based on its mathematical projection on a pre-established set of measurement vectors. For example, a Fourier transform, accomplished by projection on an orthogonal basis of sine and cosine functions, may be employed herein (computed, for example, via an FFT). Transformation alternatively to a wavelet basis, a Z transform, a Hough Transform, linear or non-linear projection, change of basis, or any other suitable reference frame may be made to produce a set of coefficients relative to a fixed set of vectors (orthogonal or otherwise). While the transform applied at block 1002 is preferably is fixed (that is, consistent in transformation scheme irrespective of the data), it may alternatively be of a adaptive transform type which adapts in transformation scheme to the data.

The purpose of the Fixed Transform at block 1002 is to change the measurement space of the training data in a way that either: (a) better captures features of intrinsic interest, or (b) provides further diversity in the set of measured information upon which the learning system can capitalize. Depending on the requirements of the particular application intended, the raw training data may be used without any transformation, while in others a fixed (or adaptive) transform is applied, and the information obtained thereby combined even with information obtained from the use of raw data to make joint information based decisions.

To illustrate the use of the Fixed transform to aid in selecting features of intrinsic interest, consider the disclosed speech processing application described in following paragraphs. Cepstral coefficients formed by taking the Fourier transform of the log of the power spectral density (PSD) of the given training data, are useful in distinguishing aspects of human speech. Thus, a fixed transform is preferably applied in that application which comprises an FFT followed by the log of the absolute value of the coefficients to form the log PSD. By combining this with an adaptive transform (at block 1003) that includes within its dictionary localized Fourier elements, the resulting sparse approximation space serves as an extension of the cepstrum concept.

Next, consider the terrain processing application described in following paragraphs. An FFT (in particular, the PSD) in harmonic analysis is known to sacrifice positional information in favor of frequency information. If terrain texture is of interest, the locations of specific undulations may be of no interest, as it may only matter that the undulations are present. Use of the transform in that context then makes intuitive engineering sense. A similar situation may be presented in the speech context, where the goal may be to distinguish one speaker from another, and it may not be important when they were speaking, just that they were doing so somewhere during the interval analyzed. Other applications may warrant similar use of a suitable fixed transform to aid in efficiently selecting measurement spaces of interest.

The terrain classification and insect wing identification application examples disclosed herein illustrate further the use of a fixed transform for diversity. That is, information learned from processing based on the raw data is combined with information learned from on fixed-transformed data to make a decision based on their joint, quasi-independent measurement spaces.

At block 1003 of FIG. 1-2(A), an adaptive sparse transform is applied to either the raw data or the fix-transformation of the raw data, or in certain embodiments to combinations thereof (as indicated by the "Augmented Data Vector Set" of FIG. 1-3(A)). Block 1003 produces a representation of this input set in an adaptively constructed sparse subspace. Its output comprises representative information that collapses key distinguishing aspects of the training data which may be used to group or separate sets of datum into a relatively small set of abstract descriptive measurement coefficients. While the exemplary embodiments disclosed herein employ the GAD approach in this regard, other suitable approaches may be taken to carry out the adaptive sparse transform. Such other approaches include the use of the PCA and DR class of processes noted in preceding paragraphs, as well as signal processing concepts like sparse or compressive sensing.

Another optional step is indicated at block 1004, where the output vectors from block 1003 are sub-selected to form a reduced set of candidate feature vectors before the k-wise decision learning is carried out at block 1005. The purpose of this optional step 1004 is to reduce unnecessary computation in block 1005 by reducing the number of candidate feature permutations to be tested. In particular, there are numerous implementations of the adaptive sparse transformation 1003 that will produce an inherent ranking order of the significance of each dimension of the sparse subspace. Thus, each successive iteration of GAD or other greedy methods, for example, may produce coefficients of lesser significance than others that may have already been found. This may be true of various Eigen system based linear methods, where coefficients may be iteratively ranked by their Eigen values. One may comfortably truncate a long series of coefficients with confidence that most of the information will be retained in the first few dimensions. Where the sub-selection of block 1004 does not include measures to produce ranking, reduction may still be accomplished either by creating a secondary ranking model, or in certain embodiments even taking random trial subspaces.

The sub-selection of block 1004 may also take the form of choosing from amongst available parameters of measurement. For example, in a GAD approach using certain dictionaries, each adaptively selected subspace element is mapped to each source training data vector by phase, position, and scale information as well as the more fundamental amplitude coefficient. Any of these parameters may be utilized to form the measurement space in which to construct feature vectors. Other sparse approximation methods include linear and non-linear processes which produce other derived measurement spaces that may be employed in place of the measurement space derived from raw coefficients. Whether or not the feature set from block 1003 is reduced by the sub-selection of block 1004, the output includes a set of candidate features then used to train sets of k-wise classifier systems in block 1005.

Figures 1, 2, 2B:
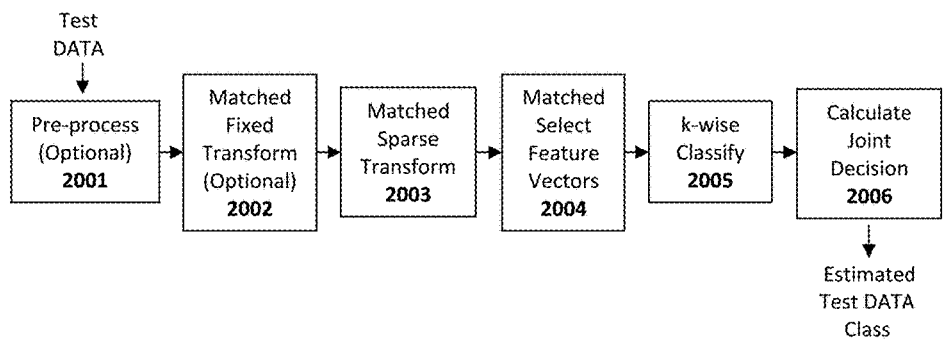

FIG. 1-2(B) illustrates the progression of steps shown in FIG. 1-2(A), with certain optional steps which may be inserted to configure the classification processes in alternate embodiments, depending on the particular requirements of the intended application. A set of test data may be pre-processed at block 2001 much as described above for block 1001, with the qualification that certain aspects of pre-conditioning at block 2001 must be kept consistent with the pre-conditioning of the training data at block 1001. For example, any pre-processing steps for dynamic range adjustment, sub-sampling, segmenting, masking, dimensionality reduction, and so forth on the data occurring at block 1001 during training are likewise repeated at block 2001 on the test data.

Block 2002 similarly corresponds to block 1002 of the training processes. Any fixed transform step applied at block 1002 during training is likewise applied to the test data at block 2002. The measurement space obtained at block 2003 is then matched to that of the training set. Where multiple transforms are employed, or where raw data is combined with transformed data, the combined measurement space obtained for them during training is repeated for classification. At block 2004, the selection of feature vectors are matched by sub-selecting in a manner consistent with that performed at block 1004 during training. For example, this may be achieved by storing the precise subspace selected in 1004 and re-applying the subspace at block 2004. Certain criteria may be stored in alternate embodiments, so that the criteria may be repeated at block 2004 during classification.

FIG. 1-3(A) shows the progression of training steps of FIG. 1-2(A), with certain stages of processing specified in more detail according to an exemplary embodiment configured for various application examples. Also specified in more detail is the nature of data produced at each stage of processing. At block 1001, a quasi-uniform set of data is generated by applying pre-processing on the raw training data. Block 1002 produces an augmented set of data vectors via one or more pre-established fixed transforms of the quasi-uniform data. The augmented data vector set may include raw training data, one or more fixed-transform results based on such raw training data, or any combination thereof.

Block 1003b produces sparsely approximated structure data from the augmented vector data set. In this particular embodiment, a Simultaneous Sparse Approximation engine (SSA) (an example of which is among the GAD methods referenced herein) is employed. The SSA in particular considers together either all or certain multi-member groups of the augmented data vectors to discover joint information content and represent the same in manner within a compact subspace of resulting approximations. The SSA operates to collapse information that is shared by more than one signal into a relatively few coefficients, whereby discrimination decisions amongst members of a large set of data may be subsequently made based upon only a few adaptively derived parameters for each member. For convenience, the output of this block 1003b is generally referenced as the "SSA set."

Block 1004 as described with reference to preceding FIGS. 1-2(A) and (B) and 1-3(A) and (B), operates to further reduce the output of block 1003b to a set of candidate feature for consideration at block 1005b. In this particular embodiment, block 1005b makes use of an SVM type classifier, as described in connection with the application exampled disclosed herein. The output of block 1005b includes a set of k-wise separation spaces which map a set of m candidate feature vectors associated with one instance of training data to a decision between k different classes. Each of these spaces represents a simple independent classifier system.

The candidate feature vectors in certain embodiments may in fact comprise a list of scalar values, one for each sparse approximation coefficient above a cutoff ranking. Each sample or instance of training data may be represented then by a specific vector of such candidate coefficients. All possible pairs (m=2) of scalar feature values within the candidate vectors are tested for their ability to distinguish between classes. In the disclosed embodiment, a linear separation model is used, taking only two classes at a time (k=2). Thus, if there are three classes (A,B,C), the classification problem reduces to a set of pair-wise decisions taking (A vs. B), (A vs. C), and (B vs. C). For each of these pairings, a separation line is calculated which best separates their point clusters in a 2-D subspace. The set of candidate features and the parameters of the resulting separation line describe the parameters necessary to form a reproducible classifier. In the given embodiment, this would establish a set of k-wise separation spaces.

At block 1006, an operational subset of the k-wise separation spaces is selected by which to classify newly-acquired data once system training is complete. Those k-wise separation spaces determined to be the most effective at discriminating between classes are selected. Typically, multiple k-wise separation spaces are combined, with each individual separation space having been determined the strongest at separating a particular k-wise pairing of classes. This selection operation 1006 may be generalized in certain embodiments to include considerations of k-wise separation spaces generated by any number of independent processing streams and combining them into a joint decision space.

FIG. 1-3(B) shows the progression of classification steps of FIG. 1-3(A), with certain stages of processing specified in more detail according to an exemplary embodiment configured for various application examples. Also specified in more detail is the nature of data produced at each stage of processing. The blocks 2001, 2002, and 2003 produce a stepwise chain of results based on the test data that is similar to that produced by corresponding blocks 1001, 1002, 1003b of the training process illustrated in FIG. 1-3(A). As described in connection with FIG. 1-2(B), each of these stages is preferably kept consistent with these corresponding stages during the training process of FIG. 1-3(A). At block 2001, a quasi-uniform set of data is generated by applying pre-processing on the raw test data. Block 2002 produces an augmented set of data vectors via one or more fixed transforms (matching that of the training process) on the quasi-uniform data. As in the training process, the augmented data vector set may include raw training data, one or more fixed-transform results based on such raw training data, or any combination thereof.

Applying at block 2003 a sparse transform matching that of the training process (SSA) results in the construction of Test S Sets which are directly comparable feature by feature with the SSA Sets established during training. At block 2004, Test S Sets are down selected so that the final feature vectors match precisely those selected as the strongest (most discriminating) for classification purposes at block 1006 of the training process.

At block 2005, the SVM or other suitable classifier engine is executed on the matched feature vectors generated at block 2004 to obtain extremely fast computation of the required comparisons. Preferably, each feature vector is simply mapped into each k-wise separation space to determine the k classes in which it belongs. A set of votes is thereby collected as to which class each member of the test data set at this stage belongs. These k-wise separation votes are automatically combined at block 2006 to yield a joint decision indicating the distinct class to which each test data sample is estimated to belong.

In the application examples disclosed herein, m=k=2. Each decision, therefore, is based on two features to place each member of the test data set into one of two paired classes. In these example applications, a voting scheme is preferably employed, which as described in following paragraphs allows the summing of results from any number of classifiers in order to produce a decision based on their joint information. In certain cases, the test data member may be placed in a "null" class, indicating its lack of sufficient consistency with any of the distinctly learned classes to deserve membership therein. In the degenerate case involving only two classes, such voting may be unnecessary; however, since joint information from multiple k-wise separation spaces may yield better accuracy than any individual k-wise separation space, such voting process tends to serve a meaningful role in many, though not necessarily all, embodiments and applications of the present invention.

FIG. 1-4(A) illustrates in greater schematic detail the progression of training steps of FIG. 1-3(A), with the processing of multiple quasi-independent processing of training data segments according to an exemplary embodiment configured for various application examples. More specifically, the different training data segments 0-N are sampled by any number of independent methods, employing similar or different pre-processing 1001 for each. Respective fixed transforms 1002 may be applied for certain of the data segments (such as for segments 1-N) and not applied for certain other of the data segments (such as for segment 0). The resulting data sets for the segments are then passed for adaptive sparse transformation at block 1003b, which produces a collection of SSA Sets 0-N. In this embodiment of FIG. 1-4(A), the SSA Sets 0-N are processed jointly at block 1004 to down-select a candidate set, which is thereafter processed at block 1005b to create k-wise separation space classifiers. At block 1006, an operational subset of the resulting classifiers is selected to produce the most accurate results with the least trade off in terms of computational complexity and/or such other countervailing factors encountered in actual practice. The classifiers of this selected subset collectively establish the learned separation spaces.

FIG. 1-4(B) illustrates an alternate embodiment for a portion of the training process of FIG. 1-3(A) for maximizing the independence of training and facilitating ad hoc construction of joint information classifier systems. In this version of the training process, rather than processing the SSA Sets 0-N jointly in selecting feature vectors from the SSA Sets 0-N produced by adaptive sparse approximation 1003b, each SSA Set 0-N is independently processed to: down-select candidate feature vectors therefrom (at blocks 1004), train corresponding k-wise separation spaces (at blocks 1005b), and select an optimized subset of the obtained k-wise classifiers (at block 1006). The resulting information is then combined and jointly analyzed at block 1007 to select the strongest joint decision criteria for subsequent use in classifying newly acquired data segments.

The training process example shown in FIG. 1-4(A) illustrates the advantage of combining information from ostensibly different SSA Sets within each k-wise separation space. This may reveal relationships that may not be evident from processing each SSA Set independently, and in certain cases result in more compact or better performing joint classification systems. Conversely, the modified training process example shown in FIG. 1-4(B) illustrates how the classification systems for each SSA Set may nonetheless be tested and optimized independently, to preserve the flexibility and versatility of combining the classification systems thereby obtained in ad hoc manner to build new systems based on their joint information.

Examples by which each processing stream (for a data segment) may be varied to suit the specific requirements of particularly intended applications are numerous. While FIGS. 1-5(A) and 1-5(B) illustrate the case where raw and fixed transform data are utilized in separate processing streams, the processing streams may also be varied in the type of fixed transform applied. For example, a processing stream for one data segment may apply a 2D wavelet decomposition, while the processing stream for another data segment may apply a series of 1D FFTs. The processing streams may also be varied by the pre-processing steps they apply. For example, the processing stream for one data segment may sample all the data, while the processing stream for another data segment only samples the horizontal rows of data. Furthermore, the processing stream of yet another data segment may only sample data at a first dynamic range, while the processing stream of another data segment samples data at a second dynamic range. Streams may be varied as well in their implementation of the sparse adaptive transform and choice of classifier learning types. These and other such processing and parametric variations may be suitably implemented depending on the specific requirements of the particular embodiment employed and application intended.

In parallel with FIG. 1-4(A), FIG. 1-5(A) illustrates in greater schematic detail the progression of classification steps of FIG. 1-3(A), with the processing of multiple quasi-independent processing of test data segments according to an exemplary embodiment configured for various application examples. In parallel with FIG. 1-4(B), FIG. 1-5(B) illustrates an alternate embodiment for a portion of the classification process of FIG. 1-3(B) for maximizing the independence of training and facilitating ad hoc construction of joint information classifier systems.

Each of these FIGS. 1-5(A) and 1-5(B) parallels the single-stream classification processing illustrated in FIG. 1-3(B) by introducing the corresponding classification of test data on multiple segment streams derived from the same Test data. Thus each processing stream of FIG. 1-5(A) operates through stages 2001, 2002, and 2003 individually according to the processing stages in the single-stream classification process, but the results from the multiple processing streams combined at block 2004 for joint decision making via blocks 2004, 2005, 2006, and 2007. In the alternate embodiment of FIG. 1-5(B), rather than processing the SSA Sets 0-N jointly in selecting the matched feature vectors (relative to the training process) from the SSA Sets 0-N produced by adaptive sparse approximation 2003, each SSA Set 0-N is independently processed in this regard, as indicated by the respective blocks 2004. Each processing stream of FIG. 1-5(B) will continue operating on the individual SSA Sets 0-N applying the independently determined parameters established by the training process as illustrated in FIG. 1-4(B), then combining them at block 2006 to form a single joint voting matrix from which a joint decision is made at block 2007.

Again, this independence of processing streams allows advantageous decoupling of processes. In certain cases, single stream processing of different data segments may be accumulated and combined ad hoc after the fact to produce joint decisions. This aspect of the invention may also be employed to fine tune the stages of each processing stream independently. It may also be employed in certain embodiments to pre-process data over time and subsequently "mine" the resulting classifiers for joint information about the source data. Hence, there is no requirement for the processing stage 1006 for training SSA sets to be completed in the training process within any particular time proximity of the joint decision processing stage at block 1007. Nor is there any requirement that processing stages 2005 for classifying new data be completed in the classification process within any particular time proximity of the processing stages 2006 and 2007.

A further advantage offered by this independence of multiple processing streams in certain embodiments is its conduciveness to interim reporting of results. If one processing stream executes faster than another, the option is available to report joint decisions 2007 based only on the classification streams that have completed as of a particular instant in time. The reporting may then be subsequently updated as additional streams complete, with the overall results incrementally improving in accuracy with each interim update of reported results.

It should also be noted that the progression of processing stages illustrated in FIGS. 1-4 and 1-5 do not require any particular sequence of stream processing. That is, in certain embodiments each stream may take place in sequence on a single processor, while in other embodiments each stream may take place in parallel on vector or multiple processors. The recombination of information, whether computed in parallel or sequentially, is essentially equivalent; and, the delays variably introduced in dependant processing steps will be apparent to those skilled in the art.

Application Example: Taxonomically Distinguishing Acoustic Signals

Briefly, the subject system and method in one exemplary application serve to distinguish the source from the unconstrained acoustic signals they emit, and do so in context-agnostic manner. That is, the system and method identify and classify sources of such acoustic signals as audible speech and various other sounds. In certain embodiments and applications, the system and method provide for identification and classification of sources even if the acoustic signals they emit are not subject to any requisite form, pattern, or other constraint. This is without regard to any context-specific information delivered by or through the acoustic signals such as data content, semantic content, embodying language, digital encoding, or the like.

That is not to say that certain shared attributes of a group other than simple voice features, for instance, in verbal speech applications cannot be used for source classification purposes. In fact the distinct sources distinguished by the subject system and method may be classified in any suitable manner required by the particularities of the intended application. For example, in addition to classification by individual speaking voice(s), the distinguished sources may comprise groups of speakers having such shared attributes as common spoken language, common gender, common ethnicity, common idiosyncrasies, common verbal tendencies, common exhibited stress level, and the like may be collectively classified as such. Even such context-specific attributes may be discriminated by the context-agnostic processing of acoustic signal segments carried out by certain embodiments of the subject system and method.

Figures 21A, 21B, 21C:
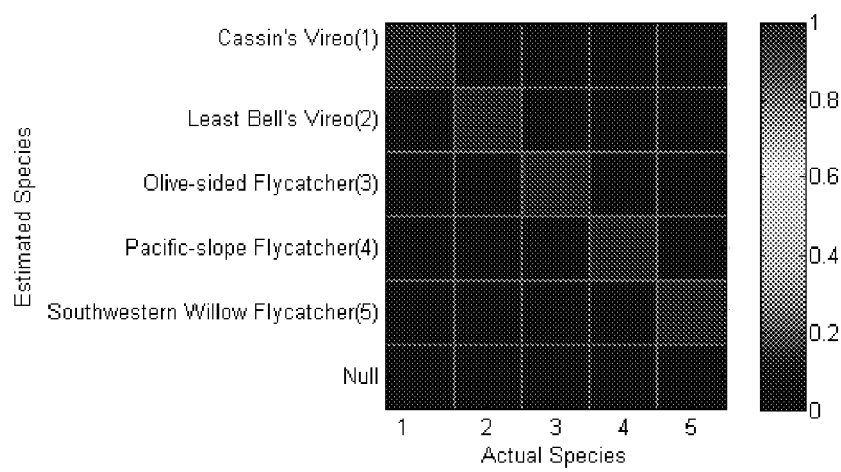
FIG. 21a is a comparative confusion matrix corresponding to sample test results demonstrating taxonomic distinction of natural speech utterances by gender for numerous speakers in three languages utilizing a system formed in accordance with the exemplary embodiment illustrated in FIGS. 1 and 2.
FIG. 21b is a comparative confusion matrix corresponding to sample test results demonstrating taxonomic distinction of natural speech utterances by the language spoken for numerous speakers in three languages utilizing a system formed in accordance with the exemplary embodiment illustrated in FIGS. 1 and 2; and, FIG. 21c is a comparative confusion matrix corresponding to sample test results demonstrating 100% accuracy of taxonomic distinction for a certain species of the calls of desert birds utilizing a system formed in accordance with the exemplary embodiment illustrated in FIGS. 1 and 2.

Examples of test results in this regard are included in FIGS. 21a and 21b, which respectively show a confusion matrix tables illustrating: classification of natural speech utterances by gender for numerous speakers in three languages, and classification of these speakers by the language they are speaking. Such classifications prove increasingly useful, as speech to text and translation systems heretofore known are extremely language dependant. Thus, determining the language of an unknown speaker, for instance, would greatly expand the utility and effectively of even these known systems.

The subject system and method may be embodied for use in numerous applications where one or more sources of unconstrained, even spurious, acoustic signals are to be accurately distinguished. For example, the subject system and method may be implemented in applications such as: identification and classification of speakers without the speakers' cooperation or regard for the language(s) spoken; identification and classification of various animal sounds; identification and classification of various mechanical/machinery sounds; and identification and classification of various other natural or manmade phenomena by the acoustic signals generated by their occurrence.

Depending on the particular requirements of the intended application, a given source may be distinguished by uniquely identifying it, or by classifying it in application-specific manner. In the exemplary embodiments disclosed for speech applications, for instance, the classification preferably entails applications such as:
 (1) categorizing new signals as belonging to one or more groups of already known speakers;
 (2) filtering or sequestering new signals as anomalous and not matching any known speakers;
 (3) automatically clustering a large set of signals from unknown speakers into sorted groups (by speaker, gender, etc.); and,
 (4) automatically segmenting or discriminating portions of one signal (such as captured from a telephone conversation or recorded interview involving multiple speakers) and sorting the resulting segments to accordingly discriminate the speaking parties one from the other.

Preferably in each of these speech applications, the system and method provide the identification and classification of speakers is based on their unconstrained, even spurious, speech segments. The speakers need not be cooperative, let alone even aware of the identification and classification process carried out on their speech. Moreover, the process is preferably context-agnostic in the sense that it operates effectively irrespective of the language spoken (or not spoken) by the speaker.

In certain exemplary embodiments, optimal feature sets are determined for discrimination and comparison between segments of natural speech. Depending on subsequent processing carried out in light of the optimal feature sets, the degree of similarity or newness of a speech segment's unknown source relative to previously indexed sets of speakers may be ascertained. In the absence of prior indexing of known speakers, un-indexed speaker data may be acquired and automatically clustered to form distinct speaker groups. In some applications, transmitted conversations between multiple speakers may be monitored, so that targeted speakers of interest, famous personalities, and the like may be automatically identified. The applications may be extended for such uses as automatically indexing web speaker data, and suitably indexing recorded meetings, debates, and broadcasts.

Once enough speech segments have been acquired and processed, certain extracted feature information may be used to conduct various searches for matching speakers from the unconstrained speech segments in a database query-like fashion. The extracted information may also be used to find similar speech to a given speech sample from an unknown speaker. Similarly, extracted information may also be used to identify the particular language being spoken in the given speech sample.

In certain exemplary embodiments, a sparse-decomposition approach is applied in the processing to identify and classify the speaker(s). Preferably, the acoustic signal is first subjected to a transform, such as a Fourier transform. The sparse decomposition is then applied to the spectrogram resulting from Fourier transform.

For optimal results, sparse decomposition is preferably applied in the form of GAD. Rather than applying GAD to original time domain signals for sparse decomposition is in the time-frequency plane, GAD is applied to the spectrogram generated by Fourier transforming the original signal then taking a log power spectrum. Thus, GAD sparse decomposition is applied to generate a second order spectrum, represented in a "cepstrum-frequency" plane. Various vectors resulting from this "cepstral" decomposition are used with suitable machine learning methods to distinguish different speakers from one another in highly accurate manner, irrespective of what language(s) they may be speaking.

In an exemplary embodiment of the present invention, one or more sparse and simultaneous sparse approximation techniques are applied to the spectrogram data to extract one or more ideal feature sets for undertaking the target discriminations and comparisons. The extracted features are treated and processed accordingly to further reduce the selection set and achieve high-reliability comparisons on natural speech using suitable non-parametric Support Vector Machine (SVM) methods.

Enabling practical searches and automated analyses over large sets of natural speech recordings requires means to separate tagged segments as well as to cluster and associate untagged segments. Component challenges include:
(1) Optimizing a vocal feature set to minimize the size of the vector space for fast processing while maintaining high inter-speaker discrimination rates.
(2) Avoiding reliance on word or phoneme sets so that any available natural speech segments may be handled, and the system may remain independent of language, dialect, or any other speech content.
(3) Operating on speaker recordings that may vary widely in equalization and quality.
(4) Demonstrating robust, unsupervised machine segmentation or severalization of large sets of untagged sound recordings.

In accordance with certain illustrative embodiments of the subject system a method, the commonly used (mel)cepstrum class fixed feature spaces are replaced with an adaptive, sparse-tiling of the cepstrum-frequency (C-F) plane which is obtained using the above-referenced Greedy Adaptive Discrimination (GAD) tools. GAD inherently compensates for signal-to-signal variation in several dimensions, collapsing loosely coherent sample groups into tight joint approximations. This concentrates similarity and difference information in a low-dimensional vector space, which is then rapidly segmented using any suitable non-parametric Support Vector Machine (SVM) approach. By avoiding direct vector space similarity metrics, problems associated with reliance upon distribution estimates of the component and abstract feature quantities are avoided. Processing is also radically accelerated. Preferably, a system formed in accordance with the disclosed embodiment operates on unconstrained, natural speech, without reliance on specific word or phoneme detection, and is substantially language and dialect agnostic.

Test results have demonstrated some 98.75% classification accuracy on an exemplary test database comprising 80 unconstrained internet speech files: sorting 8 speakers, and 10 independent recordings of each. Test results have yielded excellent receiver operator characteristic (ROC) curves for distinguishing between unknown and familiar speakers in newly obtained speech segments. Test results have demonstrated functional auto-clustering of a dataset using a non-parametric approach. They've demonstrated the adaptive C-F feature space disclosed herein to be extremely successful in providing a sparse set of discriminatory elements, as the approach generates very low-dimensional vector subspaces. High-accuracy decisions in the test set were found to typically require only 2 degrees of freedom. The resulting low-dimensional computations and avoidance of explicit distance metrics have led to extremely fast processing in clustering and similarity queries.

Turning more specifically to speech applications, the signature structure of a human voice has long been recognized to stem from the combination of fundamental vocal fold frequencies and resonances of the remaining vocal tract (e.g. formants). These measurable spectral peaks not only play a key and obvious role in the voicing of vowels, but also exhibit speaker-specific dynamics as vowels transition through plosive and fricative phonemes. The center frequency of a voice changes with inflection and other ordinary vocal dynamics.

From a signal processing perspective, viewing the vocal tract as a transfer function or a series of convolving filters yields useful models. In particular, voice recognition may be considered a problem of estimating the state of the vocal tract, given a certain speech signal. The cepstrum which mathematically results from taking a Fourier transform of the frequency log power spectrum, has historically proved a great aid in tackling this de-convolution problem, and variations on so called cepstral coefficients are employed in speech processing schemes. Because cepstrum analysis is linked to the shape and dynamics of the vocal tract, it may serve as a starting point for deriving a feature space that helps measure an individual's inherent characteristic acoustic tone.

Overlaid on the physical vocal tract structure of any given speaker is a second set of characteristic features which are entirely learned. These comprise the language, accent, and speaking idiosyncrasies that together establish typical, repeated patterns through which an individual moves the vocal tract to form phonemes and words. It also includes non-vocal utterances that speakers use as sentence starters or gap fillers (e.g. "um," "uh," etc.), as well as exclamations, laughter patterns, etc. This potential feature set also includes such personal tendencies as inflection and intonation habits.

Generally, the GAD processing architecture discovers signature structure in collections of weakly correlated data and subsequently enables signature detection in complex, noisy, and heterogeneous signal sets. Two fundamental aspects of GAD are that it operates to find joint information about a group of signals and that it collapses the joint information into a relatively small set of significant coefficients that is low-dimensional (i.e. "sparse") in comparison to the vector space of the original datasets.

In application to the problem of distinguishing a speaker (identifying, classifying), GAD is herein combined with certain other processing features to obtain a parametric representation of the data that sparsely tiles the cepstral-frequency (C-F) plane. For example, one embodiment uses suitably customized Support Vector Machine (SVM) type software to down-select and optimize candidate features into definitive signature sets for separating and clustering corresponding voice samples. Structure is added to collected speech segments, and a decision tree is generated for both sorting large speech databases and classifying novel speech segments against previous data.

In this regard, known parametric statistical clustering measures such as Radial Basis Functions and various Kohonen class metrics and learning methods are found to be deficient. Experience and experimentation show that they do not perform well in this feature space. The preferred abstract feature space forms a mathematical frame (a non-orthogonal spanning set with basis-like properties) that is not amenable to re-normalization in a way that is consistent with typical joint statistical distribution assumptions across arbitrary feature subspaces. The exemplary embodiments disclosed preferably employ non-parametric decision trees using subspaces by SVM, yielding excellent results.

This non-parametric approach is not exclusive. Alternate embodiments may be based on anomaly detection work, in which time-dynamics are captured using, for instance, a hidden Markov model. The subject sparse C-F feature space can be applied with metrics as listed in the preceding paragraph. While this approach could be used to address some of the speaker signature characteristics discussed further below, it would also add a layer of assumptions and processing which the preferred exemplary embodiment detailed herein avoids. The preferred exemplary embodiment generally seeks to maximize the actionable information return from each processing step, with the understanding that additional layers may be later added as necessary to refine the system. Results show that the disclosed system has succeeded in capturing speaker signature characteristics and sorting speakers without applying any additional layer yet.

The preferred exemplary embodiment also obviates the use of speech recognition technology such as the parsing of words or phonemes. Based on past studies of speech and human analyst capabilities, use of this technology has not proven effective enough to be essential for accurate speaker identification. Moreover, avoiding phonemic or word-based clustering not only simplifies the processing path, it ensures the system will be language and dialect agnostic.

The exemplary embodiment preferably operates by sub-segmenting short, natural speech samples to produce a cluster of feature vectors for each sample. Typical natural speech samples used in the disclosed system are preferably though not necessarily, 10-15 seconds, while feature vectors are generated with a sub-segment size of preferably though not necessarily, 1-3 seconds. Operating on audio files that contain multiple speakers (such as recorded conversations) proves relatively straightforward using these short segment sizes.

A notable additional advantage of the disclosed system is that it targets natural speech. As such, the system tends to be immune to changes in recording conditions. When test databases are derived from readily available sources—for example, online sites/sources such YOUTUBE—or otherwise derived from any amalgamated set of recordings collected by any suitable means and under various circumstances without unified production management, there is no control over recording quality, environment, or word choices. Preliminary results show a system implemented in accordance with the exemplary embodiment successfully processing such test database files, with the files requiring only minimal, fully automated preprocessing.

It should also be noted that while the disclosed embodiments have been described in the context of natural speech processing, certain alternate embodiments may be configured to accommodate automatic processing of natural utterances by animals such as birds, frogs, etc. This additional application enables, for example, the tracking and identification of either sounds made by certain species or sounds made by individual animals in a natural, unconstrained acoustic setting. FIG. 21c shows a confusion matrix illustrating 100% accuracy of classification amount 5 species of the calls of desert birds.

Certain other alternate embodiments may be configured to accommodate automatic processing of sounds characteristically generated by any other source. The context agnostic and signal-unconstrained nature of the disclosed system and method make them readily applicable for use with virtually any type of acoustic signal.

It will be clear to one versed in the signal processing art that methods such as this applicable to acoustic signals may, in other embodiments, be applied to signals in other modalities. For example, as a given system is not dependent upon data or any other context-defined information borne by the processed signals, it may be applied to process vibration or seismic signals; to radio frequency (RF) and other electromagnetic or optical signals; to time; space; or other indexed varying patterns in any physical medium or virtual computer data, and so forth. Preferably, the methods disclosed here in operate on context-agnostic signal recordings, enabling for example opportunistic passive RF monitoring, light monitoring, vibration monitoring, network data timing, etc., to be addressed. However, in other applications an active or interrogated signal return such as, for example, Radar, Sonar, ultrasound, or seismic soundings may be addressed in substantially similar manner.

Full Corpus Processing:

Turning now to FIG. 1, there is shown a flow diagram providing an illustrative overview of a training process carried out in accordance with one exemplary embodiment of the present invention, as applied for instance towards distinguishing a human speaker(s) from their unconstrained speech. This system full-corpus update training process example starts by taking a selection of audio segments from a corpus and ends by updating the classification decision parameters with optimized class separation settings.

The process enables the given system to essentially learn how to best discriminate between speakers, or between groups of speakers. Toward that end, the exemplary embodiment obtains signature feature sets and operative classification and clustering parameters 116 for a given corpus of natural speech recordings 118, and maintains them in system data storage 115. This process of acquiring and updating data is run periodically to re-optimize the feature space based on all available data, and the stored parameters are then used for making on-the-fly determinations for classifying new speech segments or satisfying user queries.

From the natural speech corpus, audio decision segments are selected, which comprise short samples of continuous natural speech (e.g. 10-15 seconds) from a speaker. The selected segments are grouped at block 102. Depending on the particular requirements of the intended application, the decision scope may be defined according to entire files or according to individually captured segments from a file. This permits the grouping of presorted samples of single individuals, or the grouping of individual speakers in a multi-person conversation. A priori groups may be minimal and formed, for example, by simply grouping only the continuous speech samples from one speaker; or, they may be extensive and formed, for example, by leveraging previous sorting information to establish large known sample sets from the same speaker (or speakers).

From each continuous segment, a spectrogram is generated at block 104, by applying an optimally sized window for a short-time-Fourier-transform (STFT) process. Continuous spectrograms are formed by segment. As is known in signal processing art, the shape and size of the data window, the length of the FFT, and various interval averaging parameters provide a means for trading off smoothness against noisy detail in the spectral vectors. This affects subsequent steps, and in the course of processing such parameters may be suitably adjusted to better optimize the divisibility of the data, if necessary. Thereafter, the resulting power-spectral vectors are recombined to form a superset of samples at block 106. As indicated, the data at block 6 is defined in the time-frequency (T-F) plane; hence spectral dynamic information is captured from the collected natural speech samples.

The flow then proceeds to block 8, where a GAD type simultaneous sparse approximation operation (as described in following paragraphs) is carried out on the spectral vector dataset collected at block 106 to achieve a jointly sparse decomposition thereof. The term "simultaneous" in simultaneous sparse approximation does not necessarily mean the contemporaneous execution of sparse approximation on a given plurality of signal vectors at the same point in time, but rather that the plurality are jointly considered in accomplishing such adaptive sparse decomposition. The decomposition provides for the spectral vectors of the dataset respective representations—each representation being a combination of a shared set of atoms weighted by corresponding coefficients (each atom itself being a multi-dimensional function of predefined parametric elements)—drawn from a Gabor or other suitable dictionary of prototype atoms. This provides a set of decomposition atoms, thereby creating a data-adaptive, sparse tiling of the cepstrum-frequency (C-F) plane that has been optimized to capture the common and discriminating characteristics of the dataset.

The decomposition atoms generated at block 108 are grouped by segment to form a master set of candidate atomic features at block 110. The master feature set provides the common atoms by which every spectral vector may be represented as a weighted combination of. The coefficients which provide the respective weighting provide a vector space of tractably small dimension.

The GAD operation retains sufficient information to map the decomposition back to the source space—in this case the T-F plane. While individual features lie in the C-F plane, the data remains indexed both by speech segment and by time-slice; thus, each speech segment may be viewed theoretically as density along a curve in the time-frequency-cepstrum space. This information is collapsed over sub-segments of time in each speech segment, capturing for example between 3 and 30 feature vectors (defined in cepstrum-frequency space for each sub-segment of time) per segment. That is, each speech segment is subdivided for purposes of processing into constituent (preferably overlapped) pieces of certain regulated length in time. Preferably, this is done using a weighted parametric mean (P-mean) operation that is part of the GAD architecture, as further described in following paragraphs. The parametric mean captures the atomic features' typicality over the given sub-segment of time, and stores the same as that sub-segment's representative vector of atomic features.

At block 112, a collection of these representative vectors (corresponding to the different sub-segments) are thus generated in the C-F candidate feature space for each speech segment. Each speech segment may represent for example one specimen for one particular speaker for whom a plurality (number of sub-segments) of representative feature vectors are available. At this point, a smaller set of atoms optimally effective in discriminating one segment from another is sought.

A suitable SVM classification training system is preferably employed in this regard to down-select for each pair of speech segment classes a small sub-space of atoms that best discriminates between that particular pair of segment classes, as indicated at block 114. In the exemplary embodiment shown, the best (or optimal) pair of atoms for discriminating between the representative vectors of two different speech segments is identified by SVM. The optimal sub-space of such pair-wise decision atoms for discriminating between the paired speech segments (speakers or classes of speakers) thus derived are added to the operative classification parameters 16 of the system data storage 115.

Experimental results demonstrate that a collection of such pair-wise decisions provides an effective and manageable basis for partitioning the data, and tends to be faster than building a multi-class partitioning space. After processing, the actual data stored in the system data storage 115 in this exemplary system includes the corpus of speech samples along with the operative classification parameters needed to speed processing of new files or user queries.

Preferably though not necessarily, a comparison of atoms from different vectors or decomposed representations as herein disclosed entail comparison of the atoms' respective coefficients. Depending on the particular requirements of the given application, and depending on the content of the atoms in question, a comparison of atoms may otherwise entail the comparison of other constituent values—such as modulation component, phase value, or the like—specific to those particular atoms.

The disclosed process may be suitably implemented on various types of acoustic signal segments other than the human speech example illustrated. Because the classification and discrimination of acoustic segments in the disclosed processing flow rely upon the signal qualities of the given segments (such as their spectral and cepstral features) rather than any contextually-determined information content of those segments, the process may be applied to those other acoustic signal segment types with little if any modification to the overall processing flow.

Incremental Update Processing:

Turning to FIG. 2, there is shown a flow diagram providing an illustrative overview of an iterative classification process carried out on newly acquired, or novel, speech signals in accordance with one exemplary embodiment of the present invention. Iterative classification of novel signals are made by this process using stored system data. As in the process of FIG. 2, a novel speech segment may be STFT transformed to form a spectrogram at block 122, then subjected to GAD atomic projection jointly with the group of spectrograms for previously acquired speech signal segments to form the joint sparse decomposition coefficients at block 124. In a similar but much faster process, the flow may proceed from block 120 bypassing blocks 122 and 124, whereby the novel speech segment is transformed and re-projected onto the coefficient set already obtained, such as at block 110 of FIG. 1. The novel speech segment is then re-defined in terms of those features already found in the master feature set, or alternatively, even in terms of the optimized feature space for distinguishing between different paired ones of segments pre-stored in system data storage.

In any event, the C-F domain speech segment is subdivided into constituent (preferably overlapped) pieces of certain regulated length in time, preferably using a weighted P-mean operation for the resulting sub-segments, to form representative vectors of atomic features at block 126. A classification process on the representative vectors makes use of the information obtained by the training process of FIG. 1, providing quick and accurate classification of the novel signal segments relative to the already acquired signal segments, without having to re-index the entire database sample corpus. SVM may then be used to classify this speech signal relative to other signal segments in the corpus, forming a score matrix for each time-sliced sub-segment of the speech signal segment at block 128.

Depending on the scoring process results, a novel signal may be assigned either to an existing class or to the null space at block 130. Signals assigned to the null space are deemed sufficiently different from all others in the corpus to warrant their own class, as they do not sufficiently match any existing samples. For example, the novel speech signal may be from a speaker whose samples have not been indexed before. As illustrated below by example, the size of the null space may be adjusted parametrically, so as to vary the tendency to extend/expand an existing class versus forming a new class.

Database Searches:

A very similar process to that shown in FIG. 2 may be applied as a database search operation. By providing an example speech segment, its similarity to each and every other signal in the database may be quickly deduced. In those cases where the database is indexed into speaker classes, the class that best matches the example may be retrieved. In other cases where the database is un-indexed the closest N matches to the sample signal, for example, may be provided. If the sample signal is part of the existing corpus, processing is highly efficient since the key signature and SVM parameters would have already been extracted and stored.

Test Examples

Test Data:

The internet provides a convenient source of suitably tagged but unstructured material. Organization and search of online voice audio also provides an important potential market for a system implemented in accordance with the exemplary embodiment disclosed. The test corpus for the following examples was acquired from readily available online sources. It comprises clips of 8 public figures balanced over gender. Alphabetically the sources varied in gender, age, voice, and speaking style are identified (BC), (KC), (ED), (WG), (PJ), (MO), (CO), and (AR). A primary set of 10 sample files was used from each speaker, providing a total of 80 independent natural speech files in the corpus.

Minimal Pre-Processing:

From each file, segments of between 10 and 30 seconds were extracted at random. These were down sampled to a 11025 Hz sample rate, but otherwise unmodified. As background sounds such as coughs, microphone bumps, irregular music, or audience laugher could degrade performance, and in certain embodiments of the system suitable filters may be selectively employed for these areas of speech to mitigate their degrading effects. These are based on multi-band RMS energy detection. Alternatively, GAD techniques may be used to create better, adaptive matched filters.

The data shown was not pre-filtered, although previewed to control extreme artifact and to ensure that each sample represented mostly the target speaker. Five of the files were determined to be relatively clear of background clutter, while an additional five files exhibited increasing levels of noise—in particular, speech over applause or music. No specific effort was made to control for variations in audio quality.

Certain other embodiments may employ active measures to identify speech areas of the recording. This includes applying a band-limited envelope trigger to identify the start points of individual utterances, and indexing the start of each working audio segment to a time point offset by fixed amount from the trigger index points.

Successful Feature Space Partitioning of Speech Samples:

In order to confirm the effectiveness of the subject feature space and classification scheme on this dataset, a leave-one-out type analysis was performed. Leaving each speech file in the corpus one at a time, the system was trained on the remaining data and classification of the excluded file as a novel signal was subsequently attempted. Using only the five cleanest speech segment files per speaker, perfect 100% results were obtained. Adding five additional noisier speech segment files per speaker, a 97.5% accuracy rate was obtained.

Figures 1, 2, 3, 3A:
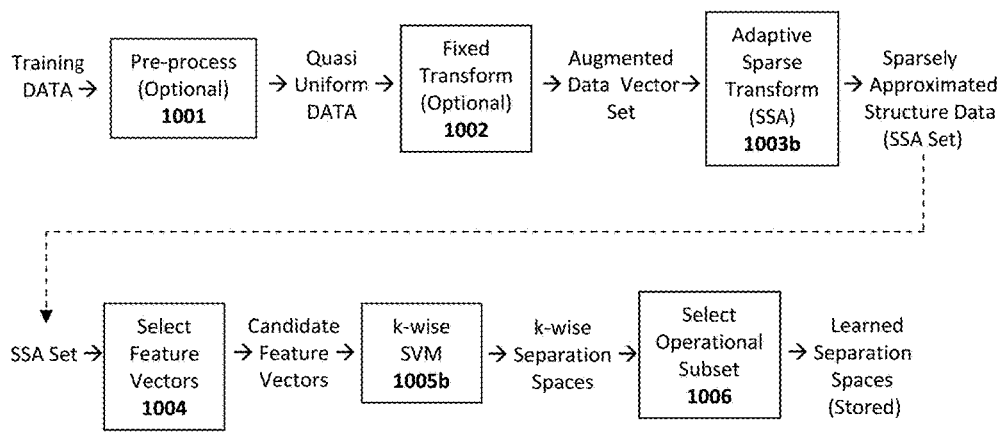

The chart in FIG. 3a shows the resulting confusion matrices (in this example, for eight speakers, five files each in the first matrix and eight speakers, ten files each in the second matrix). In the first chart using the five cleanest files, all five files for every actual speaker are shown properly classified to them. In the second chart with ten total files for every actual speaker, all ten files are shown properly correlated for six of the eight actual speakers. Nine of the ten files are shown properly correlated to the remaining two actual speakers.

For this example, the decision segments from each file included only 10 seconds of speech. Each of the decision segments was represented by three 3-second span feature vectors. The misclassified speech segment for WG was determined to include loud background applause, while the misclassified speech segment for AR was determined to have suffered from irregular microphone equalization.

Figures 1, 2, 3, 3B:
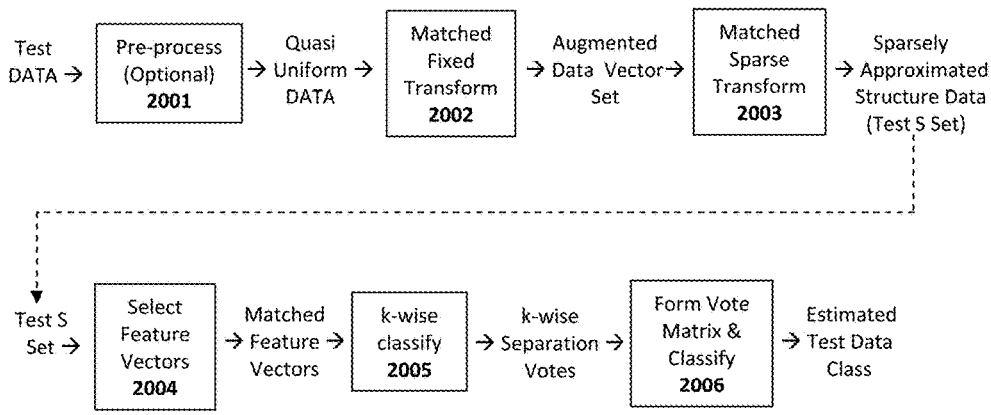

The partitioning of each speech segment into sub-segments involves a tradeoff between providing more feature vectors for each speech segment and maintaining large enough sub-segments to capture characteristic signature aspects of a speaker's vocalization. FIG. 3b shows graphic plots of both total classification accuracy and worst case accuracy (in percentage) vs. sub-segment time size (in seconds). As judged by both total accuracy and worst case accuracy for individual speakers, the resulting plots reveal for this dataset that a sub-segment size of approximately 3 seconds gives optimal classification performance for each feature vector. In fact, increasing the segmentation to include 3 second segments that overlap by ½ second (i.e., 13 feature vectors per segment) led to elimination of the WG misclassification shown in the second table of FIG. 3a, which yielded a 98.75% accuracy rate.

Conceptually, the segment size may be likened to determining how long a listener (in this case the computer) needs to "hear" a speaker to make a reasonable guess at identifying them. Operationally, speech is reviewed much faster than in real time.

Figures 1, 2, 3, 4, 4A:
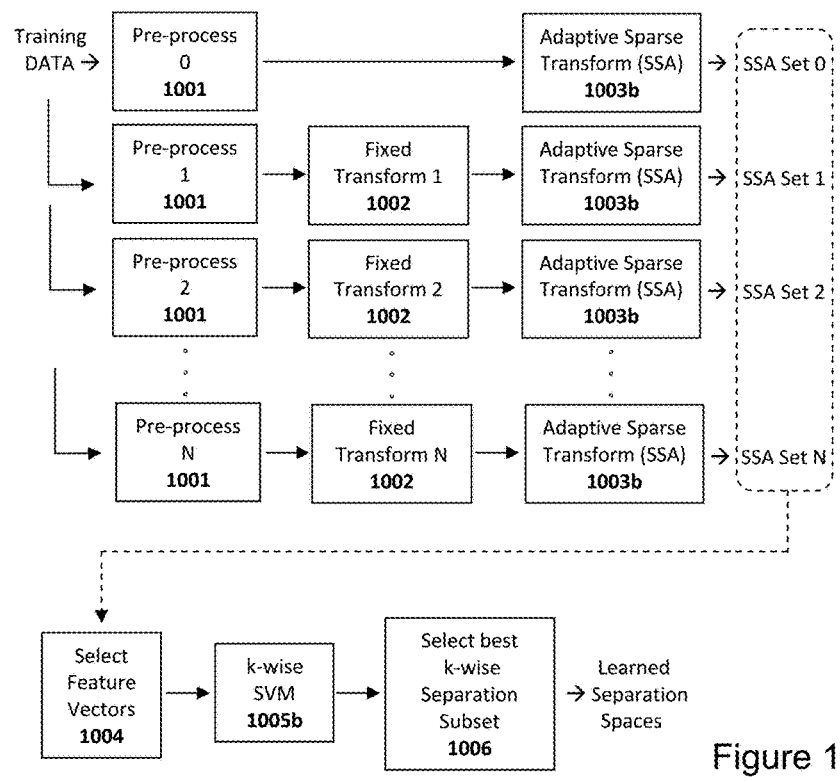

To provide a sense of the effectiveness of SVM upon the subject derived feature space, FIG. 4a illustrates two example SVM partitions between speaker feature vectors. The GAD processing collapses information so that two-dimensional sub-spaces are often sufficient for segmentation. In the illustrated situation, the SVM partitions readily distinguish ED from AR and KC, respectively. As shown, the optimal atom pair for pair-wise discrimination between ED and AR are determined in this example to be atoms 24 and 9. When graphically plotted, the respective coefficient values for these atoms in the 30 representative sub-segment vectors (3 sub-segments/file×10 total files) for AR are clearly segregated from the respective coefficient values plotted for these same atoms in the 30 representative sub-segment vectors for ED about the divisional line shown. Similarly, the optimal pair for pair-wise discrimination between ED and KC are determined in this example to be atoms 9 and 73, such that when the respective coefficient values for these atoms in the 30 representative sub-segment vectors for KC and ED each are plotted, they too are clearly segregated into accurate groups by the divisional line shown.

Because the GAD processes are able to compactly represent information in very few atoms, attaining high divisibility of the space with only two feature atoms is typical. While higher dimensional partition spaces may be applied, the SVM in this example was limited to two-dimensional subspaces in the interests of simplicity and clarity. This eases visualization and eliminates any question of "over fitting" the data. The SVM employed in this example was also restricted to linear partitions for initial proof of concept purposes.

SVM is a technique known in the art of machine-learning. The application of SVM herein should not be interpreted narrowly to imply a specific implementation from prior art. As used herein, the SVM is directed to a computer implemented process that attempts to calculate a separating partition between two categories of data. The data is projected into a plurality of dimensions, and the partition will comprise a surface in a dimension less than that of the projection. Thus, in certain exemplary applications, data is projected in two dimensions, and a line comprises the partition surface. In three dimensions, the separating surface would comprise a plane; and, in N-dimensions, the separating surface would comprise a mathematical hyper-plane. Without loss of generality, it is possible to use curved surfaces in place of a linear surface for the partition.

In general, the partition effectively separates the data-space into two 'half' spaces, corresponding to the categories of interest. As mentioned, it is feasible to segment the space into more than two regions where necessary in other embodiments and applications. Linear surfaces and bi-section are preferably used for computational speed. As discussed in following paragraphs, a voting system is preferably constructed that enables multi-class data to be addressed deterministically. An advantage of the GAD methods used in combination with SVM is that high-accuracy decisions may often be made based on a sub-space of only two dimensions—which further reduces computational complexity. Algorithmic measures for calculating a partition line are not restricted; any fast approximating algorithm may be employed for a partition even if that algorithm works only in two dimensions. That too is referenced herein without limitation as SVM.

The leave-one-out test results for the given example demonstrate the automatic creation of viable feature vectors from natural speech segments. Robust common signature information may actually be extracted from the feature vectors, which can potentially be applied for clustering unknown speech segments into groups.

This example makes a tacit assumption that an indexed, classified corpus against which to compare a novel signal already exists. Automatic indexing and clustering in the absence of a fully indexed, classified corpus is next addressed.

Flagging Anomalous Speech Segments from Unfamiliar Speakers:

A system formed in accordance with the exemplary embodiment disclosed may also differentiate between familiar and unfamiliar speakers. To do so, a null space is initially defined for the clustering process so that novel segments may be classified either into one of the existing classes or determined to be sufficiently dissimilar to all existing classes as to warrant the start of a new cluster of data. This situation may be replicated by leaving out speech segment files for entire speakers from the training corpus in the given example.

Figures 1, 2, 3, 4, 4B:
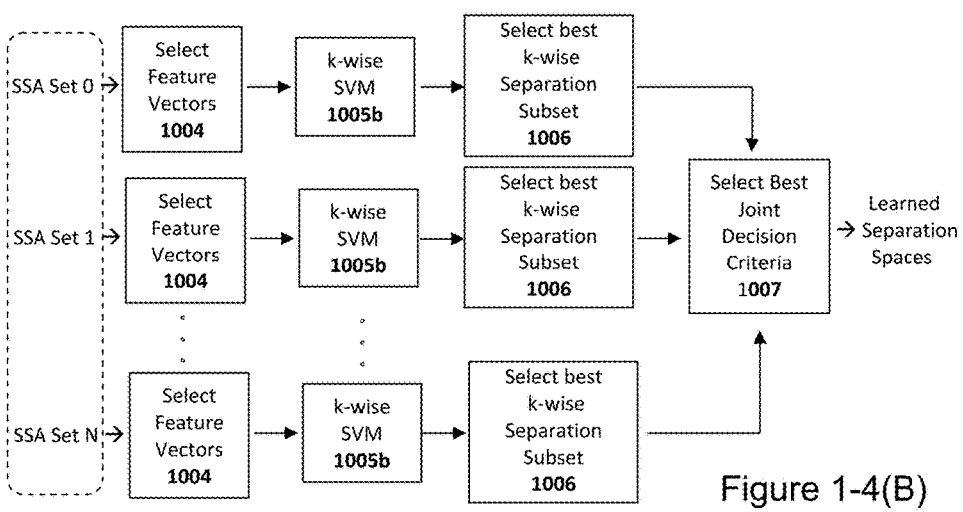

FIG. 4b shows two ROC curve for detection of novel speakers that are not in the training dataset. The illustrative ROC curves shown are generated first by treating all WG files (blue) as novel signal data and, in a second test, treating all CO files (green) as novel signal data. The ROC curves are each generated by adjusting a hidden threshold (in this example, the size of a null space) to vary the balance between a true positive rate and a false positive rate. Using such variable thresholding, the point is determined where a certain correct rejection is reached (denoting for instance that a rejected source of the given samples is not a known source) before a certain false positive rate is reached. False positives are continually traded off for true positives in this comparative process.

Success was determined for the illustrated ROC curves by correctly classifying the novel files into the null space rather than clustering them with other speakers, while false positives were determined for misclassifying other speaker files into the null space. Each curve was generated by varying a parameter determining the size of the null-space. Each was based on the same 80 speech sample files (10 for each of the 8 speakers) as in the preceding example, and on the same parameter settings (other than the null-space size).

As shown, the system is able to identify for example 100% of CO and 90% of WG files as dissimilar to the known corpus, with less than 10% of the other files called into question. This process in alternative embodiments may be augmented by using anomaly detection concepts developed in metric spaces.

Clustering for Similarity Searches Over Untagged Speech Segments:

A system formed in accordance with the exemplary embodiment disclosed may also extend the non-parametric SVM approach to seek, or discover, clusters in the given data. The system flow proceeds by establishing the best separation sub-space for each pair of files. Excluding that pair, we test the remaining files and accumulate blind classification information in the sub-space. A voting process is then used to determine which files are most similar to which other files in accordance with the distribution of votes recorded for each.

Figures 1, 2, 3, 4, 5, 5A:
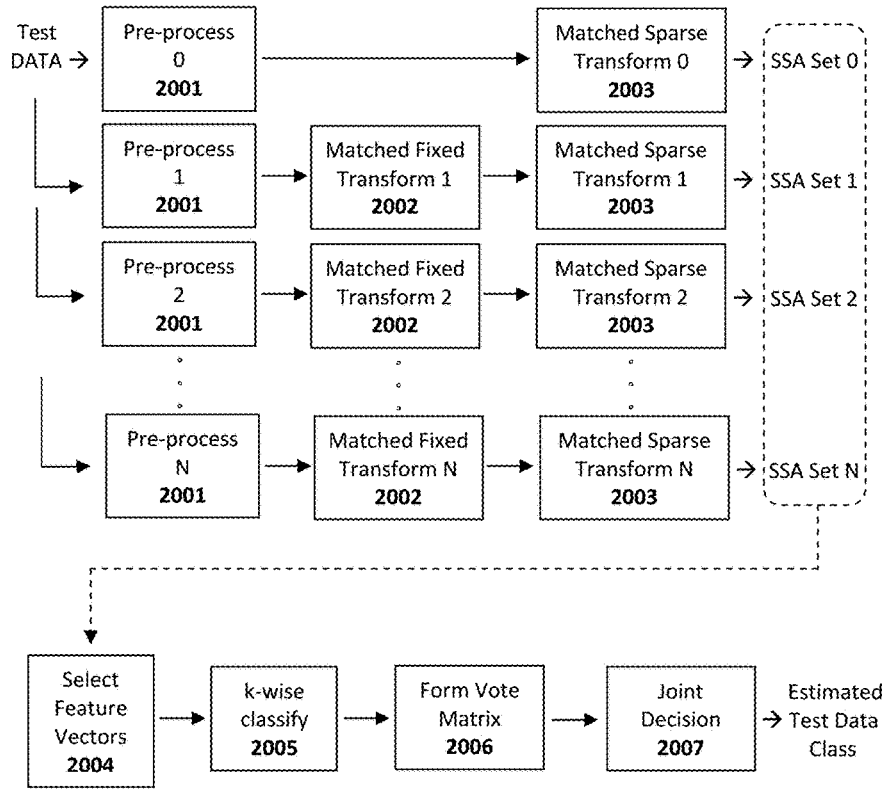

FIG. 5a illustrates preliminary automatic blind clustering results for the given example, where the 'green' block-diagonal structures 150, 160 indicate properly clustered speaker files. In this illustrative example, the results of a clustering run on three (top) and four (bottom) of the given speakers in the database, using five speech files each. The similarly shaded 'green' squares 150, 160 within the diagonal blocks are those properly co-associated by the system in the absence of any a priori knowledge, while the 'red' squares 152, 162, 162' represent misclassified files. Respectively, accuracies in blind clustering of 93.3% and 85% were realized.

Figures 1, 2, 3, 4, 5, 5B:
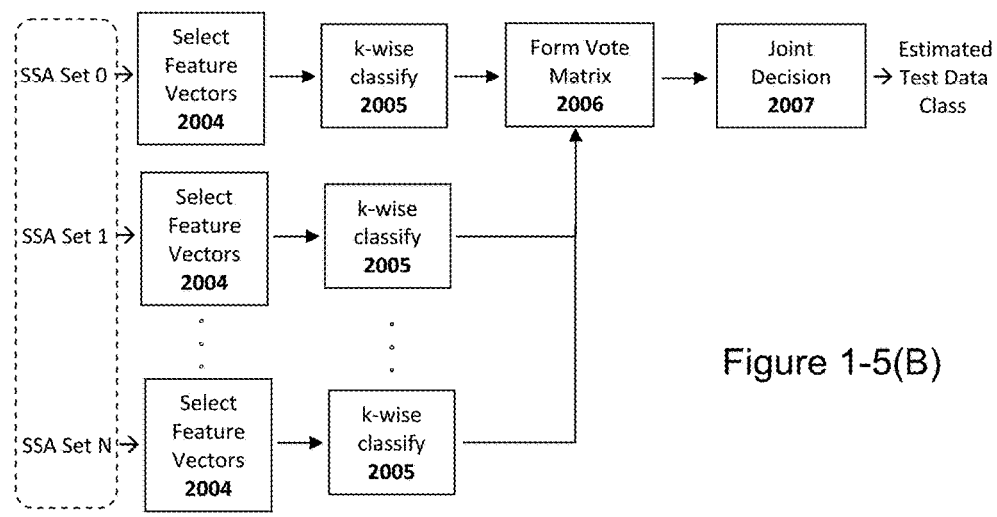
Figure 2:
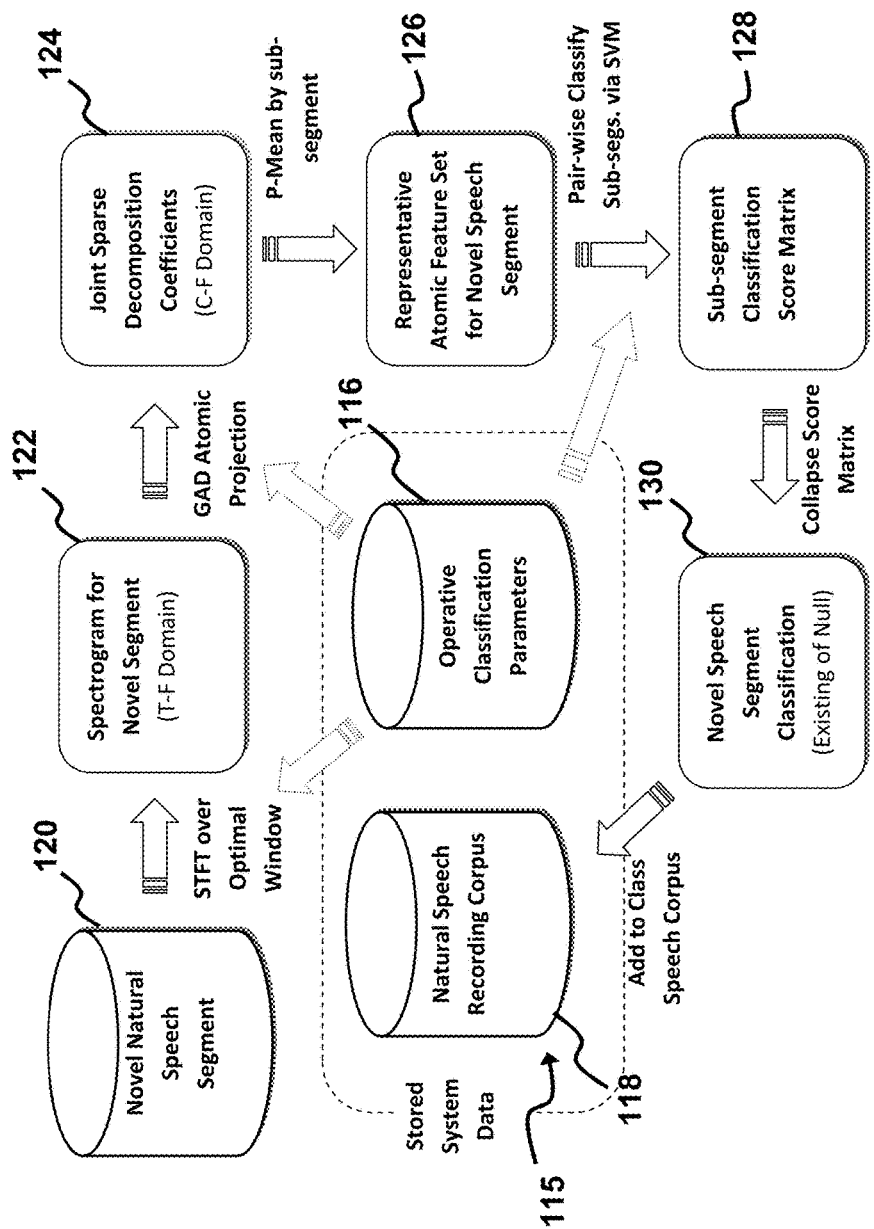
Figure 3B:
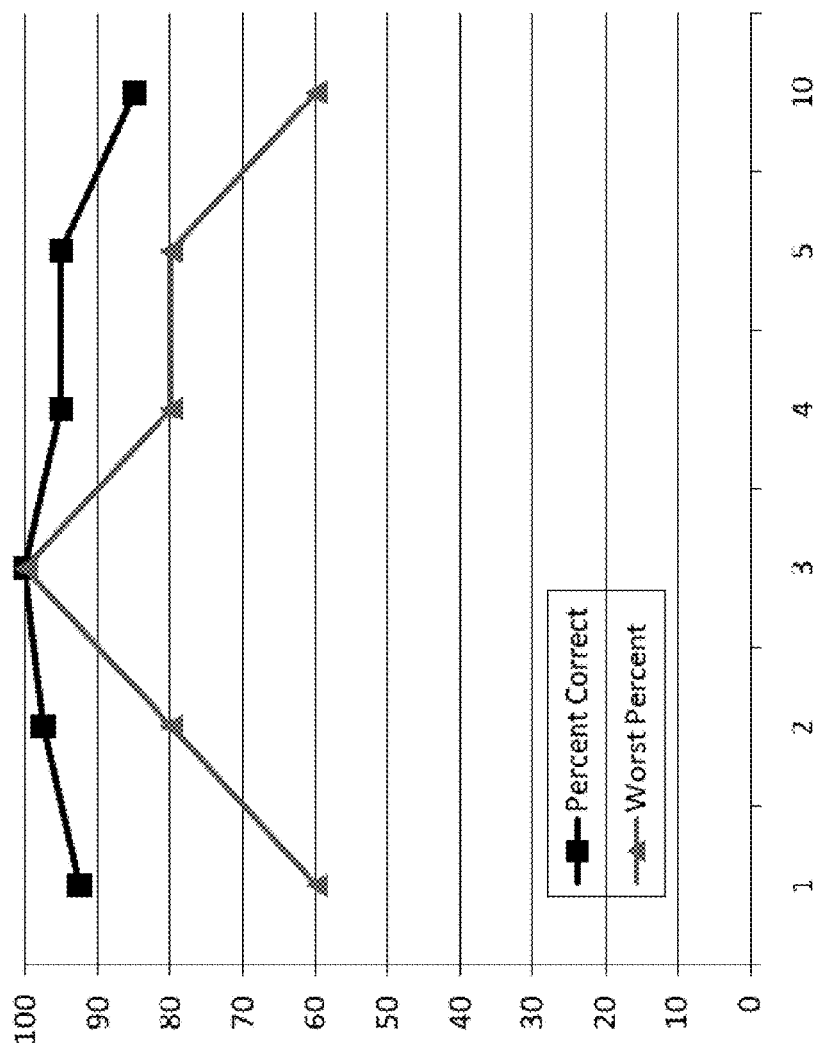
Figure 4A:
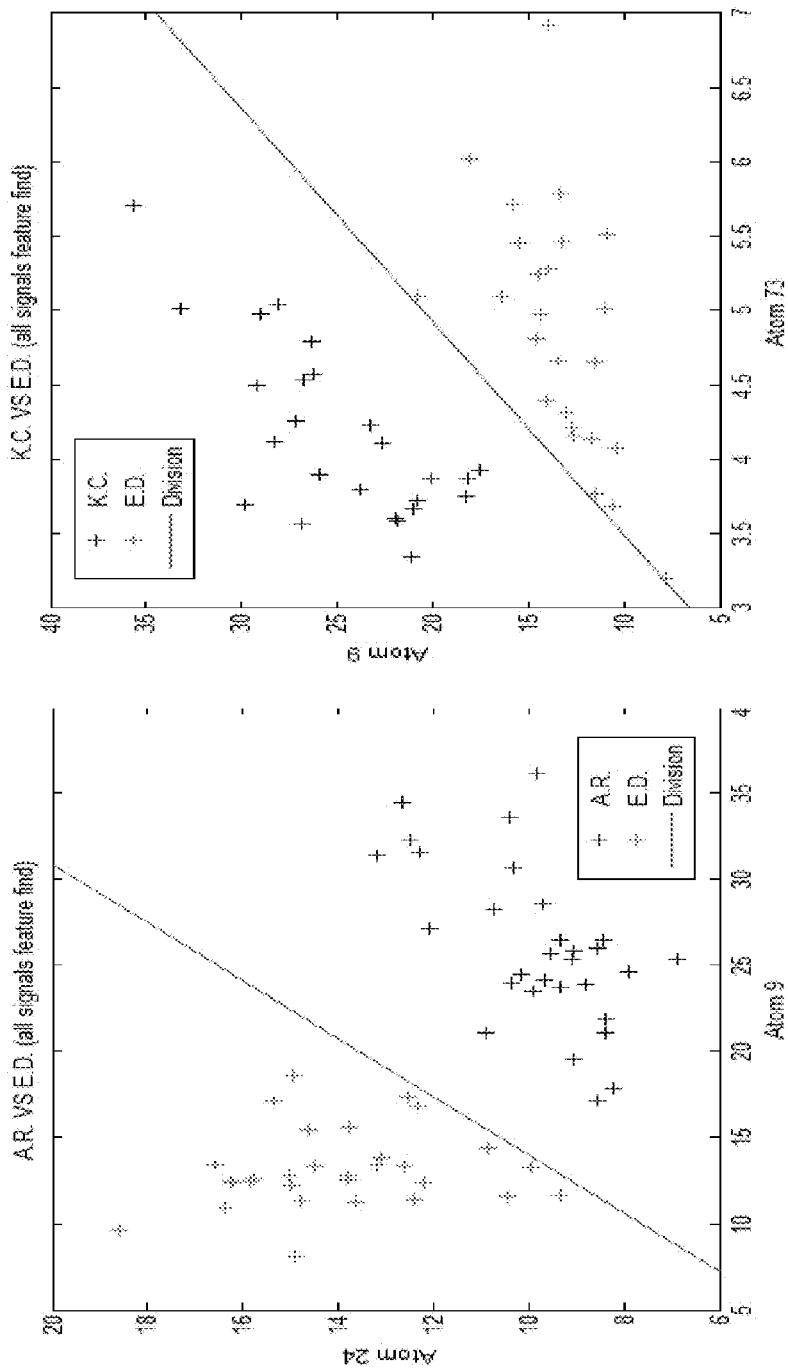
Figure 4B:
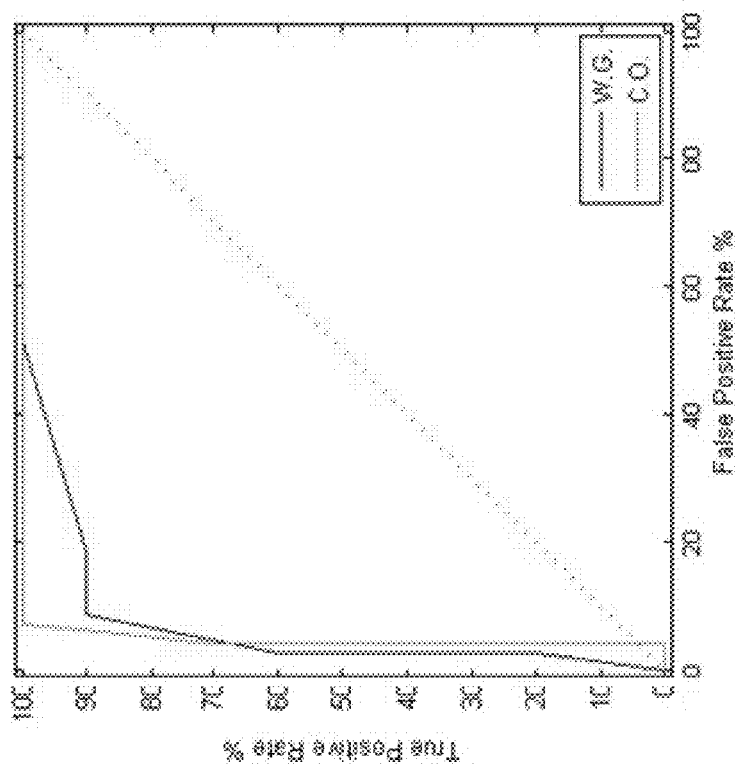
Figure 5A:
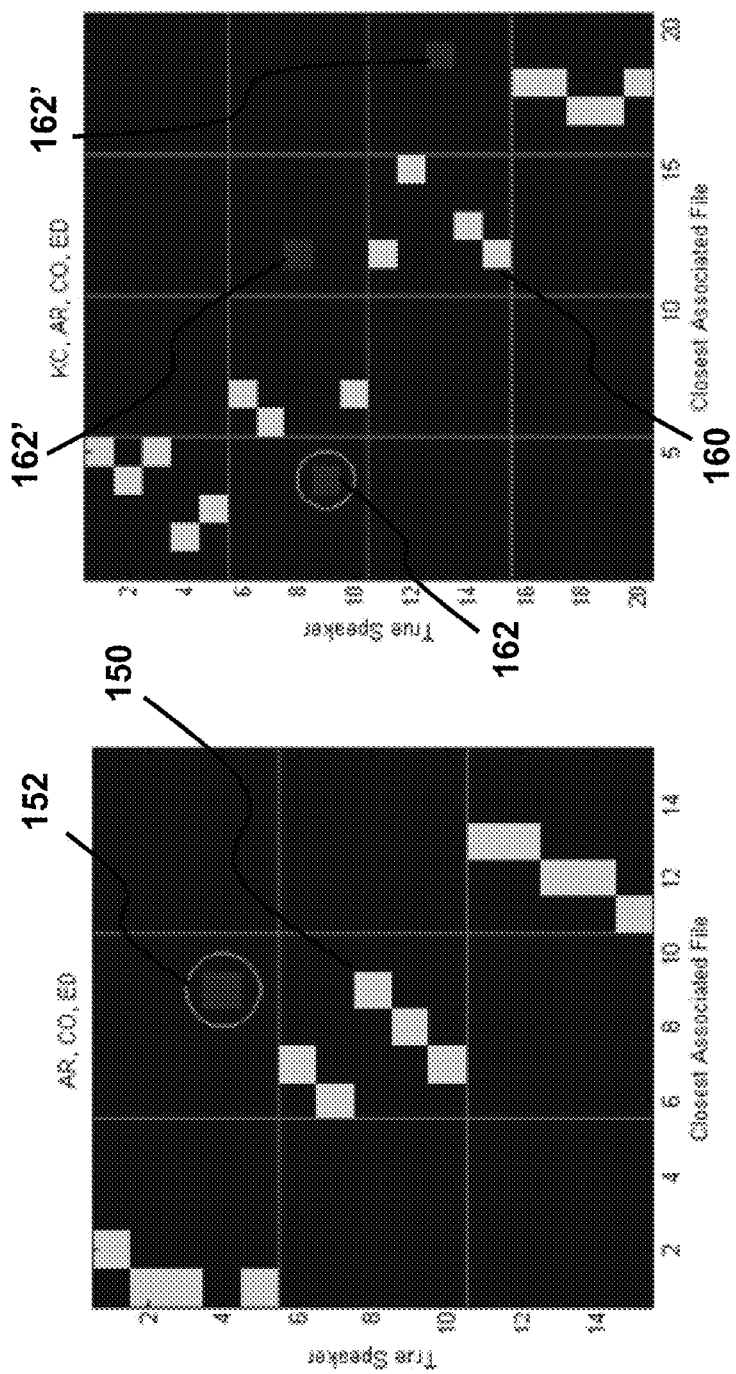
Figure 5B:
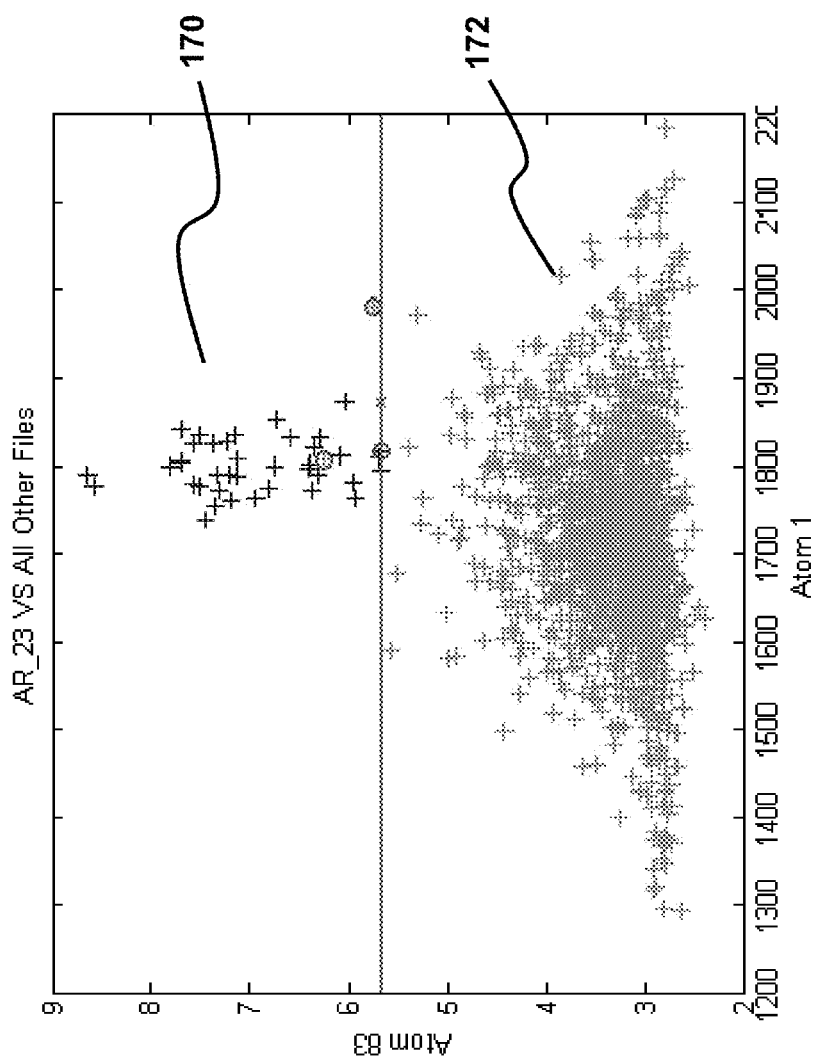

A point of practical concern is that certain sound files have very different recording tones from others, and the system is apt to use these tonal features as a feature of separation for particular files. FIG. 5b illustrates that although files with anomalous audio aspects may be problematic, they can be detected, as enabled by use of GAD processing as disclosed herein. The Figure shows the best separation of the misclassified AR file (circled 'green' squares 152, 162 in FIG. 5a) from the entire set of file vectors (containing the properly co-associated 'green' squares). Clearly, substantially all of the points 170 in 'blue' are completely separated from the remainder of the population 172 in 'green' on only one atomic feature (atom 83 in the pair-wise decision space example illustrated). This one-against-the-world comparison provides an approach for detecting such anomalous files and, correspondingly, an approach for detecting candidate decision features that rely too closely on one file's unusual audio characteristics rather than on the voice of the speaker. Flagging such files and/or eliminating these atoms is an additional aspect of certain embodiments.

In addition to the non-parametric efforts illustrated, metric-space clustering may be applied in accordance with certain alternate embodiments.

Summary of Certain Related Elements of GAD Processing

Signature Extraction:

A notable challenge in performing detection and classification in high-dimensional spaces is discovering and leveraging natural relationships which can be used to reduce the dimensionality of the data to a manageable decision space. It is preferable to concentrate the decisive information content into relatively few coefficients. Mathematically, one may assume that the target information lies on a relatively low-dimensional manifold that is embedded in the high-dimensional space. Practically, there are many approaches by which one may attempt to reduce raw data to this salient information.

Figure 7A:
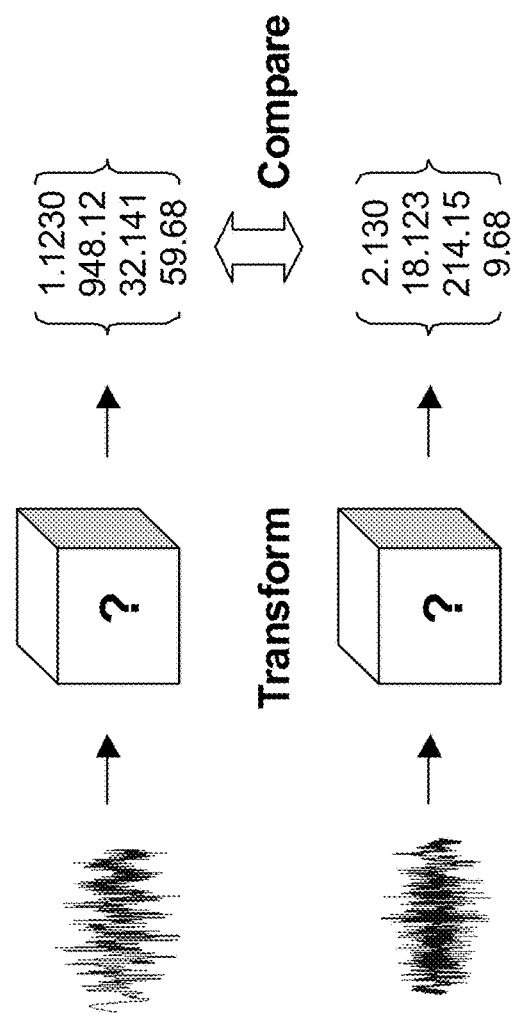
FIG. 7a is a schematic diagram generally illustrating a transformation process respectively applied to signals to obtain transformed representations thereof.
Figure 7B:
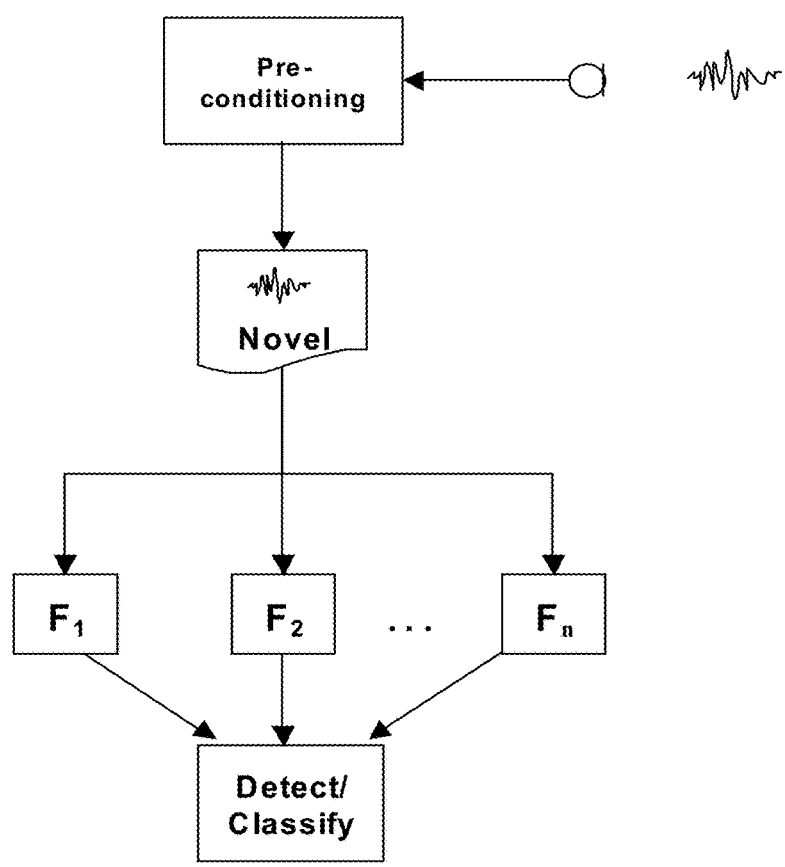
FIG. 7b is a schematic diagram illustrating the flow of processes for detection and clustering of new acoustic signals received in an exemplary embodiment of the present invention.

FIG. 7a illustrates the abstracted process of analysis, where sample signals are transformed so that they are represented by a set of features with corresponding values. An optimal transform to map signals into features is generally important in addressing signature discovery problems. The representation set of features is manipulated to discover group similarities and differences so that a typical signature can be extracted. The transform largely determines the success of the resulting system operation. Ideally, once a feature set is identified, a model similar to that shown in FIG. 7b may be applied for detection and classification. Effective detection and clustering are ideally performed using low-dimensional feature sets.

Standard signal processing tools based on fixed transforms such as Fast Fourier Transforms (FFTs), wavelets, or filter banks often obscure key feature information by distributing it over a large number of quantized bins. Approaches like Principal Component Analysis (PCA), Linear Discriminate Analysis (LDA), and related nonlinear kernel methods share certain downsides with all statistical matching methods. Even though they may transform data to reduce dimensionality, these methods remain dependent on consistency in the sampled feature set. If selected features jitter, drift, or otherwise vary significantly, the probability of resolving underlying structure or of detecting a known signature diminishes rapidly.

In contrast, greedy algorithms known in the art work to concentrate interesting information into fewer, more robust features. Historically, greedy algorithms have been under utilized in signature identification tasks in part because it is difficult to compare one analyzed signal to another when different features are extracted. As various applications of GAD demonstrate, simultaneously analyzed collections of signals overcome many prior limitations. The GAD processing applied herein effectively removes jitter and de-blurs data. By compactly re-representing the data in a reduced dimensional feature space, GAD facilitates discovery of signatures at the front end, reducing subsequent computing costs and significantly increasing the probability of success with further statistical processing.

Greedy Adaptive Approximation (GAD) Processing:

Mechanisms and methods for discovering and extracting signatures in data are described in [1] and [2]. The set of methods are described collectively herein as Greedy Adaptive Discrimination ("GAD"). Below is a brief summary of the GAD processing disclosed in more detail in [1] and [2], aspects of which are incorporated in the embodiments disclosed herein.

A "GAD Engine" comprises a Simultaneous Sparse Approximator (SSA), a dictionary of prototypical atoms, a structure book memory system, and one or more discrimination functions that operate on the structure books. The SSA takes as input a collection of signals and produces as output a low-dimensional structure book for each signal. Each structure book describes a decomposition of a corresponding signal and comprises a list of coefficients and a corresponding list of atoms. Working as an example in one dimension, a signal f(t) may be represented as follows:

$$f(t) = a_0 g_0 + a_1 g_1 + \ldots + a_n g_n + r;$$

where $a_i$ are the coefficients and $g_i(t)$ the atoms or prototype-signals of the decomposition, and r is the residual error (if any) after n+1 terms. If r(t)=0, then the representation is exact; otherwise the decomposition is an approximation of f(t). One way to understand a structure book is as a set of ordered pairs $(a_i, g_i(t))$ for each i; however, an actual engine typically utilizes more efficient internal coding schemes. Note that while the output of the SSA may be orthogonalized, the subject system and method are best served by maintaining redundant representation, sometimes referred to as a frame in mathematical literature, to distinguish it from the more familiar idea of a vector basis.

The atoms $g_i(t)$ belong to a highly redundant dictionary D of prototype signal elements. Using a redundant source dictionary rather than a fixed decomposition set (such as on a Fourier or wavelet basis) allows the GAD to substantially reduce the dimensionality n of the resulting decomposition for a given error $\varepsilon$, with $|r| < \varepsilon$. Those skilled in the art familiar with other adaptive approximation schemes, such as Matching Pursuits, will recognize that this reduced dimensionality generally comes at a price, as structure books from multiple signals are not mutually compatible. A unique feature of the GAD architecture is an SSA that produces redundant sparse approximations such that the atoms of any structure book may be compared directly to those of any other structure book in a very low-dimensional space. Thus, for a set of simultaneously approximated data functions $\{f^i\}$ decomposed over an index set $\gamma \in S$, the following equality holds:

$$f^i = \sum_{\gamma \in S} a^i_\gamma g^i_\gamma + r$$

In the simplest implementation, selected atoms may be identical for all generated structure books in the collection. However, the GAD SSA is also able to extract atoms from the signal collection that are similar rather than identical, i.e. $g^i_\gamma \neq g^j_\gamma$, $i \neq j$. This unique feature is highly advantageous because it allows the GAD engine to automatically account for noise, jitter, drift, and measurement error between the signals. The GAD Engine permits the range of "similarity" between atoms across structure books to be controlled by setting 4-windows for the parameters of the dictionary. These windows may be either fixed or adapted dynamically.

The resulting sparse structure books are further processed within the GAD engine by suitable discrimination operations. Each operation takes as input one or more structure books and produces as output one or more additional structure books. Operators include set theoretic operations and threshold tests, among others, that are utilized to sub-select atoms and extract similarities and differences between classes of signals. An operation of particular interest for signature extraction is the parametric mean, detailed in [1], which produces a single structure book representative of the "average" or "typical" signal in a collection.

Another notable benefit of the GAD Engine is that the resulting structure books may be averaged, subtracted, or otherwise manipulated. Also, any derived structure book retains sufficient information to reconstruct therefrom a representative model signal in the original signal space. In particular, this makes it possible to calculate a parametric mean of a class of signals and then reconstruct a "typical" signature signal from that data for further analysis, comparison, etc. Hence, GAD provides useful signature information to many conventional signal discrimination systems. Taken together, the components of a GAD Engine define a very flexible tool for manipulating and discriminating signals.

Figure 8:
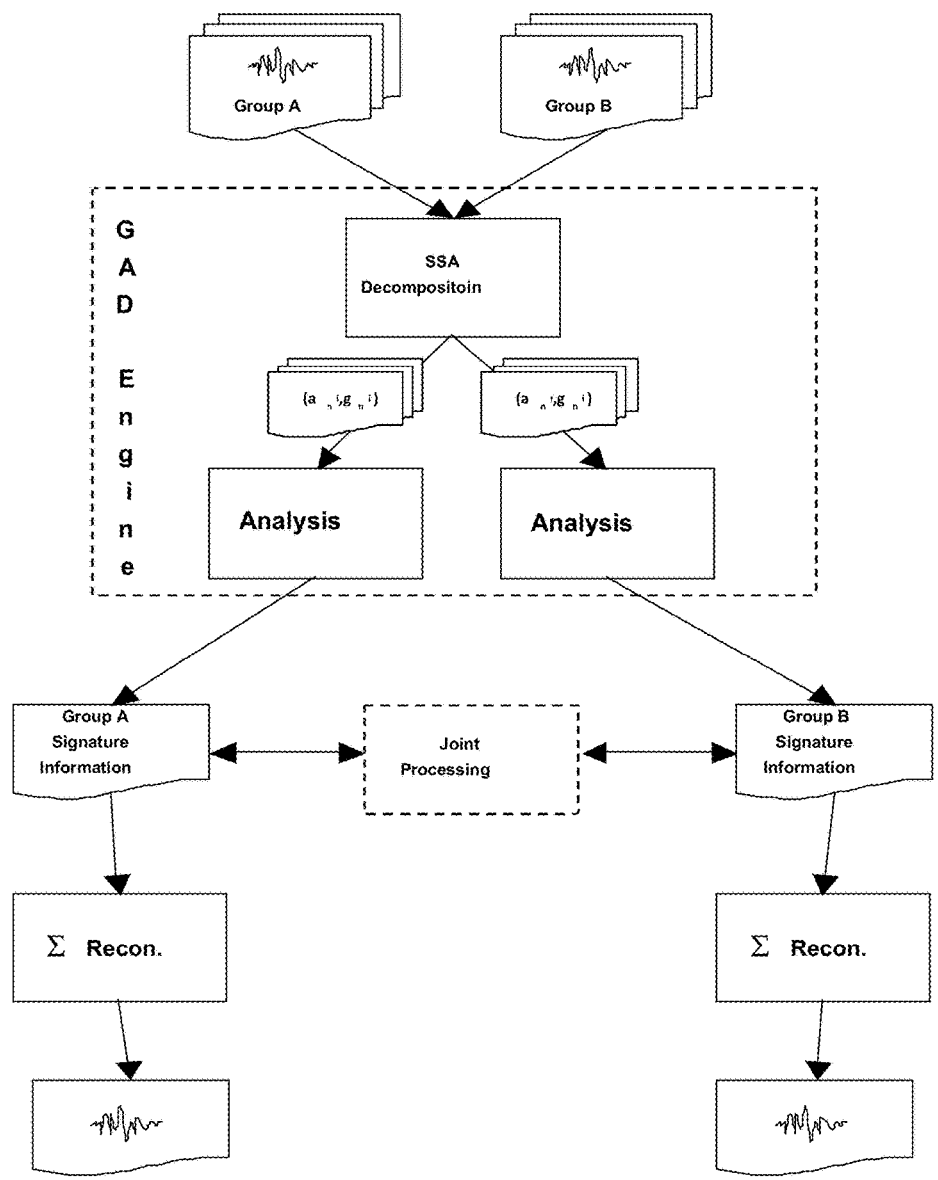
FIG. 8 is a schematic diagram illustrating a flow of processes within a simultaneous sparse approximation operation executed in an exemplary embodiment of the present invention.

FIG. 8 outlines an exemplary GAD signature extraction system, employing a general GAD processing engine as described in [1] and [2]. Use of groupings as shown (with GAD and the simultaneous sparse approximation processes described in [1] or others as considered in [2]) provides considerable processing advantages. Signature data is collected and divided into classes, typically representing a positive condition in which the target signature is present and a negative condition in which only background or distracter signals are present. The classes are analyzed using the SSA method, resulting in a collection of structure books (labeled SBs in the figures) for each class of signal. Preferably, this and other processing steps described in connection therewith are carried out on a computer platform in programmably configured processing with respect to the previously generated signature dictionary.

A carefully defined parametric-mean operation is performed on each class to produce a signature structure book for each signal class. As noted, these signature structure books effectively provide a list of key time-frequency features relevant to discriminating the class, together with coefficient values indicating their proportionate prominence. The processing may then compare the signature structure books to further extract contrasting elements. Note that the system may also be applied spatially to extract spatial as well as temporal patterns of interest. The signature structure books may also be reconstructed into "typical" time-domain waveforms that are representative of a class of signals. Thus GAD signature extraction may feed a variety of other detector designs.

GAD signature extraction proceeds by finding a parametric mean for one or more classes of signals and comparing the resulting structure books to each other and to statistical estimates of expected values in background noise. A variety of suitable methods may be employed by which to find the best discriminators. The choice of such methods depends on the particular requirements imposed on detector design by the intended application.

GAD is compatible with various known detector/classifier architectures, any of which may be used as tools in the exemplary embodiment disclosed herein. An SVM approach is illustratively applied in the disclosed examples.

It should be noted that the GAD Engine may be replaced where necessary, within the scope of invention, with other suitable tools for executing simultaneous sparse approximation.

GAD Applied to Speech Data:

As described with reference to FIG. 1 and FIG. 2, GAD is applied in the disclosed embodiments not directly to original signals, but rather to log power spectra obtained from Fourier transformed versions of the original signals. Thus, by using a Gabor type dictionary under GAD, a sparse tiling of the plane is obtained which comprises frequency modulation vs. the original domain of these log-spectral signals. Consequently, the resulting atoms correspond mathematically to parametric descriptions of cepstral coefficients (i.e. quefrency) vs. frequency, or the C-F plane. Phase and scale information are also obtained. What results is a derived data set that is much more precise in its description of the underlying speech than a general cepstrum obtained by other methods.

The sparse adaptive C-F tiling obtained by using GAD with a Gabor dictionary, following a spectrogram of FFT, comprises an extended descriptive framework when compared to classical cepstrum analysis. The Gabor dictionary includes Fourier elements, which in the present context mimic cepstrum coefficients when applied to the log power of the spectrogram FFT vectors. However, the preponderance of Gabor dictionary elements are modulated by a Gaussian envelope of finite scale $\sigma$. Thus, cepstrum-like elements of finite frequency extent may be suitably modeled. Moreover, by using this dictionary un-modulated Gaussian elements may be considered, which in the present context represent individual frequency bands of wide or narrow extent. As disclosed in reference [1], the Gabor dictionary includes an infinitely redundant parameterized set of spanning frames. Thus, the sparse adaptive C-F tiling is significantly more flexible than a typical fixed-transform cepstrum analysis known in the art. Its use leads to extremely compact representations of the information content in many classes of signals. Compression of information into a very low dimensional space enables efficiency in the SVM layer that would not otherwise be possible.

FIG. 6 illustrates the collection of data to form the GAD signal space. Continuous speech is analyzed into a spectrogram (151) and divided into segments. These may or may not be contiguous segments as shown; such has no effect on further processing. Each segment is subdivided into spectral-segments, corresponding to one column in the spectrogram. These log power spectra 152 form the signals 153. They may be viewed individually as power-spectra 154. The super set of spectral-segment spectra for all spectral-segments of all segments comprise the signal set of interest for sparse approximation.

Figure 9:
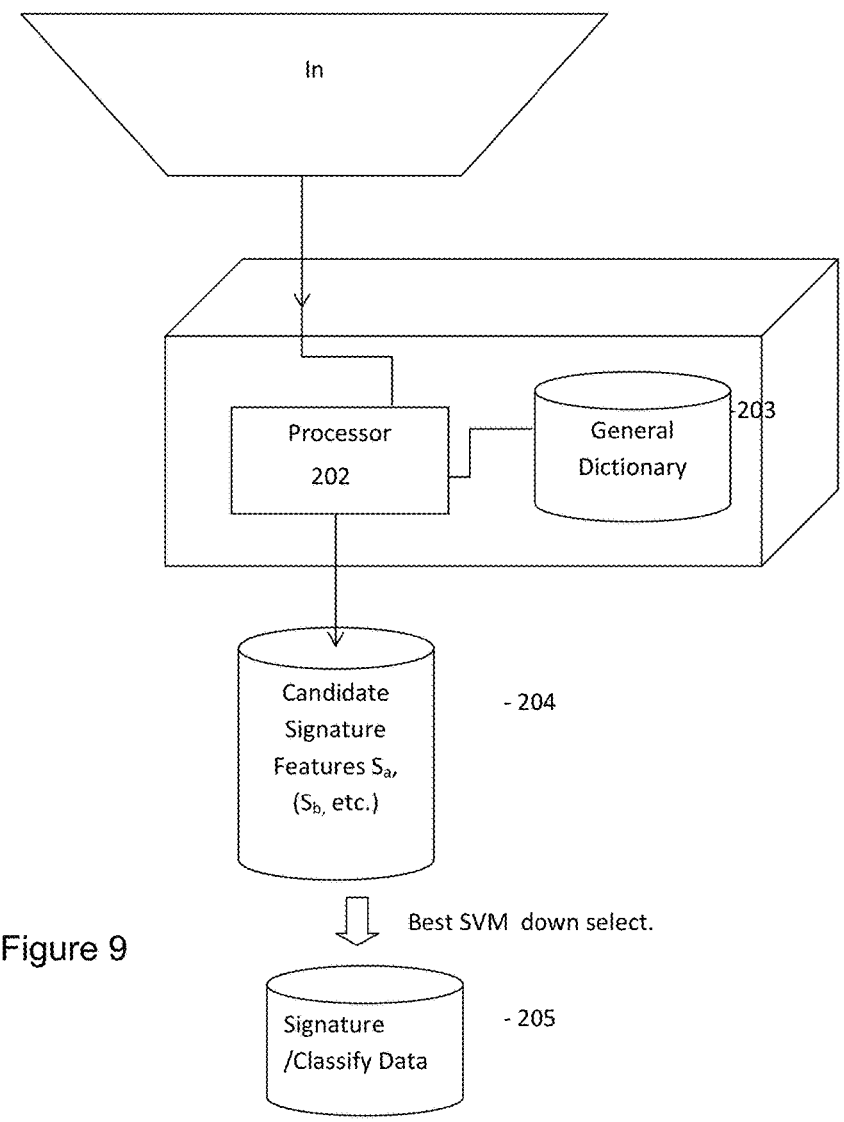
FIG. 9 is block diagram schematically illustrating an interconnection of system modules and flow of data within a processing portion in accordance with one exemplary embodiment of the present invention.

FIG. 9 illustrates the link between the processing flow illustrated in FIG. 1 and FIG. 2 to GAD processing. The spectral vectors of each brief speech spectral-segment form the "signals" 201 for GAD processing. These are analyzed to form an SSA by a processor 202 with respect to a general dictionary 203 that may comprise any suitable set of known prototype functional elements (i.e. atoms) for use in describing pertinent signal features in the intended application. For each speech segment (a, b, c, . . . ), the processor 202 preferably also performs a p-mean as described in references [1] and [2] to produce a set of representative signatures $S_a$, $S_b$, etc., 204 each expressed in terms of a medium dimensional (e.g. 100-200) set of common candidate features. In certain embodiments, a spectral-segment can correspond to a sub-segment as described elsewhere; however, the sub-segment preferably span multiple spectral-segments. This allows for significantly more flexible tuning of parameters so that both the spectrogram STFT windows and the number of vectors per speech segment may be optimized. The p-means in this embodiment are typically generated over each of the sub-segments that comprise each segment, so that each sub-segment p-mean represents data collapsed over the set of its component spectral-segments. Thus, there is one representative joint decomposition result for each sub-segment. Other SSA methods may be applied without departure from the spirit of the invention.

The representative signatures of the resulting set are then processed by the finding the best SVM separation for each possible speech segment super-group (i.e., each speaker). This produces a very low dimensional set of signature feature elements (such as atoms in the disclosed embodiments) and classification data 204 that reliably discriminate between the target groups.

Summary of Certain Related Elements of SVM Derived Processing

As described in preceding paragraphs, the principal of sparse, adaptive C-F tiling to achieve a small set of optimized discrimination features provides amongst other advantages the ability to distinguish signal segments independent of how their information is subsequently processed. Preferably, the data is processed using an SVM based scheme.

SVM and Feature Selection:

Once the given signals have been put through GAD, distinctive atoms are formed for all signals. Each signal's amplitude for each atom may be used as features to discriminate between, or divide, speakers. Using this information, the atom locations for the features that provide the best division between two groups are determined. All possible features are paired together to find the line that intersects the division point and results in the fewest number of misclassifications of the data. The feature pairings are then ranked based on the number of misclassifications, and a best pairing is chosen. This is simple if there is only one pairing that does the best, but more problematic if a tie results. To nonetheless select the features that best separate the groups in that event, the distance from the line for all points is calculated. All points are accordingly weighted based on distance from the line, such that points closer to the line are weighted stronger than points farther from the line. This favors a division line that more consistently puts all signals a little bit off from the line over one that erratically puts some signals quite far from the line and other signals very close to the line.

Figure 10:
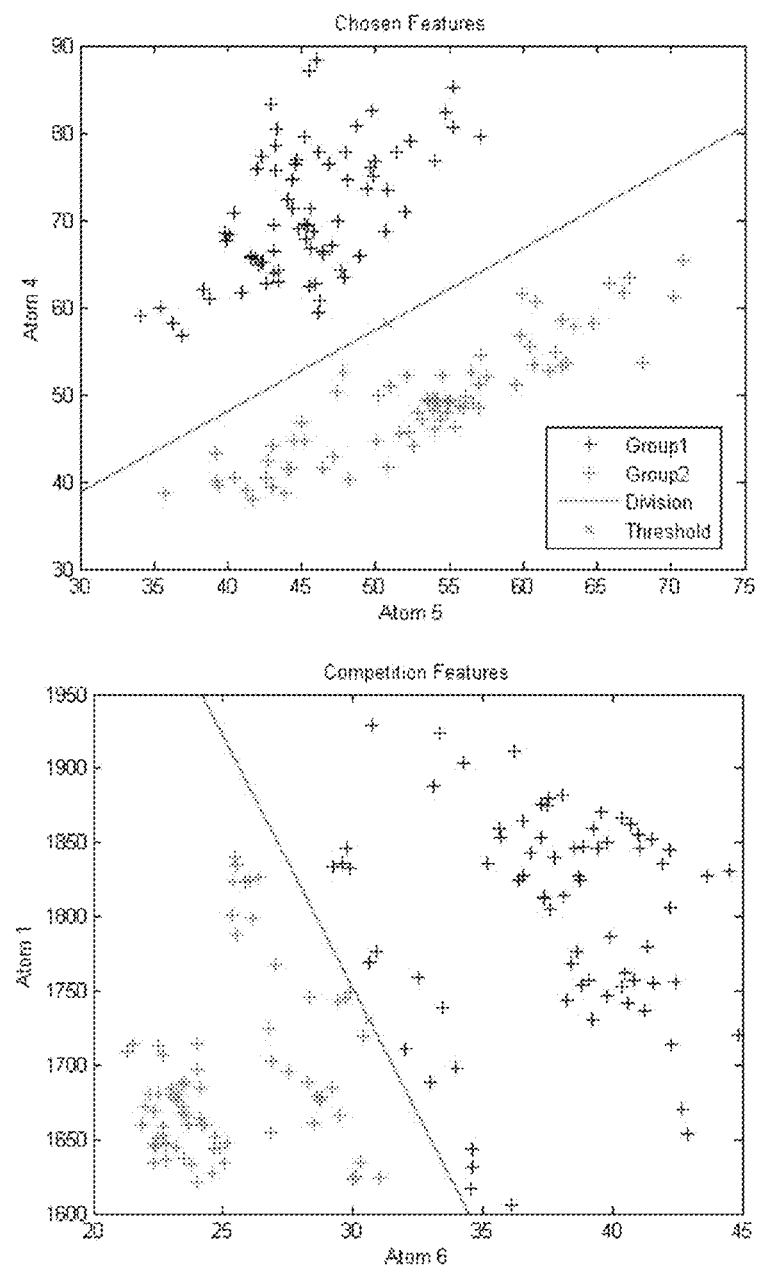
FIG. 10 is a set of illustrative graphic SVM plots of certain test results obtained for determining an optimal feature pair to distinguish between speech segments of two paired sources, utilizing a system formed in accordance with the exemplary embodiment illustrated in FIGS. 1 and 2.

An example is graphically illustrated in FIG. 10, where as part of feature selection, two potential feature sets for the same data are considered. The first feature pair shown is chosen over the second feature pair shown which had been in competition for the choice.

Preferably, the weighting function employed is a Gaussian defined by the equation:

$$weight = \left(\frac{r}{R}\right) * e^{-\frac{(\frac{r}{R})^2}{2*\sigma^2}}$$

where r represents the distance from the point to the line, R represents the maximum distance between any point (including points not in the two groups) and the line, and a (the standard deviation) is set to a value of 0.05. Each correctly classified point from both groups is accordingly weighted, and the weightings summed. The best feature pairing is defined to be the one with the greatest summation.

Speaker Identification/Classification/Clustering by Non-Parametric Voting:

As described in preceding paragraphs, the best pair of features on which to separate between every pairing of speakers is determined. Thus, for 8 different speakers, 28 pairs of best features are obtained from the 28 separate pairings of speakers (speakers 1 vs. 2, 1 vs. 3, 1 vs. 4, 1 vs. 5, . . . , 7 vs. 8) in the noted data set example. Each new signal addressed is compared to all of these pairings/separations to determine which speaker group to put the new signal in.

Figure 12:
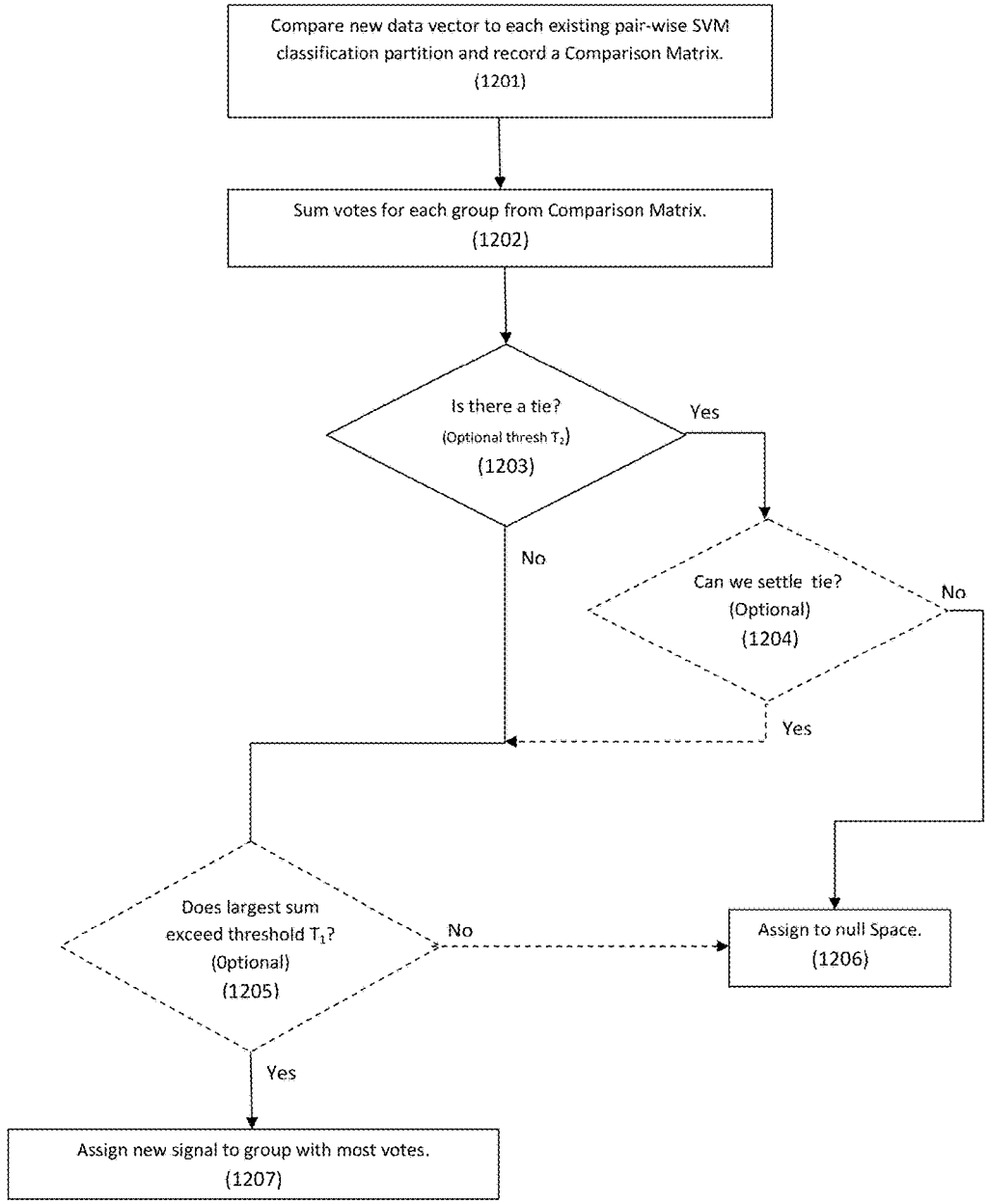
FIG. 12 is a flow diagram illustrating a voting process for correspondingly mapping an input acoustic signal segment to pair-wise decision subspace in accordance with an exemplary embodiment of the present invention.

FIG. 12 illustrates the flow of steps in an exemplary example of this process. A new, or input, signal is projected into the same decomposition space used to separate training data, as illustrated in FIG. 2. The new signal is thus represented as a set of sub-segment vectors, each of which includes descriptive coefficients in the same set of sparse-adaptive C-F atoms as is used in each of the pair-wise comparisons. Those vectors are thereby projected into each decision space of interest to determine within which of the particularly paired groups the they fall. For example, in FIG. 4*a*, two comparisons are shown for illustrative purposes in two dimensions. A new signal would be projected into the first space by using its coefficients for Atoms 9 and 24, so as to determine whether the new signal is more similar to AR or to ED (of the paired 'groups') based on which side of the dividing line it falls. The same new signal would also be projected into the second space by using its coefficients for Atoms 73 and 9, so as to determine whether the new signal is more similar to KC or ED (of the paired 'groups') by observing on which side of the line it falls. The individual determinations in connection with each pair-wise decision space represent votes for one or the other of the groups in each pairing. Comparison results are thus obtained in this example for each new signal.

This results in a comparison matrix, such as shown in Table 1 of FIG. 11, that indicates where the signal was grouped for each comparison. A value "1" indicates a vote for the group corresponding to the row of an entry, while a value "2" indicates a vote for the group corresponding to the entry's column. To tally the votes, a count is taken for each row to determine the number of 1's in each row. A count is also taken for each column to determine the number of 2's in each column. The row and column votes are summed to obtain the total number of votes for each group.

The maximum number of votes any group can receive is equal to the total number of groups minus one (one vote for each comparison of the group with all other groups). Thus each sub-segment data vector includes a total of $$\sum_{i=1}^{nGroups-1} i \equiv \binom{nGroups}{2}$$

votes, of which a maximum of (nGroups−1) may be given to any single group, where nGroups is the number of groups in which the new signal may potentially be classified. To classify a signal, the group having the most votes is found. The signal is then placed in that group, as indicated by block

1207 of FIG. 12. In an ideal case, one group would receive the maximum number of possible votes, obviating the possibility of a tie.

In the event that no single group receives a maximum number of votes, there will exist multiple groups with the same number of votes. In certain embodiments, a null group is established to represent the state where the group to which a signal belongs cannot be determined. The signals put in this null group are precisely the signals that experience ties for the maximum number of votes, as illustrated by block 1203 of FIG. 12.

This can be limited further, in certain embodiments, with a tie breaker (block 1204) such as for example: in the event of a tie between two groups, using the matrix element corresponding to the direct comparison between the two tying groups to place the signal into one of these groups. FIG. 11 illustrates an example of a situation where a tie between two groups, namely groups 5 and 8 in this illustration, must be broken for the new signal. Table 1 shows the comparison matrix structure which arrays the entries with respect to all comparisons between different combinations of group pairings. Using this comparison matrix structure, if a tie between, say, groups 5 and 8 needed to be broken for the new signal, then the matrix element in the $5^{th}$ row, $8^{th}$ column that shows the result of direct comparison of the new signal concurrently against these two groups (in the decision space for that group pairing) would be turned to, and the decision value derived there would be applied to classify the new-signal. This effectively makes the null group smaller by eliminating two way ties.

Additionally, in certain embodiments, classifications may be thresholded. That is, the maximum number of votes may be compared with a threshold value $T_1$, and if the top group does not receive enough votes, it is put in the null space (1206). (See the optional block 1205 of FIG. 12, shown in broken lines.) This effectively increases the size of the null space. This approach allows for identification of novel speakers (i.e., those new signals that are dissimilar to all others prior), rather than forcing an erroneous grouping with the least dissimilar or any other of the known speakers. This also allows for automatic clustering of data without reference to a previously indexed set.

Table 2 of FIG. 11 illustrates a sample comparison matrix for eight groups. In this instance, Group 1 received the most votes for a new signal, so the signal would be placed in that group. Entire files of signals may be classified in this manner. For each signal, a comparison matrix is similarly generated. The initial method of deciding for the file was to use the groupings for all signals in the file. A list of signals and groups in which they are put is formed, then a count is taken to determine which group had the most signals, and place the file in the winning group.

Using this non-parametric decision criteria, there are numerous ways to resolve null grouped signals. In certain embodiments, a vote may be accumulated to put the file in the null group, while in others the otherwise null signals might simply be ignored. Note that a file null space may be maintained even if no voting result for a signal is associated with a null group per se. In certain embodiments, the null space may result from ties between the signal votes, or from additional voting relative to an additional threshold.

In the exemplary embodiment disclosed, the method was extended to gather all of the comparison matrices for all signals in a file. In this way, the signal vote for the groups was accumulated. Instead of piecemeal deciding the group to which a signal belongs, all of the group votes were summed to make a joint decision, placing each signal in the group(s) with the maximum number of votes.

If there are multiple groups that tie, the file would be placed into the null space. As before, to increase the size of the null space, an additional threshold $T_1$ may be introduced; all files not receiving enough votes to exceed the threshold $T_1$ for joining an existing group are thus put into the null space.

Again, other embodiments may take related routes, such as a middle ground between the full comparison matrix method and the initial signal vote method. Typically, the top group(s) for all signals are found, and the votes derived from the row and column corresponding to the top group are used in the comparison matrix. If multiple groups happen to receive the same number of votes, all tying rows and columns are used, with the votes being divided by the number of groups in the tie.

In accordance with yet another alternate embodiment, instead of (or in addition to) comparing the maximum vote count to a threshold $T_1$, a difference between the top two vote counts may be compared to a threshold $T_2$. Thus, block 1203 in FIG. 12 would be modified to define a tie as including any groups within $T_2$ votes of the same value. One effect of this is to create a more dramatic change in the size of the null space with small changes in the threshold.

Application Example: Taxonomically Distinguishing Terrain Data

Figure 13A:
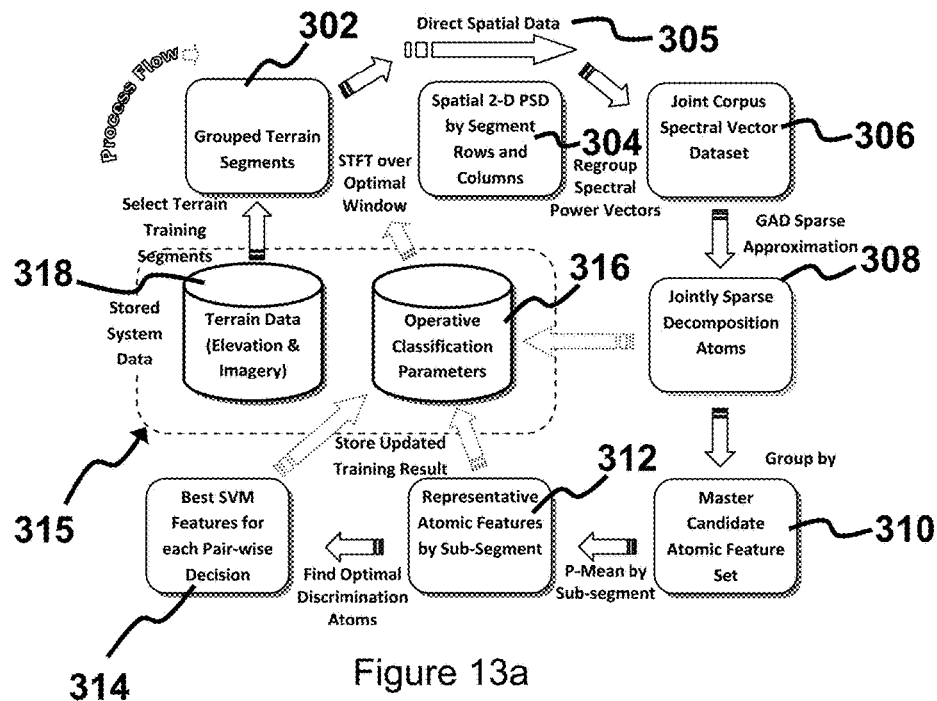
FIG. 13a is a flow diagram schematically illustrating the flow of processes for training a system to distinguish segments of terrain data in accordance with an alternate embodiment of the present invention.

Referring to FIG. 13*a*, there is shown a flow diagram similar to that shown in FIG. 1, providing an illustrative overview of a training process carried out in accordance with another exemplary embodiment of the present invention, as applied towards taxonomically distinguishing the nature and type of geographic terrain in a certain spatial region from imagery, elevation, or other such data segments captured therefor. In certain applications, the data segments may include one or a combination of different data types such as image data (photos of the ground) and/or elevation data (LIDAR "relief" data). Effective classification results may be obtained by use of either data types independently or in combination.

The training process is applied in the exemplary application shown to obtain signature feature sets and operative classification and clustering parameters for a corpus of terrain segments. The process is run in this manner on a set of training data to optimize a feature space based on all available data, such that stored parameters may be used subsequently for making on-the-fly determinations to classify newly acquired terrain data segments for other unknown spatial regions.

The training process example starts by taking a selection of terrain data segments at block 302 from a corpus and ends by updating the classification decision parameters stored at block 316 with optimized class separation settings. In the illustrated example, each terrain segment in the training corpus preferably includes imagery or elevation data captured over a designated spatial region. The scale of this region depends on the data product available for the particular application, and the particular type of unknown information to be obtained in that application (see examples below). Each spatial region for training purposes is preferably inspected or otherwise classified by ground-truth information to establish a reliable baseline.

Grouped terrain data segments for training purposes may be minimal or extensive in scope. For example, the grouped data segments may be provided for known geographic regions of certain terrain type as selected by a field user; or, they may be provided for more expansive regional coverage by leveraging worldwide geo-information data to establish universal signatures for specific types of terrain.

The training process enables the given system to essentially learn how to best discriminate between regions of different terrain types without having to substantively evaluate the grouped segments' data content. Toward that end, the process in this exemplary embodiment obtains signature feature sets and operative classification and clustering parameters 316 for a given corpus of elevation and/or image terrain data 318, and maintains them in system data storage 315. This process of acquiring and updating terrain data is run periodically to re-optimize the feature space based on all available data, and the stored parameters are then used for making on-the-fly determinations for classifying newly-acquired terrain data segments or satisfying user queries.

The raw data source for such terrain analysis purposes incorporates in various instances elevation data, image data, or preferably both. If both types of data are incorporated, the data may be combined; however, they are preferably treated in a quasi independent fashion as disclosed in connection with FIGS. 1-4(A) and 1-4(B), with their information jointly considered in the final decision criteria. From each grouped, or continuous, segment of terrain data, the select source terrain data are considered, and a two-dimensional (2D) Power Spectral Density (PSD) transformation of the data is preferably obtained at block 304 according to spatial position (for example, row and column locations). The PSD data is then passed for spectral vector dataset generation at block 306. Alternatively, the raw spatial data may be directly passed to block 306 for spectral vector dataset generation, or a combination of raw and PSD transformed data may be combined to provide independent feature sets. Where a PSD transformation is obtained, the PSD data serves as intermediate means to facilitate generation of spectral vectors, which are decoupled from local spatial position. The multiple alternative approaches enhance system utility, since certain terrain features (such as ground texture) correspond to arbitrarily positioned patterns, while others (such as high-ground dominance) are more effectively assessed when relative positioning within a given terrain segment is considered.

The flow then proceeds to block 308, where a GAD type simultaneous sparse approximation operation is carried out, much as in the Acoustic example illustratively described in preceding paragraphs, to achieve jointly sparse decomposition over the spectral vector dataset collected at block 306. The decomposition provides for the spectral vectors of the dataset respective representations, where each representation includes a combination of a shared set of atoms weighted by corresponding coefficients (each atom itself being a multi-dimensional function of predefined parametric elements and is drawn from a Gabor or other suitable dictionary of prototype atoms). This provides a set of decomposition atoms, thereby creating a data-adaptive, sparse tiling of the space-frequency (T-F) plane with respect to data taken from the raw signal space or the cepstrum-frequency (C-F) plane with respect to data taken from the PSD transformed signal space, each of which is optimized to capture the common and discriminating characteristics of members of the underlying dataset. (Note that references to "T-F" are used for convenience and simplicity herein to refer generally to not only a time-frequency plane but also to the plane resulting in certain instances where such "time" may be replaced by space in the sampling organization of the signal vectors.)

The decomposition atoms generated at block 308 are grouped by segment to form a master set of candidate atomic features at block 310. The master feature set provides the common atoms by which every respective spectral vector or raw data vector may be represented, preferably as a weighted combination thereof. The coefficients which provide the respective weighting provide a vector space of tractably small dimension.

The GAD operation retains sufficient information to map the decomposition back to the source space of the spectral dataset—in the case of PSD processed data, to the power spectral coefficients, while individual features lie in the C-F plane, and in the case of raw source data, to the original vectors while individual features lie in the T-F plane. This data-adaptive, sparse tiling of the spatial T-F and/or C-F planes captures common and discriminating characteristics of the dataset. Decomposition atoms provide a master set of candidate features. Their respective coefficients provide a vector space of tractably small dimension. This information is collapsed over sub-segments of each terrain segment, capturing reduced dimensional feature vectors for each. Each segment is thus subdivided for purposes of processing into constituent (preferably overlapped) pieces of terrain regulated in spatial extent. Within the example embodiment, this is preferably done using a parametric mean (P-mean) operation that is part of the GAD architecture, as described in preceding paragraphs. The parametric mean captures the atomic features' typicality over a given sub-segment of the terrain's spatial extent, and stores the same as that sub-segment's representative vector of atomic features.

At block 312, a collection of these representative vectors for the different sub-segments are thus generated in the candidate feature space for each terrain data segment. Each terrain segment may represent for example one specimen for one particular spatial region for which a plurality (number of sub-segments) of representative feature vectors are available. At this point, a smaller set of atoms optimally effective in discriminating one segment from another is sought.

A suitable SVM classification training system is preferably employed in this regard to down-select for each pair of terrain segment classes a small sub-space of atoms that best discriminates between that particular pair of segment classes, as indicated at block 314. In the exemplary embodiment shown, the best (or optimal) pair of atoms for discriminating between the representative vectors of two different terrain segments is identified by SVM. The optimal sub-space of such pair-wise decision atoms for discriminating between the paired terrain segments thus derived are added to the operative classification parameters 316 of the system data storage 315.

Experimental results demonstrate that a collection of such n-wise decisions (with k=2 for pair-wise decisions) provides an effective and manageable basis for partitioning the terrain data, and tends to be faster than building a multi-class partitioning space. After processing, the actual data stored in the system data storage 315 in this exemplary system includes the corpus of terrain data samples along with the operative classification parameters needed to speed processing of new data classification or of user queries.

Figure 13B:
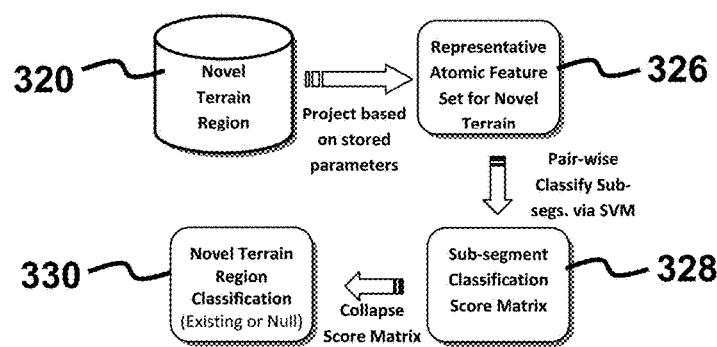
FIG. 13b is a flow diagram schematically illustrating the flow of processes for classifying a segment of terrain data received by a system trained such as illustrated in FIG. 13a, in accordance with an alternate embodiment of the present invention.

Processing to Classify Unknown Terrain Data:

Turning to FIG. 13b, there is shown a flow diagram providing an illustrative overview of an iterative classification process carried out on newly acquired, or novel, terrain region data in accordance with one exemplary embodiment of the present invention. Iterative classification of novel terrain data are made by this process using stored system data obtained in the manner described in preceding paragraphs. As in the process of FIG. 13b, novel terrain data obtained at block 320 may be directly projected, or PSD transformed then projected, based on pre-stored classification parameters into the optimized feature space thereof, as indicated at block 326. This corresponds to the matched fixed and sparse transform steps such as described in preceding paragraphs.

SVM is then executed to classify the novel terrain data segment relative to others in the pre-stored corpus. A suitable vote scoring process is carried out at block 328. Depending on the scoring process results, a novel terrain data segment may be assigned either to an existing class or to the null space at block 330. Terrain segments assigned to the null space are deemed sufficiently different from all others in the pre-stored corpus to warrant their own class, as they do not sufficiently match any existing samples. For example, the novel terrain segment may have been captured for a spatial region that has not been indexed before. This classification process can be used either to conduct as a database search, or to incrementally update a database with local terrain samples.

Route and Load Planning and OACOK Terrain Assessment Processing:

A quantitative classification of any terrain data segment may be obtained using the classification process illustrated in FIG. 13b. Users may quickly examine the terrain makeup of regions along a planned route, for example. Spatial regions may be classified according to such terrain types or factors as: open terrain, flat terrain under trees, treed terrain with heavy underbrush, rock and boulder fields of different sizes, scree or loose dirt, undulating ground texture, or the like. The various terrain types may then be factored into cost functions for traversing the route. Further assigning quantitative results and movement coefficients to this data will help inform further automatic route and load selection operations.

In addition, spatial regions may be distinguished based on such other factors as tree stem density, boulder fields, undulating or crevassed terrain/drainage, and the like to accommodate reliable analysis of a strategically planned route. Military planners, for example, refer to "OACOK" analysis, the acronym referring to "(a) Observation and Fields of Fire, (b) Avenues of Approach, (c) Key Terrain, (d) Obstacles and Movement, (e) Cover and Concealment." In certain applications, automatically highlighting or color coding aspects of interest on a terrain map may, for instance, would significantly speed up a leaders' decision time. Similarly, terrain features such as strategic areas of observation may be identified, as may other strategically significant like those areas containing smooth ridgelines, flowing water, etc.

User-Defined Terrain Classes:

In addition to matching established terrain classes, the subject system and method may be suitably applied by end-users to identify their own signature classes of interest. For example, certain combinations of features may signify suitable landing zones in a particular region of engagement, or certain mountain terrain features such as draws may signify key areas of enemy activity. Training examples may be highlighted by the user, such that similar structures may be then automatically identified in a local area. In another application, certain salient ground features may be identified for use as referential waypoints or landmarks in small dismounted ground unit navigation.

Test Examples

Figure 14A:
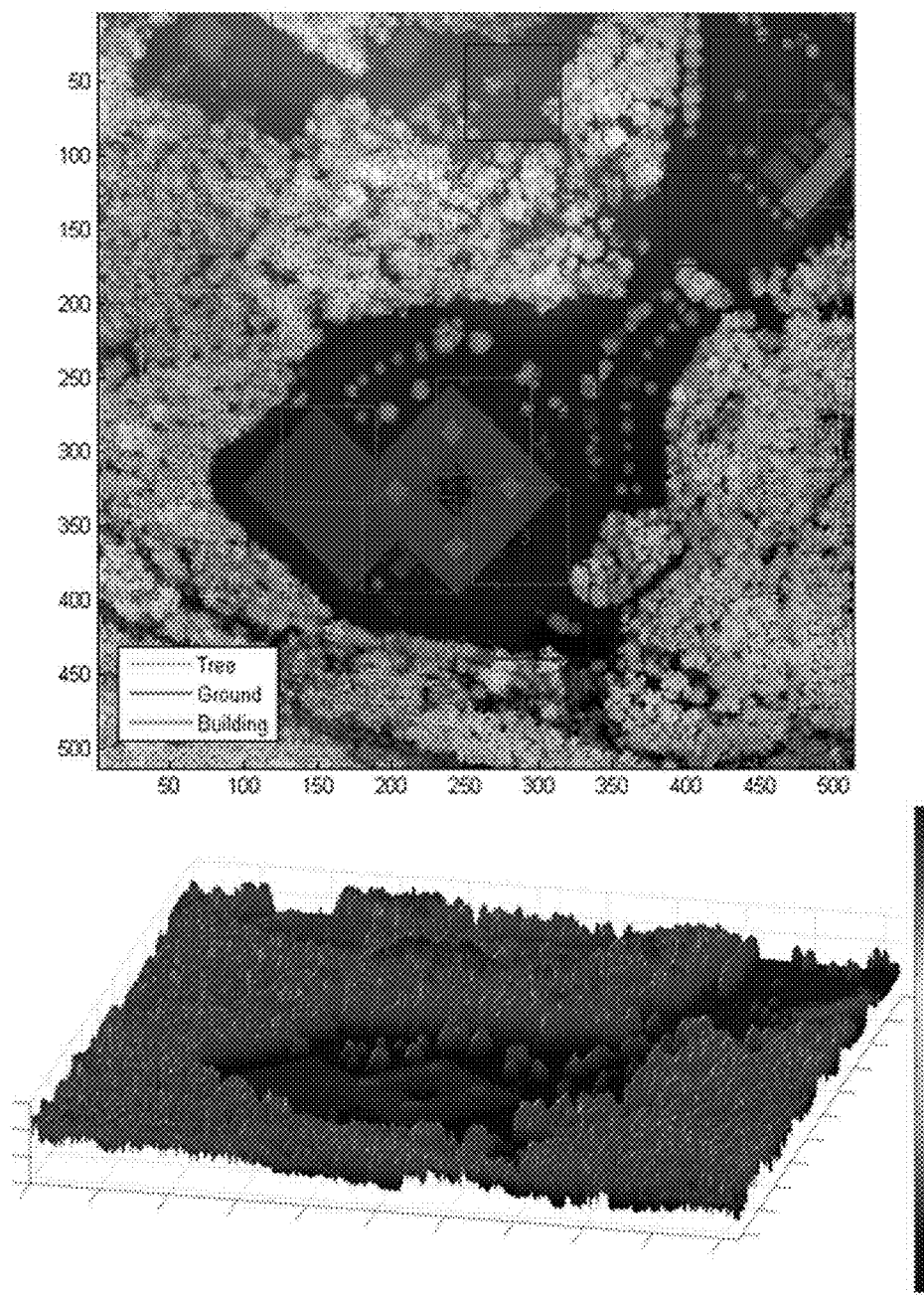
FIG. 14a is a 2D overhead photograph and a corresponding 3D graphic plot of a spatial region sample containing terrain segments to be taxonomically distinguished utilizing a system formed in accordance with the exemplary embodiment illustrated in FIGS. 13a and 13b.

Test Data:

The efficacy of the disclosed embodiment for such terrain applications is illustratively demonstrated upon certain exemplary segments of terrain data. FIG. 14a shows a spatial region formed by multiple segments of terrain data, where the region contains buildings, trees, and generally open areas. The terrain is shown both in a top down view as a grey-scale plot, and in a three dimensionally (3D) projected view using, for example, 1 meter position LIDAR data. Within the region, six square terrain segments 340, 342, 344 have been delineated for each of three preselected classes: tree dominated areas, predominantly open areas, and areas containing buildings. Thus, terrain segments 340 each represent areas which are tree dominated, terrain segments 342 each represent areas which are predominantly open, and terrain segments 344 each represent areas which contain buildings or other such manmade structures. Using the system training process described in preceding paragraphs, the various terrain segments 340-344 are jointly analyzed, and GAD-based feature vectors are thereby extracted for each of the terrain segments 340-342. Those features determined to best discriminate the particular terrain types are sub-selected to derive a signature structure for each terrain type.

Figure 14B:
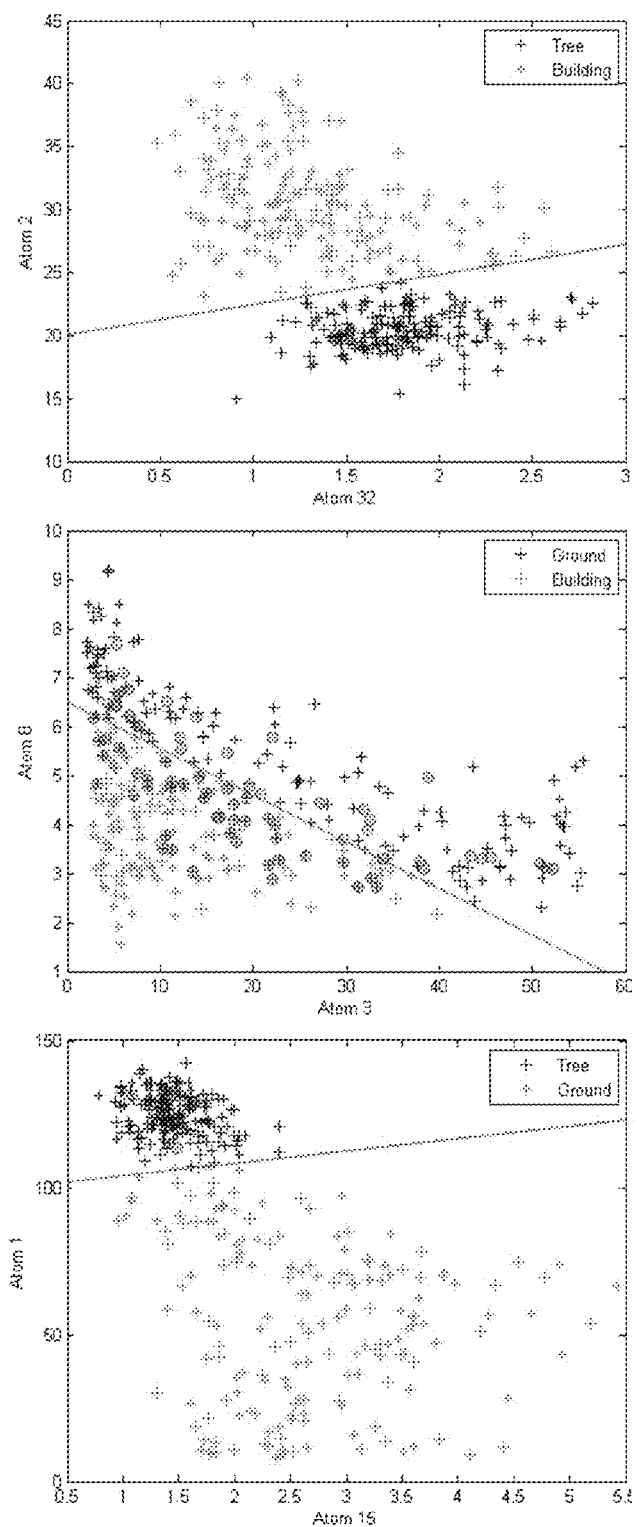
FIG. 14b is a set of illustrative graphic plots comparing certain test results obtained for distinguishing between terrain types originating the terrain data segments taxonomically distinguished utilizing a system formed in accordance with the exemplary embodiment illustrated in FIGS. 13a and 13b.

In FIG. 14b, examples of resulting SVM separation plots for mutually discriminating each data class (terrain types in this example) from each of the others are shown. Each SVM separation plot is obtained in this example with respect to the two GAD feature atoms with the goal of highly conspicuous separation between plotted points of the respective data classes/terrain types being mutually compared. Notice the distinct cluster separation between tree and open ground areas (yielded by the feature atoms 1 and 15), while the separation between open ground and building areas (yielded by the feature atoms 8 and 3) are more difficult to distinguish. Decisions are preferably made upon combinations of vectors for each terrain area, not upon any particular pairing of individual feature vectors. Hence, the potential ambiguity or confusion left from reliance upon just a few individual feature vectors is overcome by a vector voting process preferably embedded in the classification process.

To test functionality of the given example, "leave-one-out" evaluation paradigm is followed. For example, the system having multiple sample segments available is trained that many times, leaving out one of the sample segments in each training run. So in an example with 18 sample segments available, the system is trained 18 different times, each time leaving out one of the 18 sample segments and attempting to classify it among its peers. Such testing demonstrates as much as 100% success in automatically classifying the left-out terrain segment into the correct class when operating on 1 m terrain elevation data, and demonstrates 88.8% success (2 errors) when operating purely on imagery of the same region.

Figure 15:
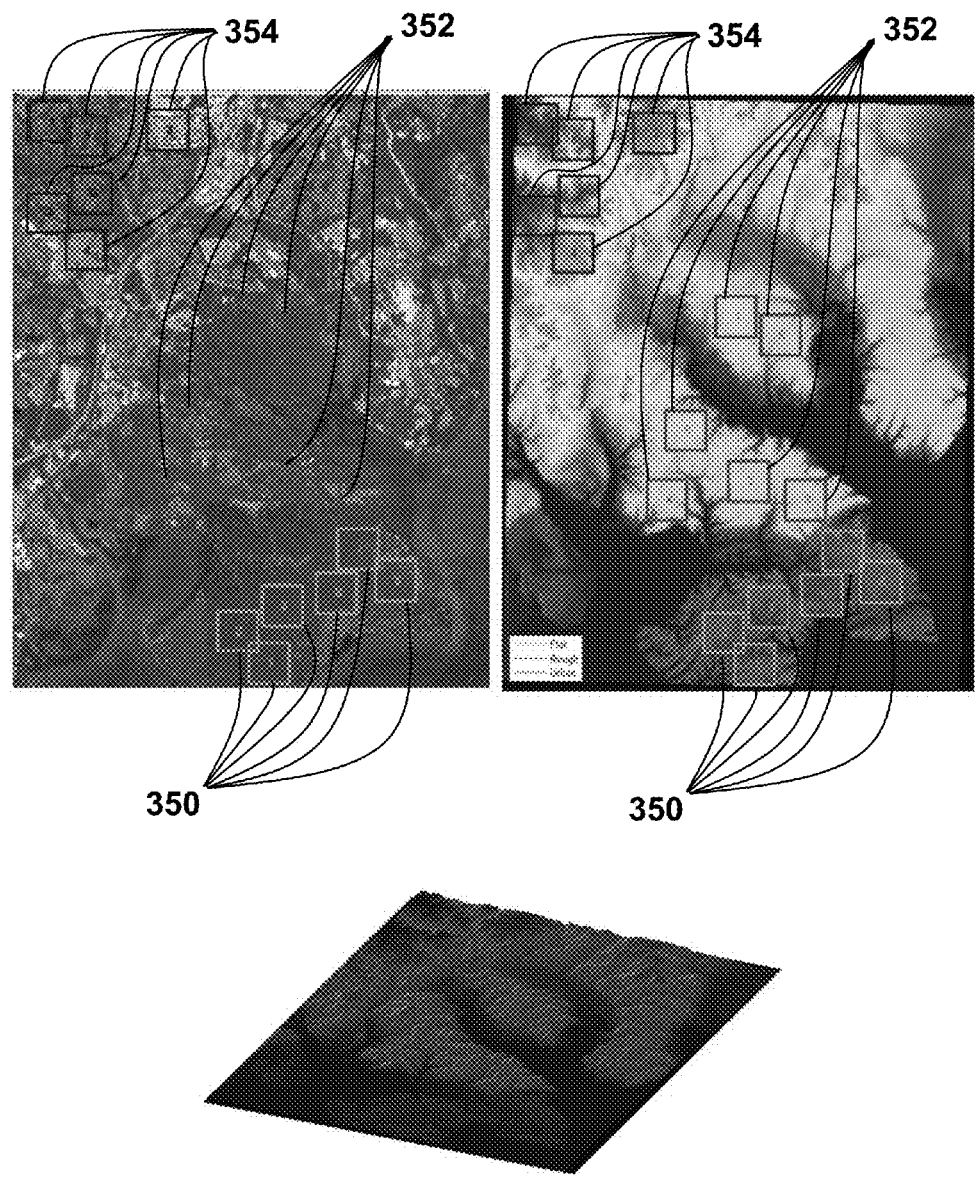
FIG. 15 is a 2D overhead photograph and corresponding 2D and 3D graphic plots of a spatial region sample, illustrating the delineation of terrain segments having different terrain classifications taxonomically distinguished classifications utilizing a system formed in accordance with the exemplary embodiment illustrated in FIGS. 13a and 13b.

Since 1 m Digital Elevation Matrix (DEM) may not be commonly available in the field, the disclosed embodiment's efficacy with Digital Terrain Elevation Data (DTED) Level 2 terrain data segments, such as 30 m post-position data segments, was considered. FIG. 15 shows an example where a similar classification problem is addressed with scaled to 30 m data. In this case, six terrain segments are delineated for each area exhibiting the following properties: relatively flat terrain, relatively hilly terrain, and developed urban terrain. Thus, terrain segments 350 each represent areas which are relatively flat, terrain segments 352 each represent areas which are relatively hilly, and terrain segments 354 each represent areas which contain urban development. (In the figures, the vertical dimension has been scaled by a multiplication factor of 3 to emphasize elevation texture).

In this example, any features related to the absolute elevation of a terrain segment is excluded to avoid this confusing complexity, so that classification decisions may occur based entirely upon aspects of surface texture within each terrain segment. Again, a "leave-one-out" evaluation paradigm was applied; and, as much as 100% success was demonstrated in automatically classifying the left-out terrain segment into the correct class. This was demonstrated upon data segments containing DTED Level 2 (a standard with a 30-meter spaced measurements grid) terrain elevation data. A 94.4% success rate (1 error) was demonstrated when operating purely on imagery of the same region.

Using a larger set of sample 1 m LIDAR data (not shown) in the same training and classification process of the disclosed embodiment, a further test case was evaluated to discriminate between three kinds of geographic surfaces. A 94.2% success rate was demonstrated in sorting 86 sample terrain segments (or tiles) into areas characterized primarily by trees, grass, or pavement. The 5 errors which resulted were found in distinguishing grass areas from pavement areas. This could be easily mitigated to achieve 100% accuracy if LIDAR data were integrated with imagery data in a fused dataset analysis that considers optical color. Suitable processing of data segments employing such fused elevation/image datasets, for example, may be carried out in certain embodiments of the subject system and method.

Figure 14C:
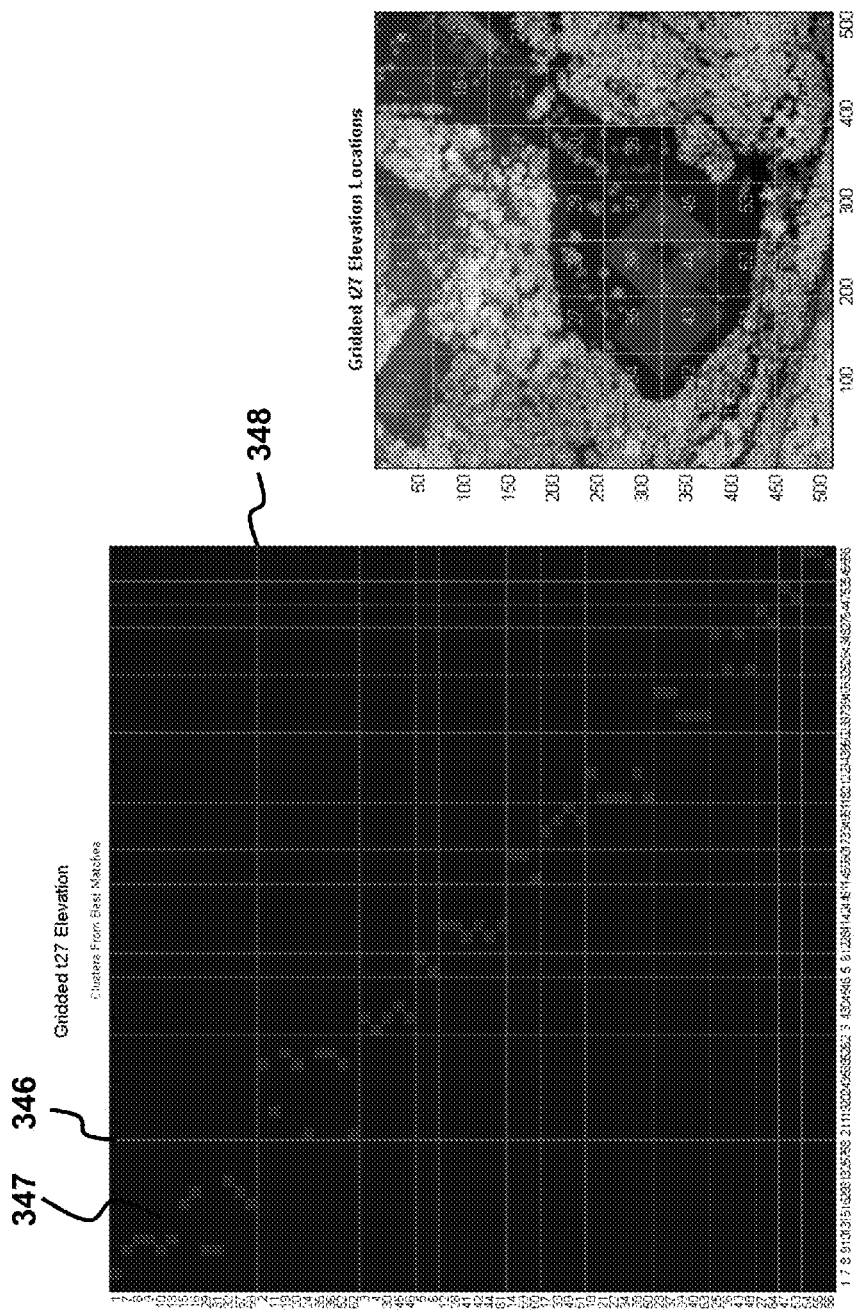
FIG. 14c is an overhead photograph of a spatial region sample and a corresponding graphic plot of points taxonomically obtained from the terrain data segments thereof utilizing a system formed in accordance with the exemplary embodiment illustrated in FIGS. 13a and 13b, illustrating a blind clustering approach to classifying different terrain types of areas within the spatial region sample.

Referring back to FIG. 14c, a blind clustering approach to classifying a segmented terrain region is illustrated. The photographic overhead view on the right shows the original locations of each of the gridded sub selections, or sub-tiles numbered 1-64, delineated on a LIDAR captured tile of terrain data for a given spatial region. The graphic plot on the left illustrates the clusters formed from performing blind association carried out using the training and classification process in the exemplary embodiment disclosed.

The task in this case is to blindly determine the terrain types for each of the regions within the individual delineated sub-tiles 1-64 of the LIDAR captured (or, effectively 'photographed') region. The graphic plot on the left presents the results of the clustering performed via the disclosed taxonomic distinction process on the sub-tiles of terrain data. The results are presented for demonstrative purposes in view of actual ground truth determinations of which sub-tiles should have been properly clustered together. In this graphic presentation, the actual ground-truth clustered sub-tiles are grouped identically along each axis, with the separations between distinct clusters visually delineated by the horizontal and vertical lines 346, 348. For instance, proper clustering in this example (with a certain set of terrain criteria) would have included in one cluster 347 the sub-tiles 1, 7, 8, 9, 10, 13, 15, 16, 29, 31, 32, 57, and 58. The plots of results obtained for these sub-tiles by execution of the taxonomic distinction processes of the illustrated embodiment are each found to lie within (and therefore properly associated with) the cluster 347, as they should. Such proper associations of results are found for each of the other clustered sub-tiles. That is, the plotted points reside within their proper cluster blocks.

Application Example: Taxonomically Distinguishing Anatomic Image Data

Signature reduction processing may be carried out in much the manner described herein in connection with the preceding application examples to taxonomically distinguish image data segments captured for certain anatomic features to determine their source organisms. In the application example disclosed in FIG. 16, the source organisms are different species of winged insects, and the imaged anatomic features include, for instance, portions of the insects' wings. The signature reduction process is preferably facilitated by accordingly pre-processing the captured image segments.

Mindarus Subgroup Classification:

In one exemplary case, four cryptic species of insects belonging to the aphid genus Mindarus were classified. A priori image segment groups were obtained for certain portions of the insects' wings imaged, for instance, according to cytochrome oxidase 1 DNA barcodes.

Pre-processing in this instance includes the orientation of all wing data segments to align in format. This is preferably carried out in sub-steps, wherein only the area of an anatomic image which corresponds to a wing is captured using suitable measures to extract only those image portions of interest. In this example, an entropy filter is first used to filter only those image areas exhibiting above average entropy. The filtered image portions are converted to black and white using a suitably low threshold reference, small areas are removed, and the remaining areas filled. A template-like mask for the insect genus in question may then be applied to the image date preferably to remove extraneous portions of the image for parts of the imaged insects other than its wing. The imaged wing is then taken effectively as a rotated ellipse of imaged features, whose angle and the center are of primary concern. The strongest canny edges of the remaining image (that is, of just the wing) are determined to ascertain the contours of the imaged wing's edges and its strongest, most prominent, veins.

The image ellipse's rotation and center points are referenced to identify and remove the edges located at the bottom of the wing. Finally, a suitable transform, such as a Hough Transform, is applied to the image to ascertain the line components of the image, and determine corresponding $\rho$ and $\theta$ parameters of the strongest line, where $\rho$ is related to distance of the line from a fixed point and $\theta$ the angle of slope. The image is thereafter rotated so that the strongest line is parallel to the wing's top. The mask of the wing is also rotated so that the wing is rotated to the desired orientation illustrated for instance in FIG. 16 (illustrating an original image of a wing pre-processed to extract and rotate certain portions of the image according to a standard form applicable for the intended application). In the illustrated example, the left and right wings are treated separately as they face different directions when pre-processed in this manner.

Once the wing image segments are pre-processed to a desired form, a location at which two veins intersect near or nearest the center of the wing is selected. The image in standard form is preferably set to a frame of two-dimensionally arrayed image pixels. Of these, a preset number of pixels about the selected point location, for example 50 rows of image pixels above and below the selected point and 511 pixels to the left and 512 pixels to the right of the selected point, are used to construct 101 signal segments of length 1024 for each wing. The average constituent values of these signals are then taken to form one signal of 1024 elements for each wing. These averaged signals are taken together and subjected to joint sparse decomposition (preferably via GAD processing as described in preceding paragraphs) to generate 100 or other suitable number of modulated Gaussians (atoms) that may be used to define the signal. The atoms are grouped to form a list of atoms 100 elements long (in this particular example) for each wing. The goal is then to use these atoms to classify test signals into one of the four different species within the genus Mindarus.

The classification problem in this embodiment is broken into smaller tasks, first separating groups 1 and 2 from groups 3 and 4, then further identifying the individual group to which the test signal belongs. This is a hierarchical resolution of each new wing into one of four classes using two pair-wise comparisons; it is an alternative approach to the pair-wise voting schemes employed in other examples disclosed herein.

Preferably, the projection of each wing image signal on each of the atoms is defined, and the training process is carried out as described in preceding paragraphs to determine how well each atom separates the classes (groups). Using this information, SVM separation is carried out on different pairings of atoms to find those pairing which produce the fewest class mismatches. That is, SVM is thus carried out to determine the most discriminating sets of paired atoms.

This results in a two dimensional space (of paired atom values for different signal segments) on which a line of separation may be defined to distinguish whether a particular signal belonging to one class or another class. Each signal provides the particular values of the paired atoms plotted on the two dimensional space. The test signal's corresponding atom values are compared against this line of separation to determine on which side of the line it lies. By repeating this process with successive comparisons of groups, it is determined whether the test signal is a member of group 1 or 2, or if it is a member of group 3 or 4. Successive decisions in this manner lead to determination of the particular group the test signal belongs to.

To illustrate accuracies, the process is carried out on a "leave-one-out" training basis for a succession of new test wing signal segment, each time excluding the processed test wing signal segment from the training set. The overall process yields the confusion matrix illustrated, for example, in the table of FIG. 17b.

Figure 17A:
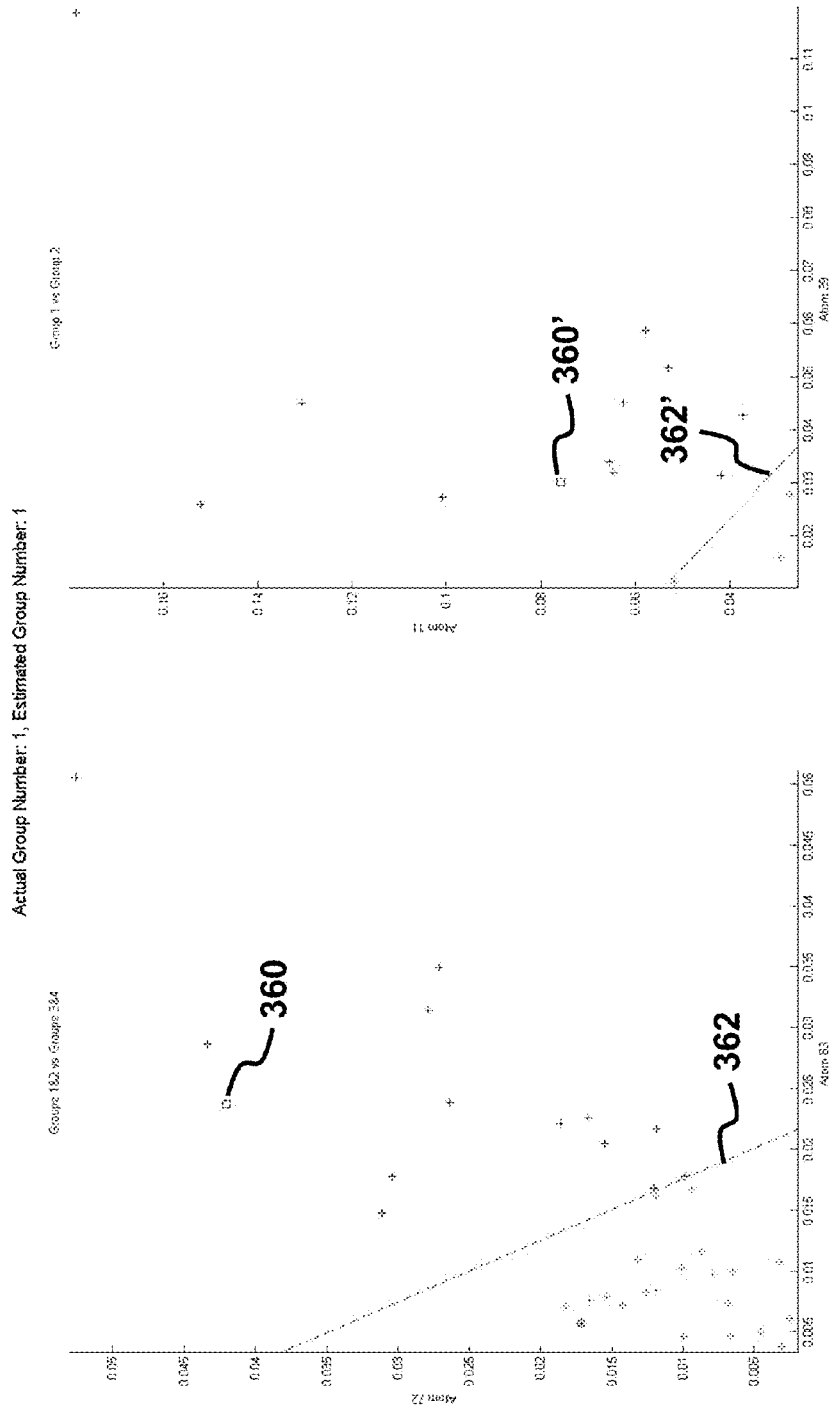
FIG. 17a is a set of illustrative graphic plots comparing certain test results obtained for different insect species' wing image data taxonomically distinguished utilizing a system formed in accordance with an alternate embodiment of the present invention.

The results of running the overall process using the sample wing image of FIG. 16 as the test wing image is shown in FIG. 17a. The SVM separation plot on the left illustrates the separation between groups 1 & 2 on the one hand, and groups 3 & 4 on the other. A blue "+" mark indicates a training wing belonging to either group 1 or group 2. A green "+" indicates a training wing belonging to either group 3 or group 4. The red circle identifies a training point that was incorrectly classified. The squared point 360 indicates the test wing of FIG. 16, plotted on the correct side of the separation line 362. Any wing point lying above the separation line 362 is classified as belonging to either group 1 or 2 and any wing point below the separation line 362 is classified as belonging to either group 3 or 4.

The plot on the right shows the separation between group 1 and group 2. The blue "+" marks indicate group 1 training wing points, and the green "+" marks indicate group 2 training wing points. The square point 360' indicates the test wing of FIG. 16, plotted on the correct side of the separation line 362' (group 1), which delineates the division between group 1 and group 2. Note that different atoms are selected for the different plots. As indicated, the test wing is correctly classified in each plot.

The training and classification processing in the illustrated example here operate on raw (untransformed) image line data averaged across blocks. In alternate embodiments, a suitable transformation such as FFT/PSD pre-processing as described in preceding paragraphs in connection with acoustic and terrain signal segment processing, operations may be enhanced. Utilizing FFT transformed signal segments has the effect of decoupling precise spatial locations of visual features (in either one or two dimensions) from the decision criteria, and focuses the classification's reliance on patterns. This offers advantages in the case of insect wing image classification because not all wing images may be well aligned by pre-processing, and because periodic patterns may affect the outcome.

Figure 18:
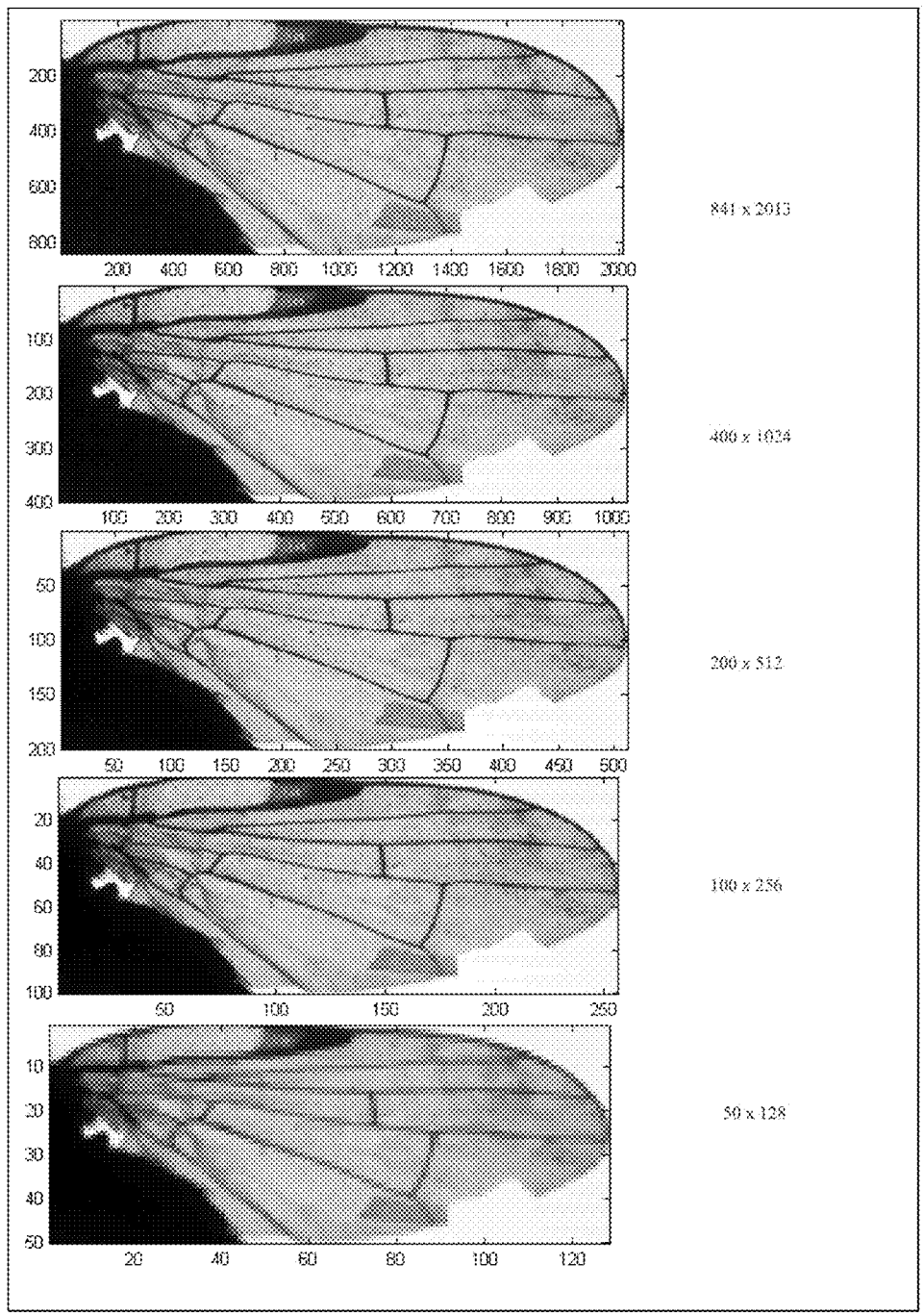
FIG. 18 is a set of photographic image data segments obtained for the same insect wing image with respectively varied image resolutions for taxonomic distinction utilizing a system formed in accordance with an alternate embodiment of the present invention.

Using identically pre-processed image data vectors led to markedly improved performance when the FFT/PSD feature set was incorporated in place of or in addition to the raw data feature set. The following section illustrates such improvement in the context of another sample set of insect wings Tephritidaes Subgroup Classification:

In another example, a larger set of wing image data comprising 25 wing image samples for each of 72 different species within the genus Tephritidaes were taxonomically processed. FIG. 18 shows different resolutions of one such captured wing image used for classification within this much larger group. In order from top to bottom, the captured images are shown with successive native resolutions of 841×2013, 400×1024, 200×512, 100×256, and 50×128. For this larger set, the captured image segments are not subjected to the complex pre-processing described in the preceding Mindarus species classification example. Instead, the captured wing images are preferably just cropped as they are and down-sampled to convert the images to various resolutions, one or more of which resolutions may best facilitate taxonomic distinction (depending on the particular requirements of the intended application). A signal vector data is then constructed for each image from the pixel values either along a certain set of columns or along a certain set of rows within the frame of pixels making up the image. The resulting signal vectors of the captured wing images are otherwise processed in a manner consistent with the processes described in connection with other exemplary embodiments and applications disclosed herein. In this instance, each combination of resolution down-sampling and linear sub-sampling may form the basis of a quasi independent processing stream such as described generally in connection with FIGS. 1-4 (A) and (B) and more specifically in following paragraphs.

In this case, a fixed transform is applied to the raw image data (at the selected resolution). Pixel data across one dimension (a set of rows or a set of columns) is preferably processed to produce a set of log PSD vectors, and GAD operations are performed to decompose the resulting log PSD vectors into a simultaneous sparse approximation. Parametric means are formed across sub-segments of the decomposition atoms obtained for the log PSD vectors. This collapses the data into one or more representative sub vectors across the other dimension (columns or rows, depending on which dimension the PSD vectors were formed along). For example, if the original log PSD vectors are formed across columns, the parametric means are formed across rows. The resulting atom parameters and their amplitude coefficients are analyzed en-masse to determine optimal pairs of features (atoms) by which to discriminate between each pair of compared classes, and voting matrices accordingly formed as described for the preceding examples.

Figure 19:
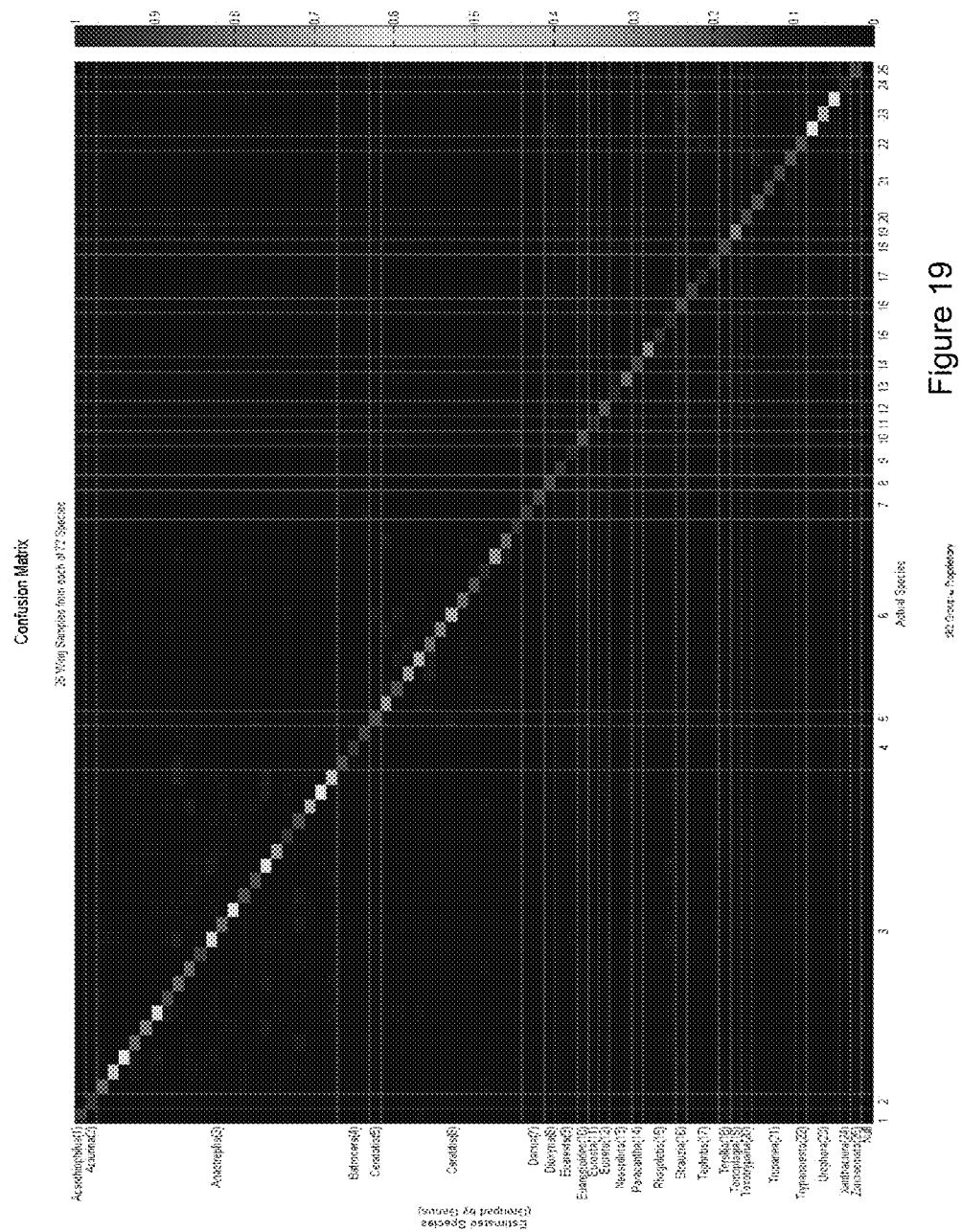
FIG. 19 is a comparative confusion matrix corresponding to sample test results illustratively obtained for taxonomically distinguishing wing images of 72 different species within a certain insect genus, utilizing a system formed in accordance with an alternate embodiment of the present invention.

FIG. 19 illustratively shows the resulting confusion matrix, which reveals the process to be highly accurate at classifying all 72 species.

FIG. 20a illustrates the results of k-fold validation of classifiers developed using the disclosed methods. The k-fold validation approach entails separating a sample dataset into a training portion and a testing portion. In each test run, the two portions are selected randomly from the sample dataset in predetermined proportions. The classifier system is trained using only the "training" portion of the dataset, then its accuracy is tested using only the "testing" portion of the dataset. FIG. 20a summarizes the aggregate information from a large number of such k-fold validation tests, in this case operating on wing images down-sampled to 50×128 pixel resolution. The proportional part of the dataset used for training in each block of tests is indicated on the Y (left) axis. The accuracy, measured as percentage of correct classifications, is indicated on the X (bottom) axis. Within each test block are shown five separate lines, which correspond respectively to different numbers of feature-pairs used in the classification. In this case, each block of lines from bottom to top successively indicates the range of accuracies when 1, 2, 3, 4, then 5 feature pairs are factored together. Each line shows the range of accuracy resulting from 40 trials of each validation test, with the mean accuracy over those trials marked by an "x," and the standard deviation over the trials marked by a vertical hash mark "|."

It is apparent from the plotted accuracy ranges that using a larger portion of the available dataset for training improves both accuracy and variance. This is consistent with good statistical performance. In general, both the accuracy and variance tend to improve as feature pairs are added within each block of tests. This verifies the effectiveness of combining quasi-independent sets of features for classification as disclosed herein.

In accordance with certain aspects of the present invention, information from different feature-pairs may be combined, where such feature pairs are drawn either from the same or independent sparse subspace analyses. Thus, in the case of the system as implemented for taxonomically distinguishing wing image data, different pairs of GAD atoms from one analysis may be combined, as may different pairs of GAD atoms from independent analyses of data across rows of pixels on the one hand and across columns of pixels on the other. Moreover, different pairs of GAD atoms from respective analyses of the raw data on the one hand and PSD vectors thereof on the other hand may be combined. Different pairs of GAD atoms obtained in each of these cases from analyses for different down-sampled resolutions of the source data may likewise be combined.

Again, it is permissible to use higher-dimensional spaces, such as trios, quartets, and so on to larger n-tuples, rather than just pairs of features in the individual classifiers. However, using just a two-dimensional space is preferable in most applications in order to obtain high-accuracy results at reasonable computational costs.

FIG. 20b illustrates confusion matrices demonstrating the effectiveness of the disclosed system for accurately classifying wing images of insects within similar subgroups, in order to determine for example what region of the world the imaged insects may have come from. Such classification would find highly useful application in fields such as geo-location forensics, where tracing an insect to its originating location and time, may aid in tracking the travel history of particular individuals, vehicles, packages, or the like.

Additional variations on the exemplary embodiment and application disclosed herein include use of multiple parameters of derived atoms and multiple combinations of voting data derived from multiple resolutions of down-sampled source data, and from pixel columns and pixel rows of source image data. Generally, higher data resolution tends to produce higher accuracy, and column pixel data is preferred over row pixel data in the particular examples illustrated; but, this varies according to the target organisms according to their photographic size and visual feature size. Note, however, that using just a few high quality emergent parameters (highly discriminant features) may produce excellent results even with the lowest resolution of down sampled source image data. This may provide significant advantages in terms of processing, storage, and other efficiencies.

Note that upon joint sparse decomposition of the spectral vector dataset in the various application examples disclosed herein, amplitudes (or the coefficients) of the atoms (such as GAD type atoms) in the resulting decomposition were used as the parametric aspects of interest in selecting the optimum set of classification parameters. Parametric aspects of decomposition atoms other than amplitude may be used in alternate embodiments. Whereas an amplitude parameter reflects how strongly a feature is present in (or absent from) a data vector, position and (related) phase parameters of the atoms, for instance, would reflect how a key feature shifts either in space or time (depending on the signal type)—or, in frequency if the given features are GAD atoms extracted from FFT or PSD pre-processed data. Additionally, a scale parameter of the atoms would reflect their extent in either frequency or space/time; a modulation parameter of the atoms would reflect their periodicity in space/time or in PSD in a manner that generalizes with kepstrum type analysis. Making use of such other parameters of the atoms may improve results in certain applications. For example, 100% separation of the initial Mindarus set may be obtained using the 3 feature pairs including the atomic phase of the GAD decomposition reduced PSD data.

An Overall Framework for Automated Taxonomic Distinction of Biota:

With example reference to the problem of distinguishing insect types from overall images, images of their wings or of other body parts, we describe a system which may exploit the methods already described, in combination with large scale capture of sample imagery to achieve a flexible mechanism for automated classification on biota of any type.

FIGS. 26 A-C illustrate concept of system operation, using a database of previous acquired images in combination with methods disclosed herein to provide a system operational for automated ID of insects.

We enable non-scientist field users to collect an insect or portion of an insect, to photograph it using available tools, and to transmit the image and associated collection data to an online system for rapid evaluation and screening. Actionable information is transmitted back to the field user. Insect-linked handling and response guidance can be defined in collaboration with appropriate government agencies; this could include, for example, whether immediate action is needed and to whom the specimen should be forwarded for any further evaluation. With sufficient reference and training data, our system will eventually be able to pinpoint details of any important insect's global origin.

Insects and related arthropods are known to vector important and deadly diseases. Mosquitoes vector malaria, filariasis, dengue fever, yellow fever, West Nile virus, and many other diseases, resulting in millions of deaths each year. Ticks, sand flies, assassin bugs, and tsetse flies are a few of the other well-known disease vectors. There are massive potential health costs associated with failing to identify threat vectors, monitor their presence and track their spread. At the same time, the most important insect pests of U.S. agriculture and forestry are of exotic origin. The economic impact of their presence within our borders is enormous. Pests already present must be monitored and tracked, and the single most cost-effective strategy for dealing with new potential pests is to keep them out in the first place.

Timely and accurate identification of insects intercepted within the U.S., at our ports and borders, and in the diverse world-regions of U.S Armed Forces' deployment is critical. Automated tools that reduce expert workload will make the process significantly more efficient, saving time, expense, and potentially lives. Our proposed system can quickly identify the insect to a variety of taxonomic levels (family, genus, species, or regional population) and can provide a level of confidence for the identification even in the hands of inexpert users. This information can then help inform human decision-making regarding whether and to whom to refer a specimen, and whether and how to take prompt, preventative actions.

Fast, accurate insect identification technology has diverse potential applications, including:
Agricultural border and port security.
Tracking and monitoring the spread of pests and invasive species.
Monitoring of disease vector insects in the U.S. or among our deployed troops.
Geo-location forensic tracking of the movement history of packages, people, or vehicles.
Scientific research purposes.

Figure 24:
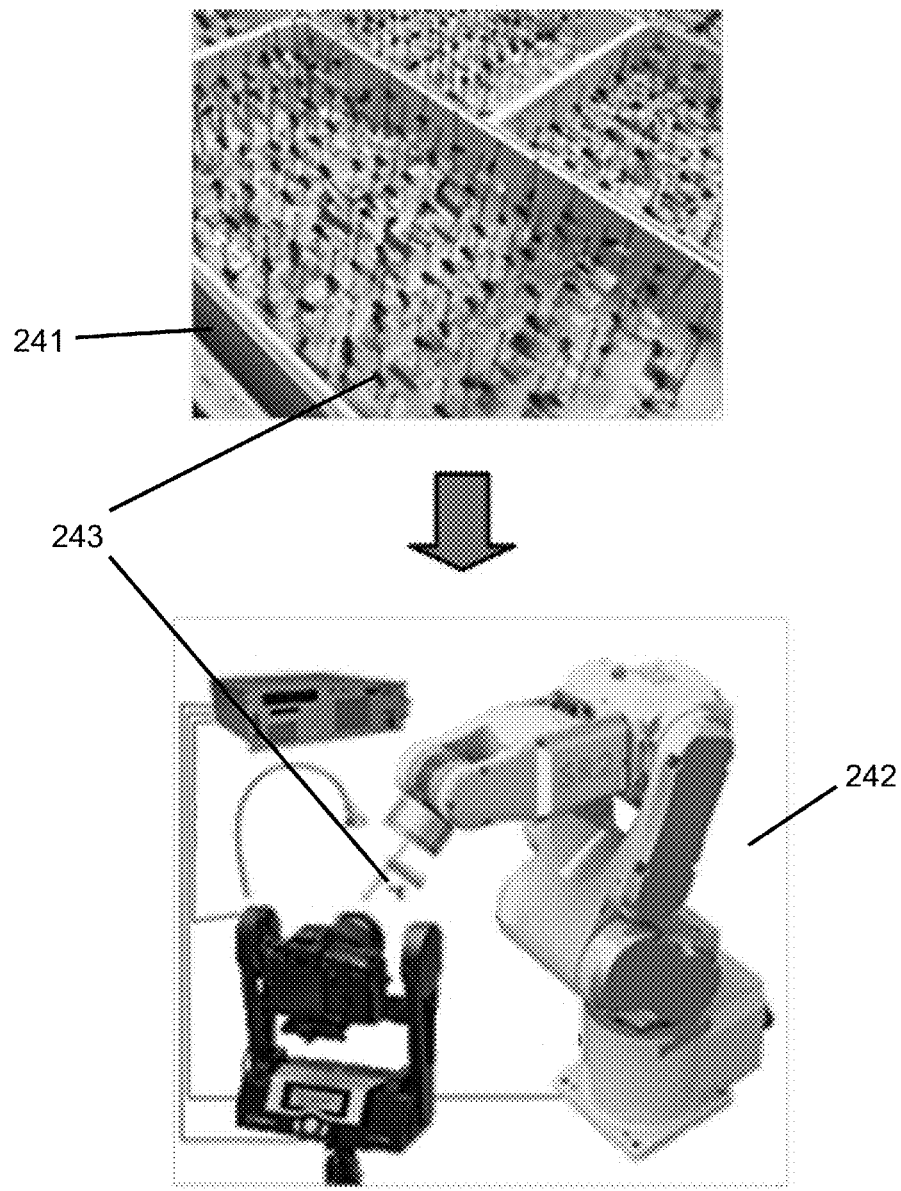
FIG. 24 is a schematic diagram illustrating the application of a system incorporating an exemplary embodiment of the present invention to operate on specimen work pieces of the type illustrated in FIG. 23.
Figure 26A:
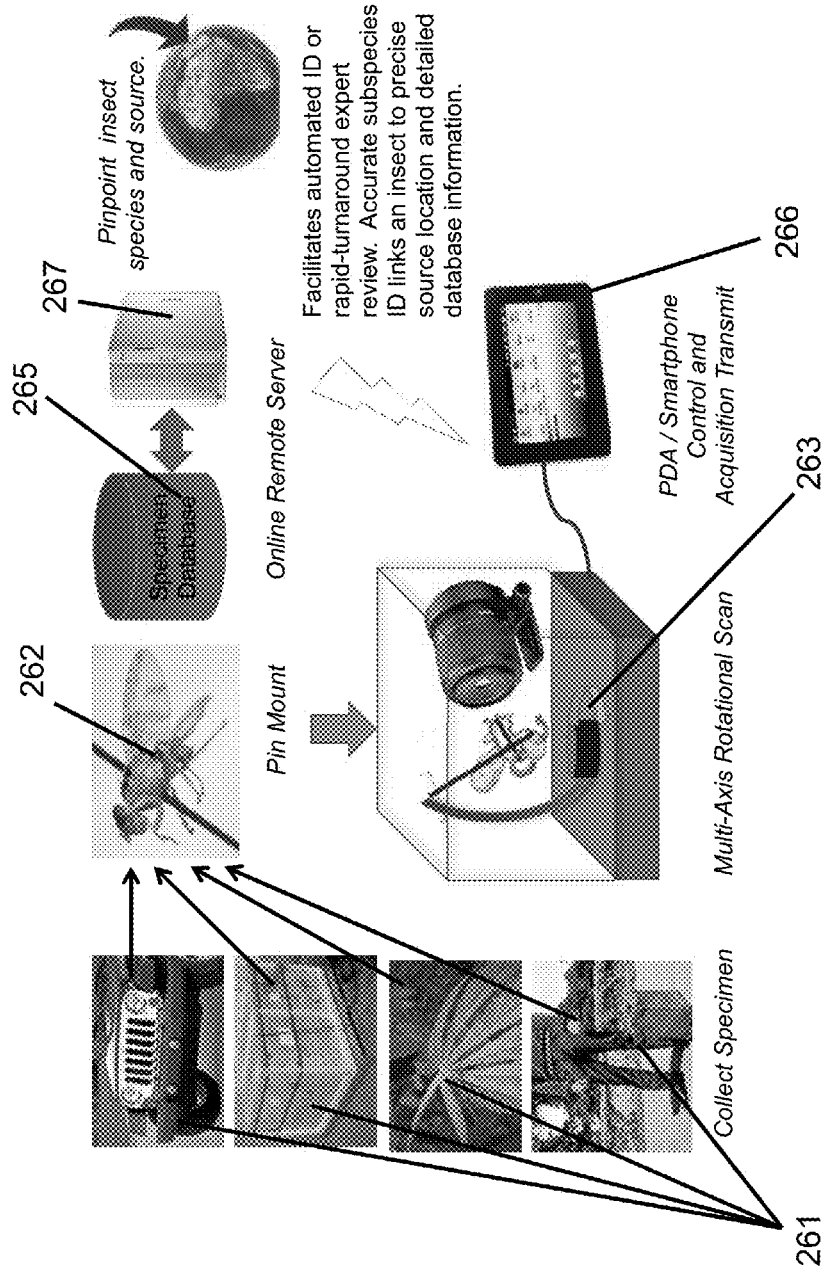
FIGS. 26A-26C are schematic diagrams illustrating different broad scheme application scenarios of a system incorporating an exemplary embodiment of the present invention for adaptively imaging insect specimen work pieces.
Figure 26B:
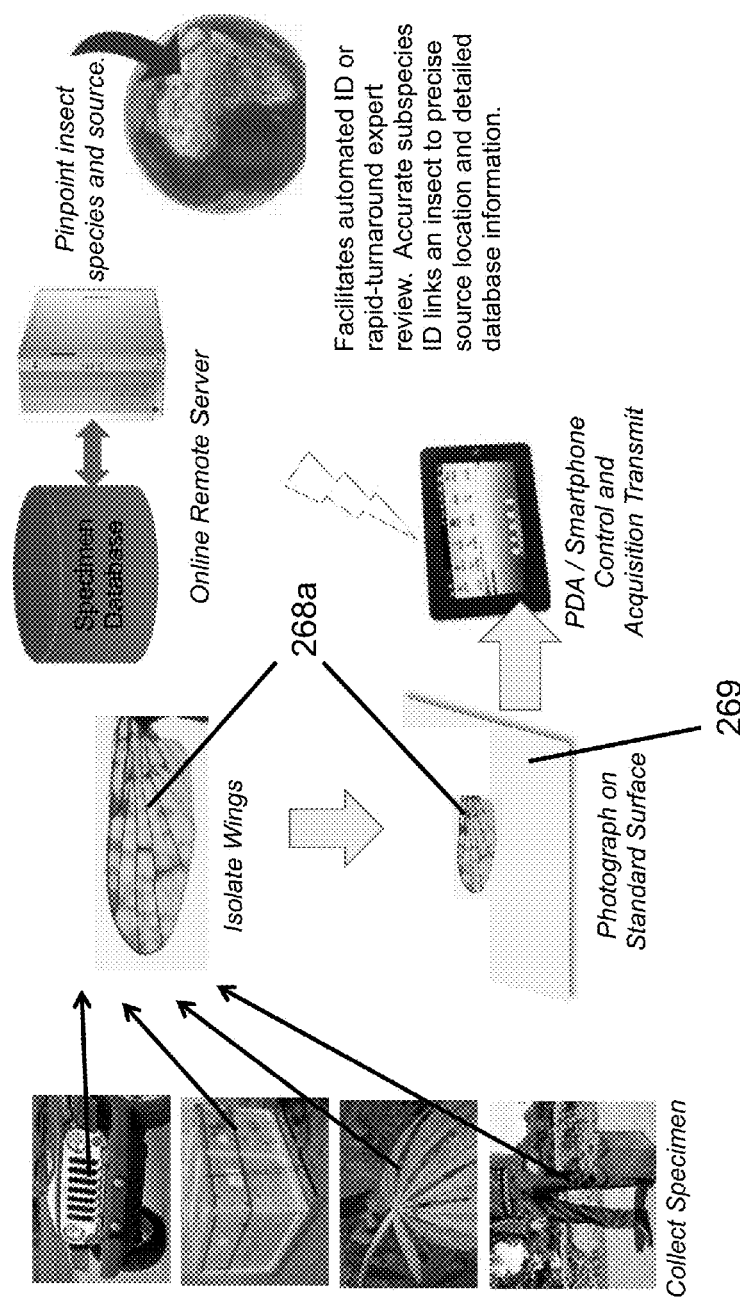
Figure 26C:
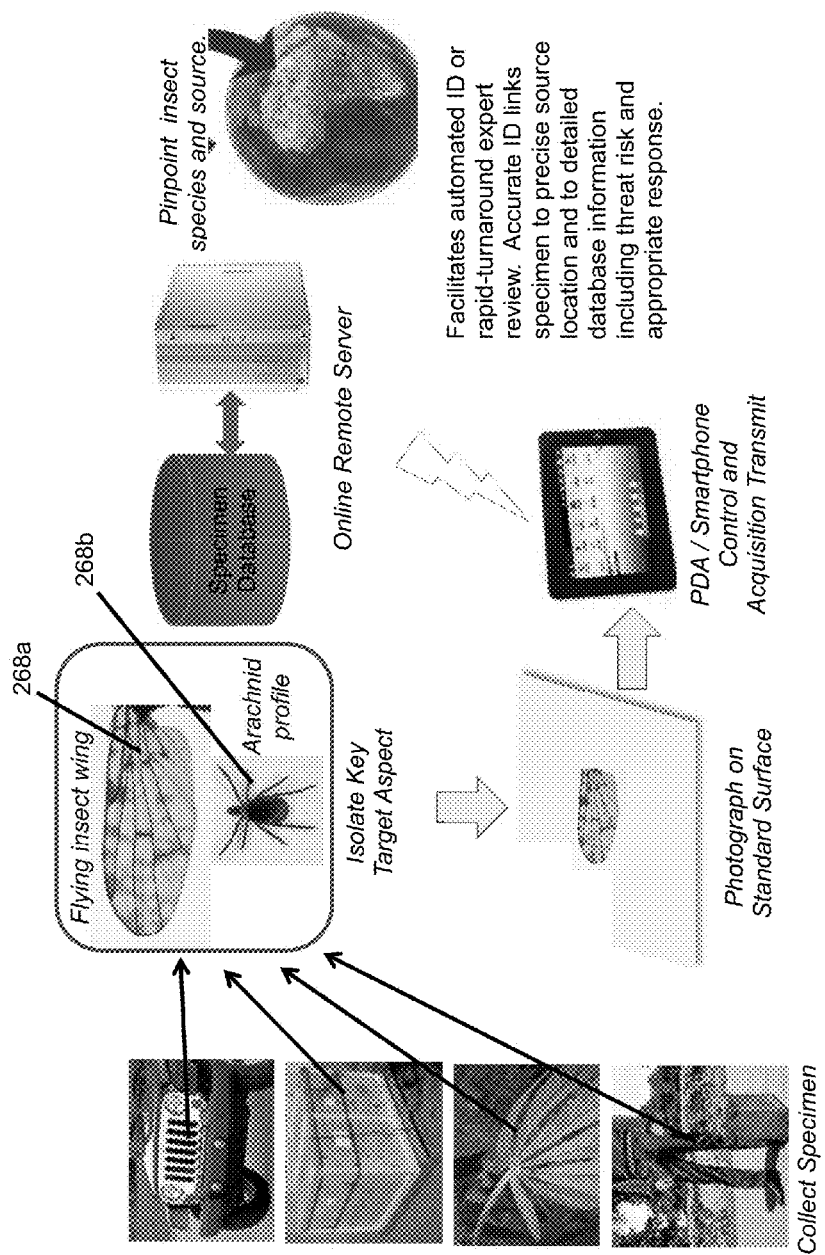

The concept as illustrated in FIGS. 26A-C includes a combination of:
High-throughput robotic scanners to digitize existing collections. An example ambitious goal is to produce a set of robotic scanners that can digitize a pinned insect collection the size of the Smithsonian's (over 31 million) in a five year timeframe. This means digitizing roughly 13 insects per minute, or one insect every 4.5 seconds. To achieve this goal, we will employ multiple machines fed by automated pick-and-place loaders, so that human operators can quickly feed the contents of entire storage trays to the digitizer. This is being developed under separate funding. FIG. 24 illustrates this concept, with an example drawer of specimens 241 from which individual specimens 243 are pulled for automatic handling and imaging by robotic system 242. This is fully enabled in, for example, patent application Ser. No. 13/858,939 filed Apr. 8, 2013, also based on the Provisional Patent Application No. 61/801,010, herein referenced.
Field scanners 253 to examine new specimens. Provides semi-automated imaging information transfer for field users. Smartphone apps exist for plant specimens. Current camera technology is problematic since target insects are small. We have further developed procedures for quick-mounting specimens, interfacing to external optics or microscope stations where necessary. This is again, further enabled in, for example, patent application Ser. No. 13/858,939 filed Apr. 8, 2013, also based on the Provisional Patent Application No. 61/801,010, herein referenced.
Automatic insect recognition and classification. Automated identification will enable applications in commercial agriculture, national security, and epidemiology without reliance on human experts. Decoupling these tasks from the very limited and overtaxed pool of human experts by leveraging the datasets we are collecting will enable our concepts largest commercial potential. Our internal R&D trials have yielded up to 96% accuracies. One example targets rapid field-screening of disease-vectors to protect U.S. Service personnel.
An online database system to search and view scanned specimens. Gives experts, researchers, students, and others quick access to detailed images, and species-specific details. The availability of this data will be a game-changing with significant commercial, agricultural, scientific, and security ramifications.

Such wing or other anatomical images such as the ventral view of an arachnid, etc., may be extracted in bulk using the robotics system herein described and in the referenced patent applications, or using hand acquired or previously cataloged images. Mechanisms for the automation of finding and imaging specific insect views or anatomy close-ups are also disclosed, and are applicable to both the high-throughput and field scanners; however, in embodiments addressing wing imagery or dorsal imagery flat crawling insects, these advanced capabilities are not required. Further, it will be clear that these systems are equally applicable to Biota other than insects, including plants, animals, and so forth, by in alternative embodiments, directing the collection of training imagery to these other biological specimen datasets.

FIG. 26A illustrates the acquisition of new specimens from a variety of possible exemplary field sources 261, including vehicle grills and windshields, cargo and freight, plant material in the field, stored, or in shipping, and from travelers clothes and luggage. The specimen or specimen fragments are mounted 262 in a holding structure, and a rotational scanner 263 is used to manipulate the specimen so as to obtain imagery necessary for its identification. This is transmitted via a smartphone or tablet 266 linked to a remote server and database system 265, wherein the imagery is compared using, for example, techniques herein enabled, in order to classify the specimen with regards to its species and origin. The database 265, having been produced based upon the bulk digitization 242 previously conducted, is subsequently processed to produce a classifier system as herein described. The remote server system 256 is operative to facilitate automated ID; in some embodiments, it will also facilitate rapid-turnaround remote expert review. The ID will preferentially link the insect details to its precise source location and detailed database information regarding its nature, handling, and potential threat status.

FIG. 26B illustrates a specific example system wherein only insect wings 268a are employed, thus eliminating the necessity for a manipulator 263. Instead, the wing is placed on a standardized mount surface 269, such as sticky tape or white paper, and an image is captured and handled as described.

Finally, FIG. 26C illustrates that other insect types (e.g., non-flying) can be similarly captured with a simplified technique enabled by substantially similar means as herein described for wings. Thus an arachnid 268b, for example, is manipulated into a standard angle, in this case so that a dorsal view is exposed, and mounted as before, and quasi-standardized image information thus transmitted to the identification system.

Figure 27:
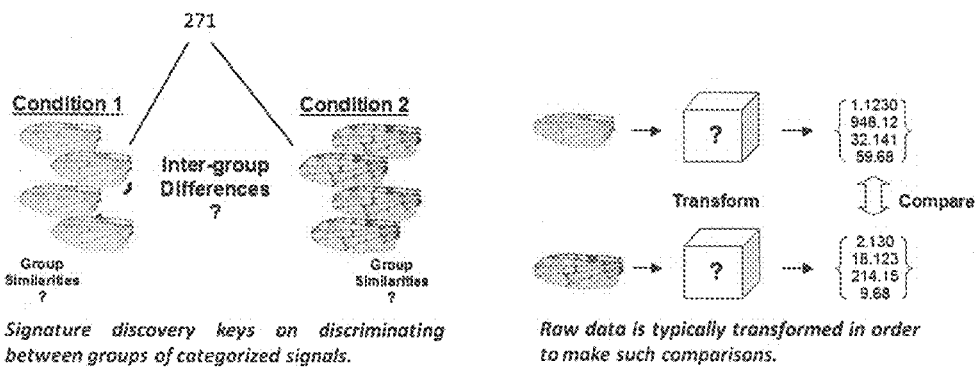
FIG. 27A schematically illustrates an identification process employing an exemplary embodiment of the present invention for identifying training groups and collecting examples with for different groups, discovering discriminating signature, and subsequently classifying new data based on the training.
FIG. 27B illustrates a collection of fruit fly wing images which may be identified employing an exemplary embodiment of the present invention; and, FIGS. 27C-27F illustrate sample confusion matrices obtained employing an exemplary embodiment of the present invention for various collections of mosquitoes.
Figure 27:
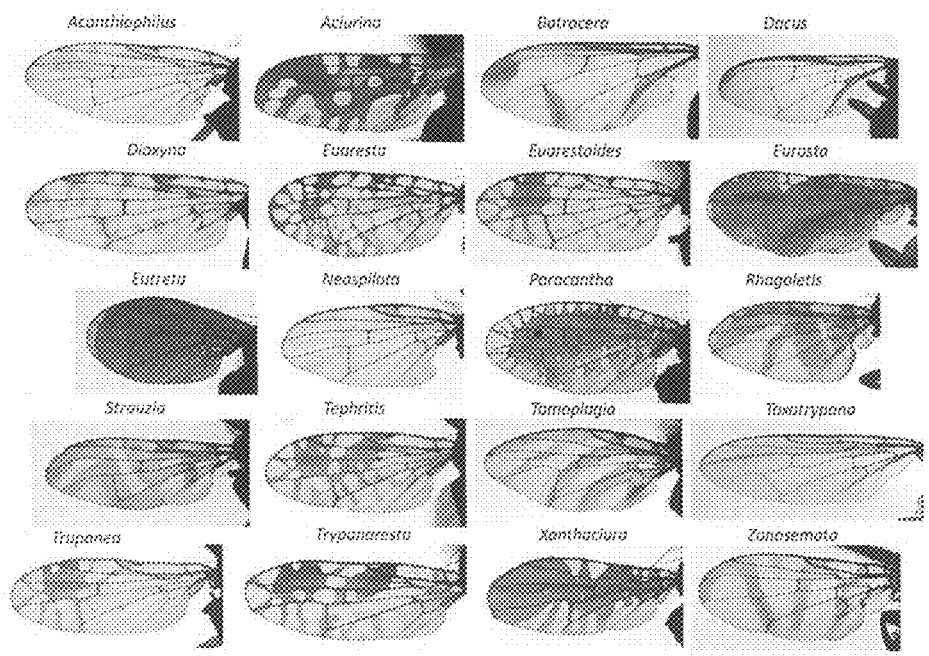
Figure 27C:
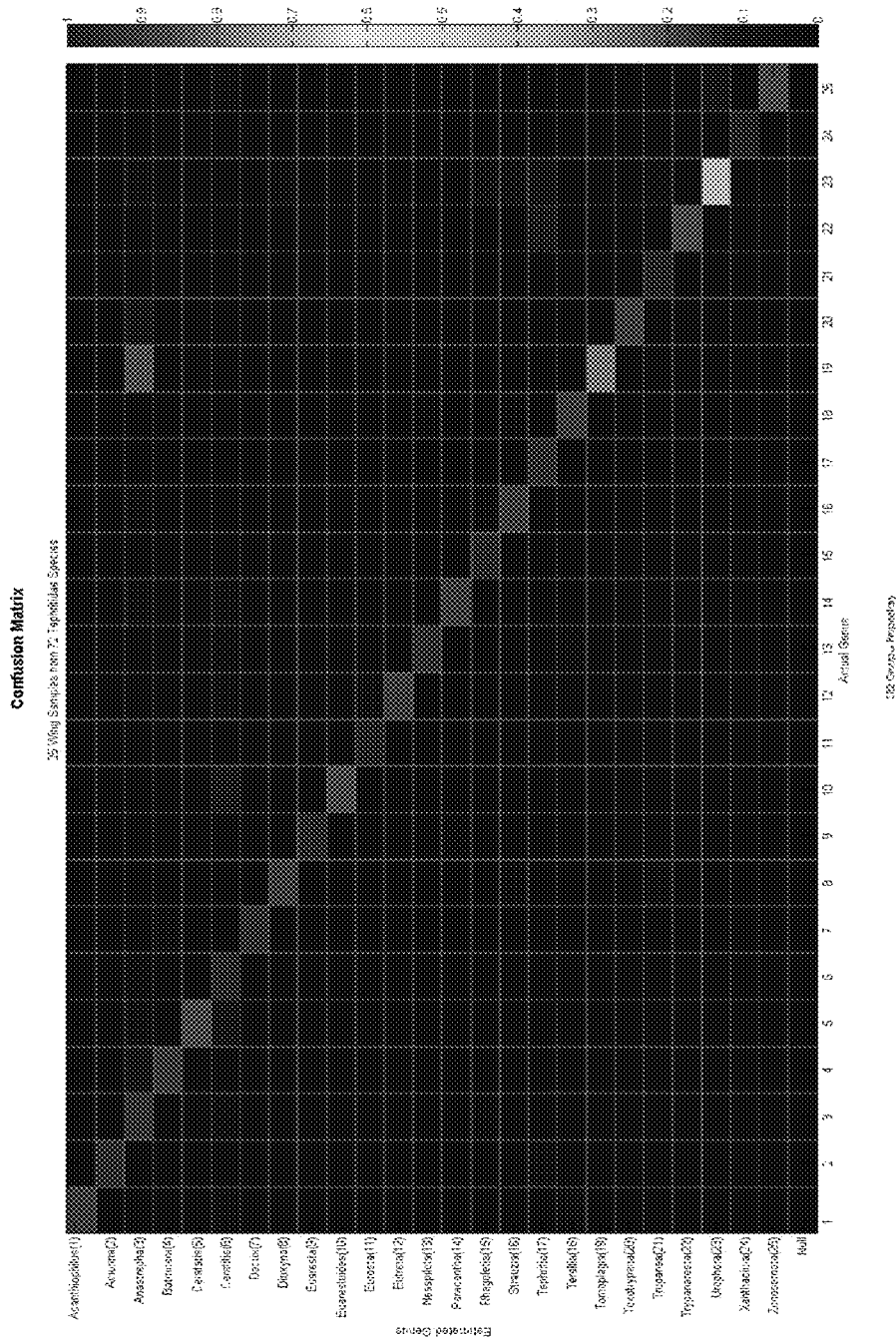
Figure 27D:
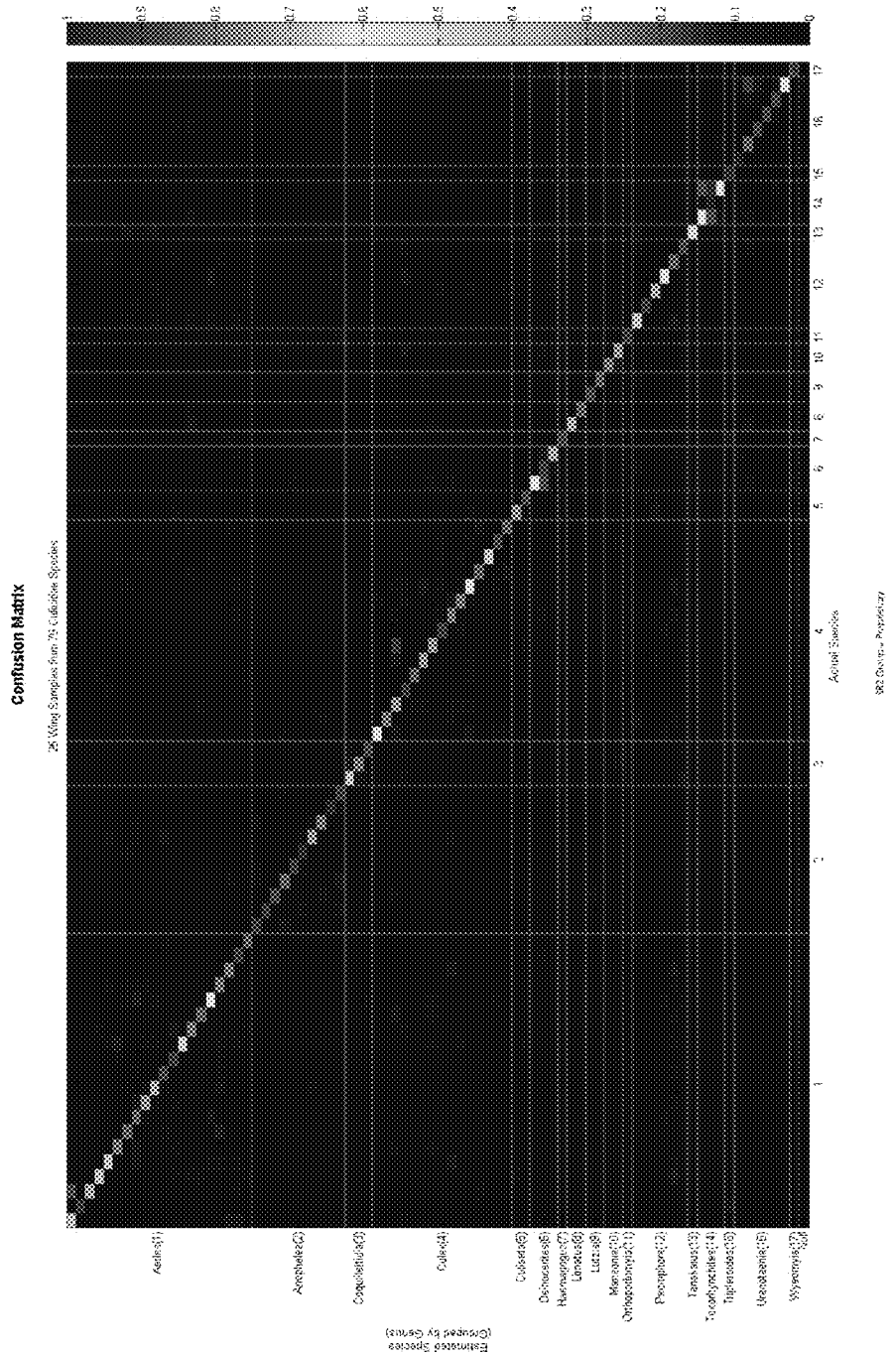
Figure 27E:
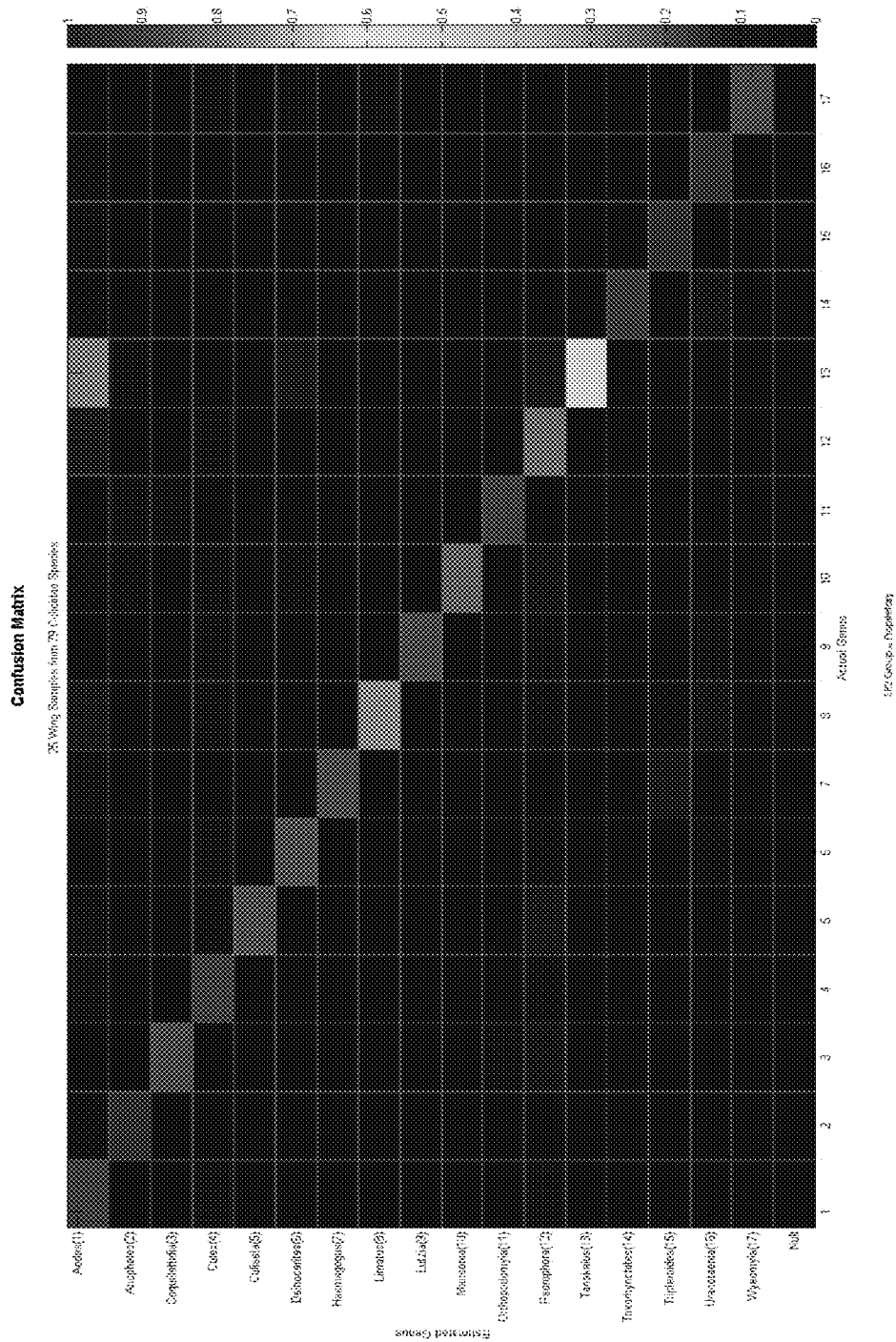
Figure 27F:
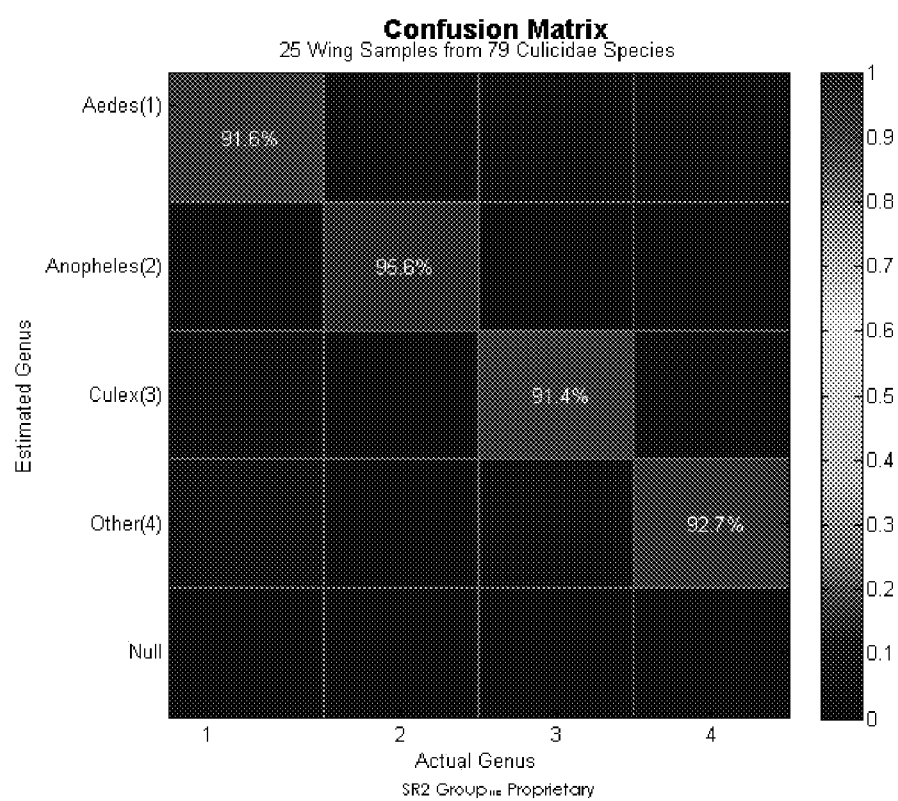

FIG. 27A shows the ID process abstracted from that described herein, of first identifying training groups 271 and collecting examples for different groups 271, and then discovering discriminating signature pursuant to the methods herein or their equivalents, and subsequently classifying new data based on this training.

FIG. 27B shows a collection of fruit fly wing images, a an example. The data resources necessary to support accurate machine classification varies between insect groups. Easily distinguished butterfly species, for example, may require fewer training examples in order for us to obtain highly accurate classifications. More challenging groups, including the fruit flies (Tephritidae) and mosquitoes (Culicade) shown below, can require hundreds of training examples in order for a machine to learn the necessary subtleties of distinction.

We emphasize that human experts and machines will, in general, use different, but complementary approaches to identifying insects. What works best for human experts may not be what works best for the machine. In particular, computer vision algorithms often find and leverage patterns that would be impossible for the human eye to judge with consistency. Access to vast, well curated insect collections provides the best means to train and verify high-accuracy automated field classification systems for our ports and borders.

The following are examples of the classifier in action. A significant body of additional results are available for further discussion and we welcome the opportunity to present our data to interested parties.

FIGS. 27C-F show confusion matrices for various collections of mosquitoes.

Figure 22A:
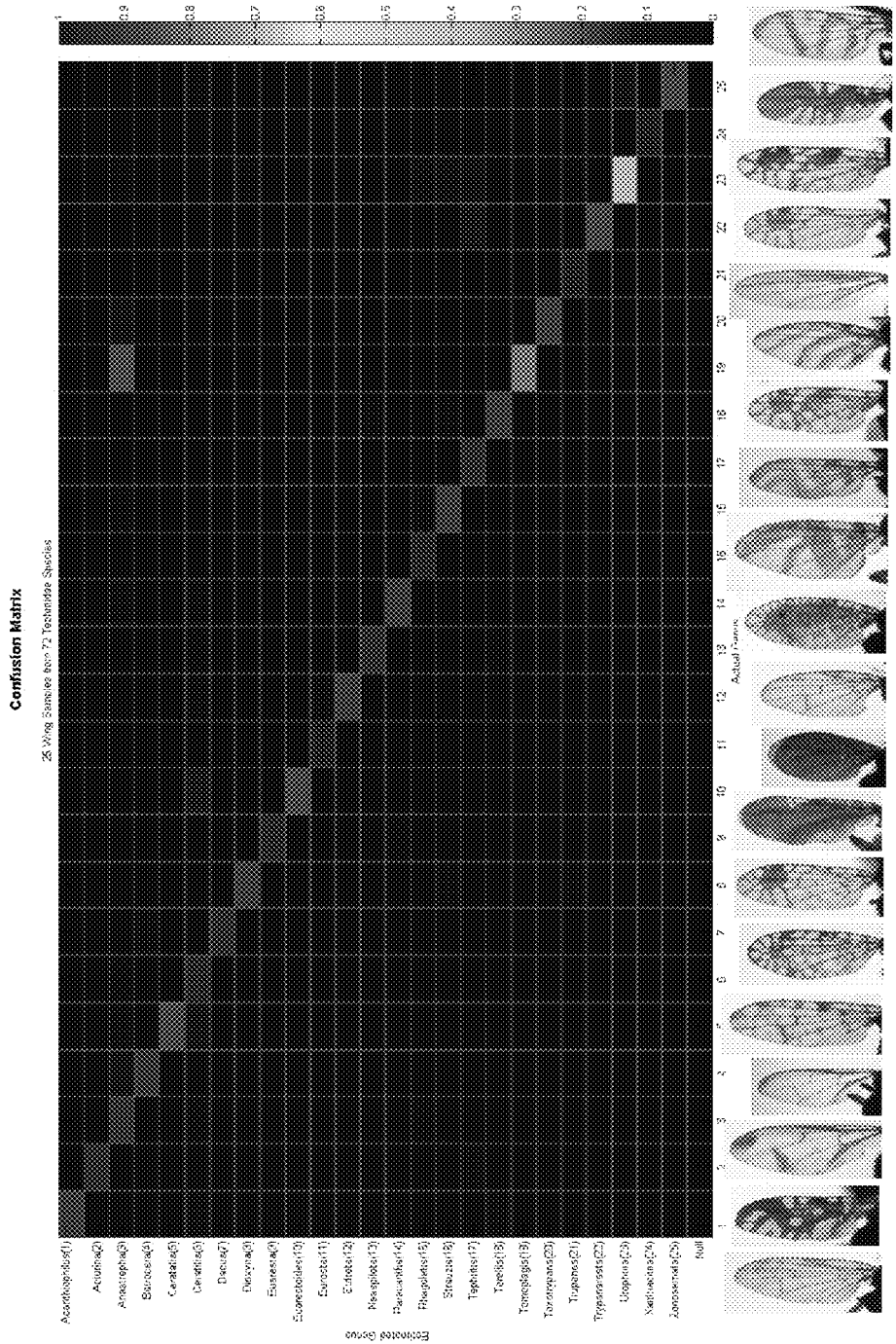
FIG. 22A illustrates a sample confusion matrix for automated sorting of 1,800 fruit flies into 25 genera employing an exemplary embodiment of the present invention.

FIG. 22A shows a confusion matrix for the automated sorting of 1,800 fruit flies (Tephritidae) into 25 genera. High values on the diagonal indicate good performance. Mean accuracy is better than 93%, with individual genus level accuracy in many cases near perfect. Shown below the matrix are samples wing specimens from 20 of the 25 genera.

Figure 22B:
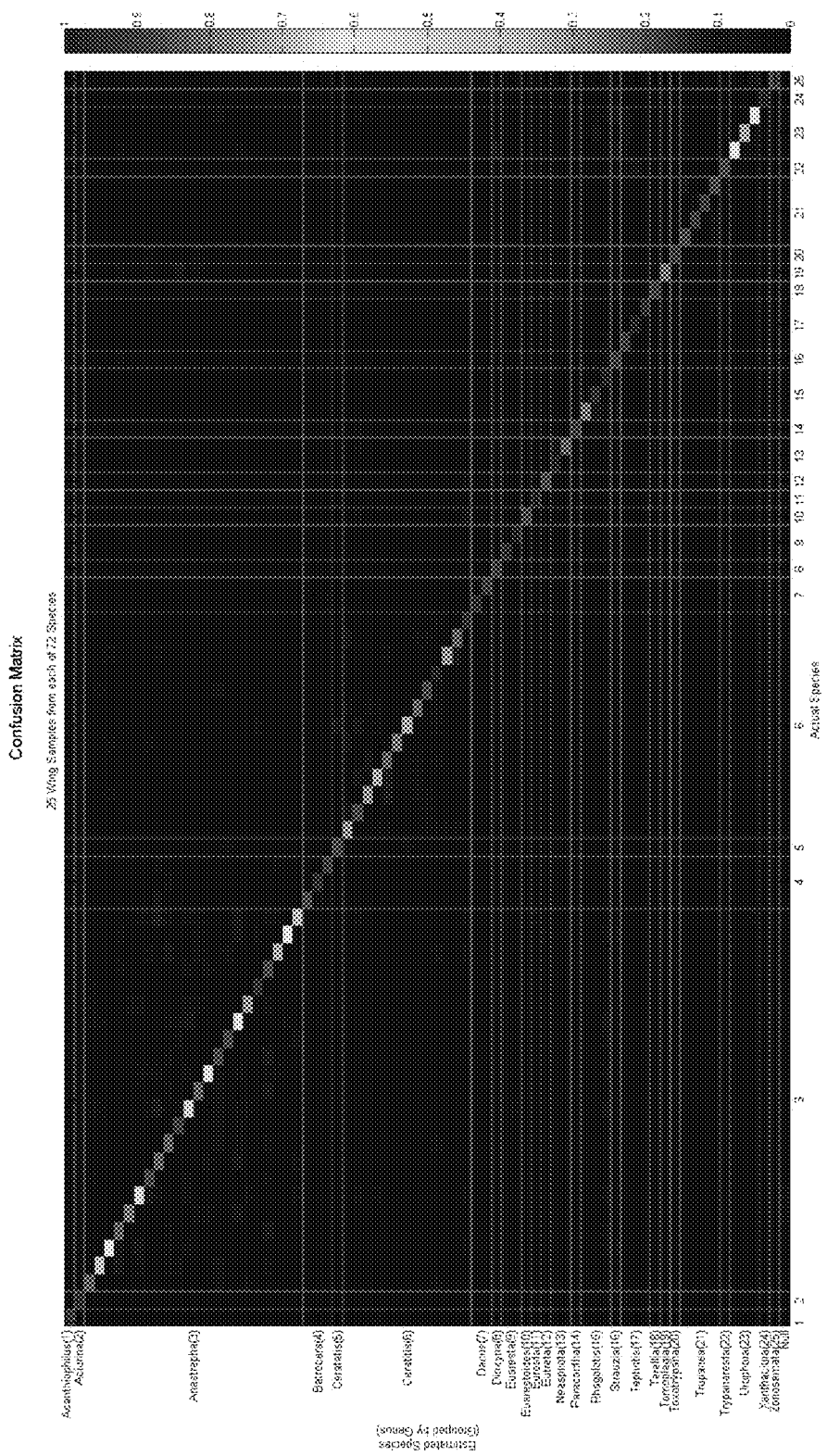
FIG. 22B illustrates a larger confusion matrix encompassing automatic classification of 1,800 fruit flies (Tephritidae) into 72 species (shown grouped in blocks by genus) employing an exemplary embodiment of the present invention.

FIG. 22B depicts a larger confusion matrix, showing results for automatic classification of 1,800 fruit flies (Tephritidae) into 72 species (shown grouped in blocks by genus). High values on the diagonal indicate good performance. Notice that most errors in species classification still lie within the correct genus, which suggests effective knowledge abstraction. The small inset confusion matrix confirms that in many cases we can trace an insect all the way down to its local population of origin.

Figure 22C:
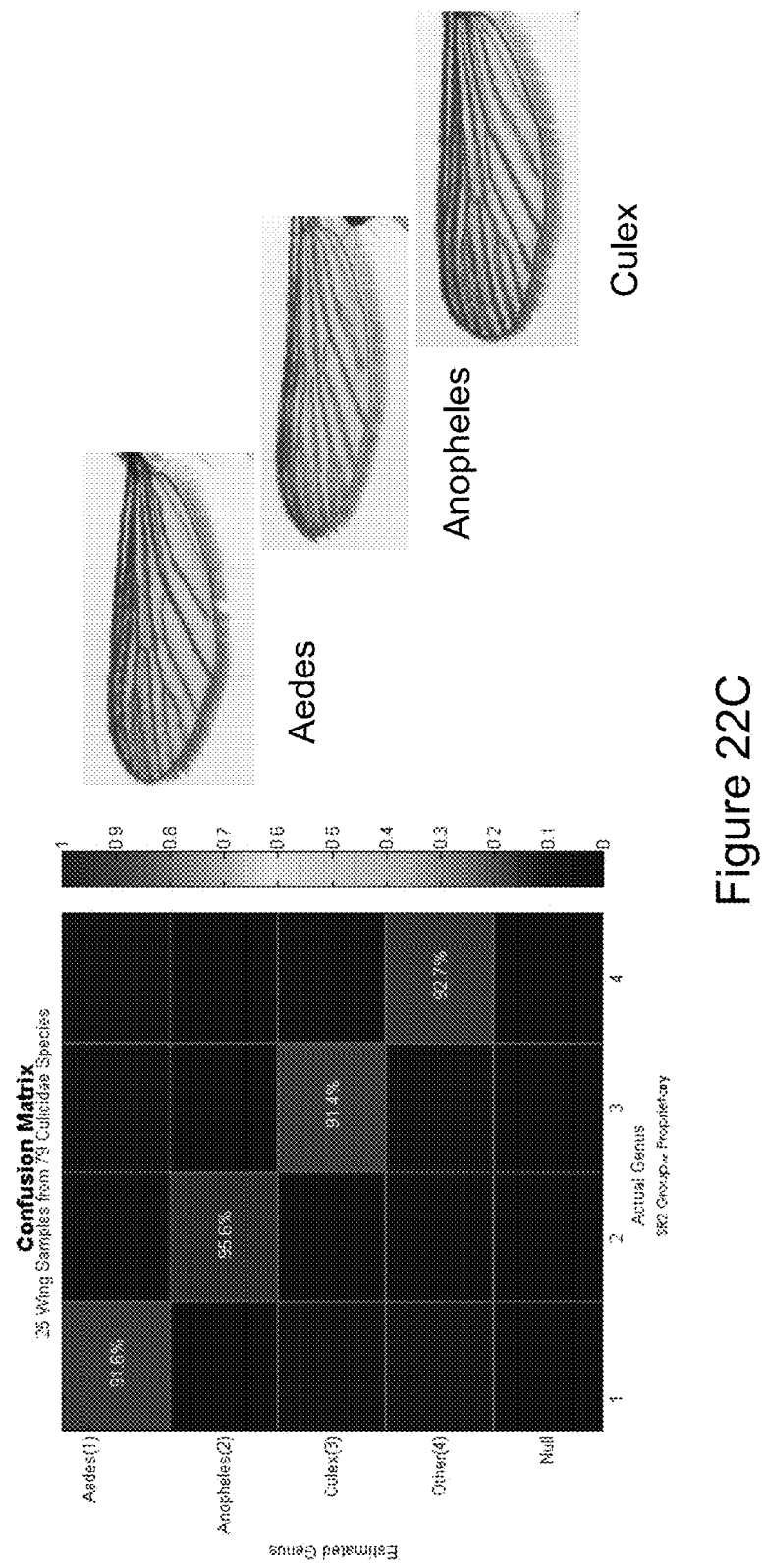
FIG. 22C illustrates a sample confusion matrix quantifying automated detection of insects from three key genera employing an exemplary embodiment of the present invention.

FIG. 22C depicts a confusion matrix quantifying automated detection of insects from three key genera: *Aedes, Anopheles*, and *Culex*. This test included 1,975 total specimens spread evenly across 17 genera in the mosquito (Culicidae) family. High values on the diagonal indicate good performance. Accuracy ranges up to almost 96%. Mosquito species in these three genera are known to vector important infectious diseases, making their detection and tracking an important problem. Wings from different insects groups within this family are often difficult or impossible to differentiate by eye, as is shown in the depicted exemplar wings.

Figure 22D:
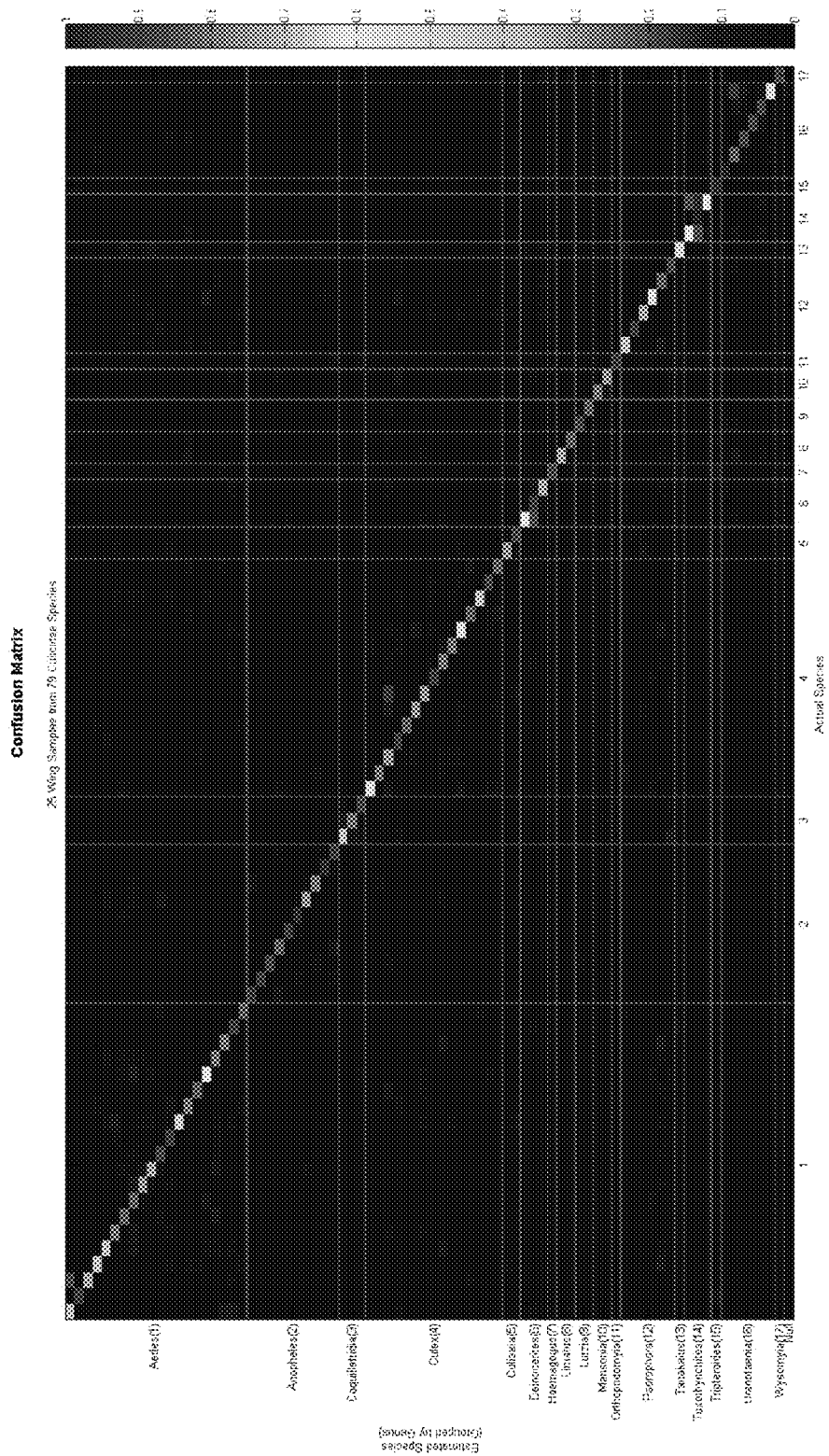
FIG. 22D illustrates a sample confusion matrix for automatic classification of 1,975 mosquitoes (Culicidae) into 79 species (shown grouped in blocks by genus) employing an exemplary embodiment of the present invention.
Figure 23:
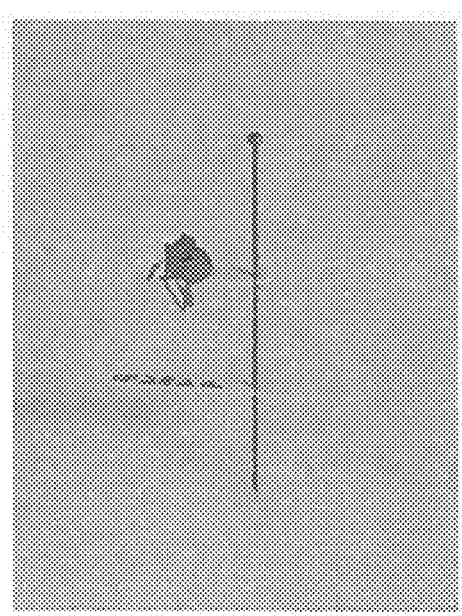
FIG. 23 is a photographic view illustrating a specimen work piece to be adaptively imaged in an exemplary application of certain embodiments of the present invention.

FIG. 22D depicts another confusion matrix, showing results for automatic classification of 1,975 mosquitoes (Culicidae) into 79 species (shown grouped in blocks by genus). High values on the diagonal indicate good performance. Notice that most errors in species classification still lie within the correct genus, which suggests effective knowledge abstraction by the machine classifier.

Figure 25:
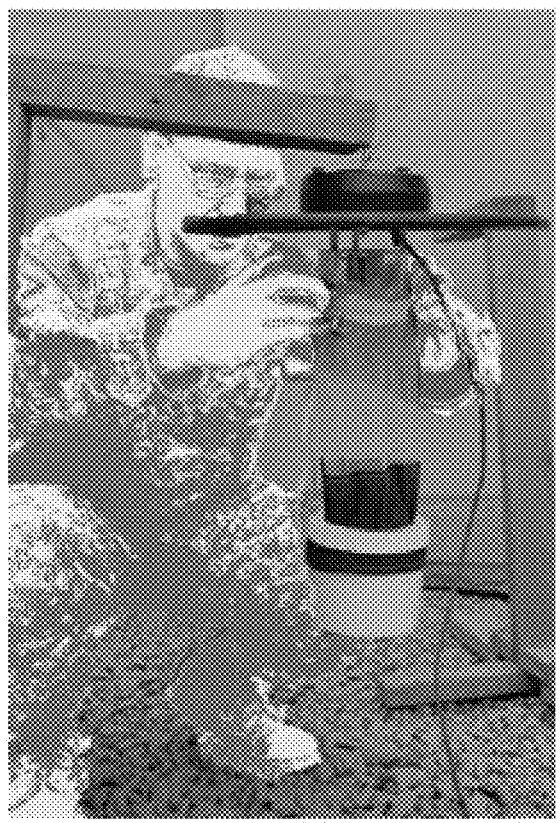
FIG. 25 illustrates a light trap of the type employed in insect prone areas to collect in quantity samples of the local flying insect population.

Other potential embodiments include combination of the imaging system with a light trap or other automated collection system for live insects. FIG. 25 illustrates a typical light trap, which is employed in insect prone areas to collect in quantity samples of the local flying insect population. It may be baited with light emitting systems of certain frequencies, carbon dioxide generators, or other chemical or organic baits in combination. Such light traps employed in high insect areas might trap hundreds or thousands of insects in an overnight period. Our disclosed system and method can be readily used in either of two modes to augment human review of the contents. First, specimens pulled from the light trap may be examined post facto, to automatically classify those individuals in a bench setting. Second, a more advanced light trap may employ optical imaging, acoustic, or other monitoring of the incoming insect species. Thus, by employing the methods herein, insects may be classified as they are captured in near real-time.

In exploiting a collection of imagery in quantity for the later use in classification in a system as herein described, we follow the following steps.

Flowchart of Steps in Training
1—Collect sample specimen images
2—Produce quasi-standardized layout in orientation and pixel scale
3—Optionally select a quasi-standardized sub region of the image to analyze
4—Extract column and/or row vectors per at one or more down-sampled resolutions.
5—Create features from raw vectors, SSA analyze vectors, and or fixed-transform plus SSA analyzed vectors.
6—Create one or more decision SVM spaces based on pair wise combination of training feature vectors.
8—For each pair of classes to be learned, find one or more well pre-forming feature pairs.
9—Formulate voting scheme to classify training data to target set of classes.
10—Optimize the performance by selecting the best performing combine spaces.

Step 10 includes, sub selecting from combinations of classification spaces for each pair-wise class distinctions. These may, for example, include selecting from available row and column down sampled resolution vectors, from raw, SSA, and fixed+SSA feature spaces, and/or from available combinational sums thereof.

For classifying new specimens we proceed as follows:
Flowchart of Steps in New Classification
1—Collect new sample specimen image
2—Produce quasi-standardized images there from, consistent with that used in training.
3—Produce feature vectors consistent with the optimized subset determined in training.
4—Project feature vectors into the previously selected classification spaces
5—For each sub-space determine classification of new image.
6—Apply voting scheme to determine best estimate of the class to which new image belongs.
7—Optionally consider the image as matching no-class if it is not sufficiently consistent with any particular training class. (I.e., in the adjusted null space.)

Biological collections are largely untapped sources of valuable data. Each specimen records an anatomical variety of a species located in space and time [8]. Large digital databases of insect specimens, vast in geographic, historical, and anatomical scope, can help answer previously intractable questions.

The common thread of the applications below is that they rely on accurate insect species identification on a scale that cannot be met by the nation's current, diminishing human expert resources. They also depend upon the large scale digitization of physical collections.

Disease Vector Monitoring: Insects and related arthropods are known to vector some of the most globally important and deadly diseases affecting human populations. Mosquitoes vector malaria, filariasis, dengue fever, St. Louis encephalitis, West Nile virus, Eastern and Western equine encephalitides, and yellow fever, resulting in millions of deaths each year. Ticks, sand flies, assassin bugs, and tsetse flies are a few of the other well-known disease vectors. Surveillance programs can pay off tenfold in avoiding health costs.

These insects create health and epidemiology challenges both in the US and worldwide. However, they present a specific problem for our active service personnel. Our deployed forces must maintain health and readiness in order meet military objectives. Responding to a local disease threat is critical, but extraneous use of repellents, insecticides, protective gear and other measures wastes human and monetary resources and distracts from primary mission goals. Timely and appropriate defensive action against insect threats requires prompt and accurate identification of species indigenous to an area. But insect vector identification procedures often require time-consuming examination by experts remote from the site of collection.

Present methods rely on field personnel to sort samples, screen for possible problem insects using reference keys, and refer any specimens of potential concern to experts for confirmation. Tens of thousands of insects may be trapped any given night. Experts are heavily taxed in current operations by the arrival of candidate insects from many regions of the world.

Means to automate species identification either completely or by pre-screening field-caught specimens are of urgent interest. This is the primary focus of the present proposal. The Army represents a key insertion opportunity, with a large set of related follow-on applications driven by vector surveillance programs at the state and local municipality level.

Agricultural Threat Detection:

In US agriculture, billions of dollars are lost annually to crop damage or spent on combating pests. Exotic invasives arrive on a regular basis. The soybean aphid, Asian longhorn beetle, Asian tiger mosquito, emerald ash borer, gypsy moth, Argentine fire ant, Japanese beetle, citrus psylla, and medfly are just a few of the many exotic pestiferous insect species causing significant economic damage. Specimen databases can potentially provide the likely origin of an exotic pest. This knowledge can then be used to seek biological control agents in the country and locality of origin, and give immediate insight into the pest's biology, aiding the development of control methods.

One of the principle functions of the USDA—APHIS Systematic Entomology Laboratory is to identify "urgents," insects intercepted at US ports of entry whose identity may determine the fate of inspected cargo, often worth millions of dollars. In this mission, APHIS works hand in hand with the Department of Homeland Security (DHS) Customs and Boarder Protection agency (CBP). Again, means of accelerating pest identification by automating or partially automating inspection procedures is of significant interest to CBP Agricultural Safeguarding personnel. This application will be of great interest to other countries as well, particularly those such as Australia and New Zealand with bio-isolation mandates. Additional potential applications include worldwide agriculture and forestry industries, commercial and NGOs pest control interests, and even individual farmers and gardeners.

Intelligence and Law Enforcement:

Geolocation forensics is another emerging application of insect identification within the national intelligence and criminal justice communities. A publicized murder conviction in 2007 rested partly on the identity and geographic origin of insects found on the front grill of a rental car. The identity of insects on the grill of a jeep intercepted in a terrorist facility in Kandahar can similarly yield insight into where the jeep has been and when. Insects or insect parts can be recovered from clothing, baggage, people, or even explosive devices.

Digital Data Access:

Currently, most insect specimens in U.S. collections are stored in massive banks of drawers. Information about the time, location, and identification exists only on a tiny paper label pinned to the specimen within the drawer, not in digital or even in paper index form. Collections spend enormous effort cataloging a fraction of their specimens, entering data from the tags manually without imaging or confirming the identification of the specimen.

Insect specimen databases would provide epidemiologists knowledge of current and past distributions of disease vectors, and permit modeling of the potential range of both vector and disease, given weather disturbances, global climate change, or other likely perturbations to insect vector distributions. The ability to detect anomalies can provide warning of threats, whether natural or manmade.

Potential break-through applications include dissemination of detailed data to museums and research centers, making virtual curation of each physical specimen by the world's top expert possible. Students and the general public will benefit from the online resource as collections can then focus their efforts on the important work of interpreting and educating after being freed from the demands of manually digitizing millions of specimen tags. Experts with national and local agencies and global NGO's will have easy access to comparison imagery. Agricultural, commercial pest, and disease-vector control companies also would subscribe.

Methods and systems described herein have myriad applications, including government and security related monitoring operations and Web database search applications. Another notable application is for a Smartphone/PDA application that can assist in identification of speakers or other audio sources from their audio in near real time, identification of biological organism from visual imagery, handheld analysis of strategic terrain information, etc. This would provide a very powerful tool for mobile users. Similar web-based services may be provided for individuals who submit images, audio, or other sensor signal data to remotely accessible servers. Likewise, automated cataloging of existing databases may be enabled.

In addition to these specific examples, automated analysis and taxonomic classification of any relatively unconstrained data source is enabled. Those skilled in the art will recognize other application opportunities in medical images and volumetric studies, geological studies, materials inspection, financial datasets, and numerous other varieties of sensor, scientific, online, or business data sources, and the like.

These methods will have broad application apparent to those skilled in the art once they have understood the present description. With appreciation of the novel combinations of elements disclosed in the specification and figures and the teachings herein, it will be clear to those skilled in the art that there are many ways in which the subject invention may be implemented and applied. The description herein relates to the preferred modes and example embodiments of the invention.

The descriptions herein are intended to illustrate possible implementations of the present invention and are not restrictive. Preferably, the disclosed method steps and system units are programmably implemented in computer based systems known in the art having one or more suitable processors, memory/storage, user interface, and other components or accessories required by the particular application intended. Suitable variations, additional features, and functions within the skill of the art are contemplated, including those due to advances in operational technology. Various modifications other than those mentioned herein may be resorted to without departing from the spirit or scope of the invention. Variations, modifications and alternatives will become apparent to the skilled artisan upon review of this description.

That is, although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular combinations of method steps may be reversed or interposed, all without departing from the spirit or scope of the invention as defined in the appended claims.

What is claimed is:

1. A system for taxonomically distinguishing physical samples, based on images thereof captured in unconstrained manner, for a plurality of sources, the system comprising:
   at least one field acquisition portion for acquiring physical samples of the sources;
   a portable imagery portion disposed at said field acquisition portion, said portable imagery portion actuating to capture images of the physical samples acquired at said field acquisition portion;
   a classifier portion remotely disposed from said field acquisition portion, and receiving the captured images as data segments, said classifier portion actuating a server to execute:
      a vector operation constructing for each of the data segments at least one vector of predetermined form, at least one of the data segments being selected from a plurality of different generated versions of a captured image preserved for selection exclusive of one or more other generated versions;
      a sparse decomposition operation selectively executing in at least a training system mode a simultaneous sparse approximation upon a joint corpus of vectors for a plurality of data segments of distinct sources, said sparse decomposition operation adaptively generating at least one sparse decomposition for each said vector with respect to a representative set of decomposition atoms;
      a discriminant reduction operation executable during the training system mode to derive an optimal combination of atoms from said representative set for cooperatively distinguishing signals attributable to different ones of the distinct sources; and,
      a classification operation executable in a classification system mode to discover for said sparse decomposition of an input data segment a degree of correlation relative to each of the distinct sources;
   different physical sources being thereby distinguished from one another based on data captured without constraint on the nature and form of data content.

2. A system for taxonomically distinguishing physical samples, based on images thereof captured in unconstrained manner, for a plurality of sources, the system comprising:
   a portable imagery portion actuating to capture images of acquired physical samples of the sources;
   a classifier portion remotely disposed from said portable imagery portion, and receiving the captured images as data segments, said classifier portion actuating a server to execute:
      a vector operation constructing for each of the data segments at least one vector of predetermined form, at least one of the data segments being selected from a plurality of different generated versions of a captured image preserved for selection exclusive of one or more other generated versions;
      a sparse decomposition operation selectively executing in at least a training system mode a simultaneous sparse approximation upon a joint corpus of vectors for a plurality of data segments of distinct sources, said sparse decomposition operation adaptively generating at least one sparse decomposition for each said vector with respect to a representative set of decomposition atoms;
      a discriminant reduction operation executable during the training system mode to derive an optimal combination of atoms from said representative set for cooperatively distinguishing signals attributable to different ones of the distinct sources; and,
      a classification operation executable in a classification system mode to discover for said sparse decomposition of an input data segment a degree of correlation relative to the physical samples of each of the distinct sources,
   different physical sources being thereby distinguished from one another based on data captured without constraint on the nature and form of data content.

3. The system as recited in claim 2, further comprising a database portion pre-stored with a plurality of data segments attributable respectively to a plurality of distinct sources, said classifier portion in the training system mode reading the pre-stored data segments from said database portion, said sparse decomposition and discriminant reduction operations of said classifier portion thereby executing in the training system mode to identify a distinct class corresponding to at least one of the known distinct sources.

4. The system as recited in claim 3, wherein said classifier portion actuates a responsive transmission back to the personal communication device originating a data segment transmission, the responsive transmission indicating a distinct source correlation discovered for the transmitted data segment.

5. The system as recited in claim 4, wherein said classifier portion filters the distinct source correlation discovered for the data segment transmission according to at least one of: pre-stored data on the distinct source and geographic location data for the field acquisition portion.

6. The system as recited in claim 2, further comprising a personal communication device coupled to said portable imagery portion, said personal communication device actuating transmission of the captured images as data segments to said classifier portion.

7. The system as recited in claim 6, wherein at least one of the other portions of the system is controllable through said personal communication device implementing an online application for identifying and classifying the distinct source of the sample.

8. The system as recited in claim 2, wherein said portable imagery portion includes a manipulator base supporting at least one of a physical sample and an imaging device for angularly displacement of one relative to the other, said portable imagery portion thereby capturing the images of the sample in angularly adjustable manner.

9. The system as recited in claim 2, comprising a plurality of said field acquisition portions remotely disposed from one another.

10. The system as recited in claim 2, wherein:
the physical samples include at least one of: an insect wing and an arachnid body; and,
said vector operation of said classifier portion includes selective down-sampling of the sample images in resolution to construct the vectors of predetermined form for the data segments.

11. The system as recited in claim 2, wherein said discriminant reduction operation of said classifier portion includes a Support Vector Machine (SVM) programmably implemented therein, said SVM executing to mutually n-wise compare the distinct sources in sparse decomposition to selectively determine said optimal combination of atoms for each said mutual comparison.

12. The system as recited in claim 11, wherein:
said SVM executes pair-wise comparisons of distinct sources, said SVM determining for each said pair-wise comparison of sources a two-dimensional decision subspace defined by a corresponding pair of optimal atoms; and,
said classifier portion executes a non-parametric voting process iteratively mapping corresponding portions of said data segment sparse decomposition to each said decision subspace.

13. The system as recited in claim 12, wherein said simultaneous sparse approximation is carried out according to a greedy adaptive decomposition (GAD) process.

14. A method for taxonomically distinguishing physical samples, based on images thereof captured in unconstrained manner, for a plurality of sources, the method comprising:
capturing at least one image of each of a set of acquired physical samples;
receiving the captured images as data segments at a processor;
actuating said processor to:
construct for each of the data segments at least one vector of predetermined form, at least one of the data segments being selected from a plurality of different generated versions of a captured image preserved for selection exclusive of one or more other generated versions;
selectively execute in at least a training system mode a simultaneous sparse approximation upon a joint corpus of vectors for a plurality of data segments of distinct sources, to thereby adaptively generate at least one sparse decomposition for each said vector with respect to a representative set of decomposition atoms;
during the training system mode, derive an optimal combination of atoms from said representative set for cooperatively distinguishing signals attributable to different ones of the distinct sources; and,
in a classification system mode, discover for said sparse decomposition of an input data segment a degree of correlation relative to each of the distinct sources,
different physical sources being thereby distinguished from one another based on data captured without constraint on the nature and form of data content.

15. The method as recited in claim 14, further comprising storing a plurality of data segments attributable respectively to a plurality of distinct sources in a database portion,
wherein said processor is further actuated in the training system mode to read the pre-stored data segments from said database portion, thereby identifying a distinct class corresponding to at least one of the known distinct sources.

16. The method as recited in claim 14, further comprising filtering the distinct source correlation discovered for the data segment according to at least one of: pre-stored data on the distinct source and a geographic location of acquisition of the sample.

17. The method as recited in claim 14, wherein:
the physical samples include at least one of: an insect wing and an arachnid body; and,
said vector construction includes selective down-sampling of the images in resolution to construct the vectors of predetermined form for the data segments.

18. The method as recited in claim 14, wherein said simultaneous sparse approximation is carried out according to a greedy adaptive decomposition (GAD) process.

19. The method as recited in claim 14, wherein said optimal atom combination derivation includes executing a Support Vector Machine (SVM) to mutually n-wise compare the distinct sources in sparse decomposition to selectively determine said optimal combination of atoms for each said mutual comparison.

20. The method as recited in claim 19, wherein said SVM executes pair-wise comparisons of distinct sources, said SVM determining for each said pair-wise comparison of sources a two-dimensional decision subspace defined by a corresponding pair of optimal atoms,
the method further comprising executing a non-parametric voting process iteratively mapping corresponding portions of said data segment sparse decomposition to each said decision subspace.

* * * * *